(12) United States Patent
Si et al.

(10) Patent No.: US 11,146,348 B2
(45) Date of Patent: *Oct. 12, 2021

(54) METHOD AND APPARATUS FOR DESIGN OF NR-SS BURST SET

(71) Applicant: Samsung Electronics Co., Ltd., Suwon-si (KR)

(72) Inventors: Hongbo Si, Plano, TX (US); Le Liu, Fremont, CA (US); Eko Onggosanusi, Coppell, TX (US); Youngbum Kim, Seoul (KR); Taehyoung Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/730,885

(22) Filed: Dec. 30, 2019

(65) Prior Publication Data

US 2020/0136739 A1    Apr. 30, 2020

Related U.S. Application Data

(63) Continuation of application No. 15/902,876, filed on Feb. 22, 2018, now Pat. No. 10,523,354.

(Continued)

(51) Int. Cl.
*H04J 11/00* (2006.01)
*H04L 27/26* (2006.01)
*H04B 7/26* (2006.01)
*H04W 72/04* (2009.01)
*H04L 5/00* (2006.01)

(52) U.S. Cl.
CPC ........ *H04J 11/0079* (2013.01); *H04B 7/2656* (2013.01); *H04J 11/0073* (2013.01);

(Continued)

(58) Field of Classification Search
CPC ............ H04L 25/0226; H04W 56/001; H04W 56/00; H04W 72/0446; H04W 48/12; H04W 16/28; H04B 7/0617; H04B 7/2656; H04J 11/0073; H04J 11/0076; H04J 11/0079
See application file for complete search history.

(56) References Cited

U.S. PATENT DOCUMENTS

2014/0192786 A1   7/2014  Skov et al.
2018/0131489 A1   5/2018  Ly et al.
(Continued)

FOREIGN PATENT DOCUMENTS

| CN | 103828396 A | 5/2014 |
|---|---|---|
| WO | 2017/210319 A1 | 12/2017 |
| WO | 2018/082768 A1 | 5/2018 |

OTHER PUBLICATIONS

Nokia et al., "SS block time index indication", 3GPP TSG-RAN WG1 Meeting #89, May 15-19, 2017, R1-1708233, 9 pages.

(Continued)

*Primary Examiner* — Elton Williams

(57) ABSTRACT

A method of a user equipment (UE) in a wireless communication system comprises receiving, from a base station (BS), at least one physical broadcasting channel (PBCH) symbol containing resource elements (REs) mapped for at least one demodulation reference signal (DMRS) sequence over a downlink channel; and determining DMRS REs included in the at least one PBCH symbol, wherein a synchronization signal (SS) block hypotheses is carried in the at least one DMRS sequence that is mapped into the DMRS REs, and wherein the SS block hypotheses includes at least full or partial SS block indices.

20 Claims, 43 Drawing Sheets

Related U.S. Application Data

(60) Provisional application No. 62/463,369, filed on Feb. 24, 2017, provisional application No. 62/466,620, filed on Mar. 3, 2017, provisional application No. 62/469,187, filed on Mar. 9, 2017, provisional application No. 62/470,604, filed on Mar. 13, 2017, provisional application No. 62/487,760, filed on Apr. 20, 2017, provisional application No. 62/512,563, filed on May 30, 2017, provisional application No. 62/522,819, filed on Jun. 21, 2017.

(52) U.S. Cl.
CPC ........ *H04J 11/0076* (2013.01); *H04L 5/0053* (2013.01); *H04L 5/0092* (2013.01); *H04L 27/2613* (2013.01); *H04L 27/2666* (2013.01); *H04W 72/042* (2013.01); *H04L 27/2692* (2013.01)

(56) References Cited

U.S. PATENT DOCUMENTS

| | | | |
|---|---|---|---|
| 2018/0227867 A1* | 8/2018 | Park | H04W 56/001 |
| 2018/0234931 A1* | 8/2018 | Ly | H04L 5/0053 |
| 2019/0349108 A1 | 11/2019 | Takeda et al. | |

OTHER PUBLICATIONS

Samsung, "SS BW and multiplexing", 3GPP TSG RAN WG1 NR AH, Jan. 16-20, 2017, R1-1700884, 8 pages.

Supplementary European Search Report dated Jan. 17, 2020 in connection with European Patent Application No. 18 75 6954, 9 pages.

Nokia, Alcatel-Lucent Shanghai Bell, "On Requirements and Design of SS Burst Set and SS Block Index Indication", 3GPP TSG-RAN WG1 Meeting #88, Feb. 13-17, 2017, R1-1703092, 15 pages.

NTT Docomo, Inc., "Discussion on NR-PBCH design", 3GPP TSG RAN WG1 Meeting #88, Feb. 13-17, 2017, R1-1702827, 7 pages.

Communication pursuant to Article 94(3) EPC in connection with European Application No. 18756954.6 dated Sep. 25, 2020, 7 pages.

Samsung, "SS block composition, SS burst set composition and SS time index indication," R1-1705318, 3GPP TSG RAN WG1 Meeting #88bis, Spokane, USA, Apr. 3-7, 2017, 12 pages.

European Patent Office Communication under Rule 71(3) EPC, dated Mar. 16, 2021 regarding Application No. 18756954.6, 129 pages.

Huawei et al., "Discussion on SS burst set composition and SS block time index indication", 3GPP TSG RAN WG1 Meeting #88, R1-1703353, Feb. 2017, 7 pages.

China National Intellectual Property Administration, First Action dated Aug. 9, 2021 regarding Application No. 201880013984.3, 12 pages.

* cited by examiner

METHOD AND APPARATUS FOR DESIGN OF NR-SS BURST SET

CROSS-REFERENCE TO RELATED APPLICATION(S) AND CLAIM OF PRIORITY

This application is a continuation of U.S. Non-Provisional patent application Ser. No. 15/902,876 filed Feb. 22, 2018, and claims priority to U.S. Provisional Patent Application No. 62/463,369 filed on Feb. 24, 2017; U.S. Provisional Patent Application No. 62/466,620 filed on Mar. 3, 2017; U.S. Provisional Patent Application No. 62/469,187 filed on Mar. 9, 2017; U.S. Provisional Patent Application No. 62/470,604 filed on Mar. 13, 2017; U.S. Provisional Patent Application No. 62/487,760 filed on Apr. 20, 2017; U.S. Provisional Patent Application No. 62/512,563 filed on May 30, 2017; and U.S. Provisional Patent Application No. 62/522,819 filed on Jun. 21, 2017. The content of the above-identified patent documents is incorporated herein by reference.

TECHNICAL FIELD

The present disclosure relates generally to wireless communication systems and, more specifically, to the RS multiplexing pattern and procedures to demodulate NR broadcast signals, along with the RS carried information.

BACKGROUND

In a wireless communication network, a network access and a radio resource management (RRM) are enabled by physical layer synchronization signals and higher (MAC) layer procedures. In particular, a UE attempts to detect the presence of synchronization signals along with at least one cell identification (ID) for initial access. Once the UE is in the network and associated with a serving cell, the UE monitors several neighboring cells by attempting to detect their synchronization signals and/or measuring the associated cell-specific reference signals (RSs). For next generation cellular systems such as third generation partnership-new radio access or interface (3GPP-NR), efficient and unified radio resource acquisition or tracking mechanism which works for various use cases such as enhanced mobile broadband (eMBB), ultra reliable low latency (URLLC), massive machine type communication (mMTC), each corresponding to a different coverage requirement and frequency bands with different propagation losses is desirable. Most likely designed with a different network and radio resource paradigm, seamless and low-latency RRM is also desirable.

SUMMARY

Embodiments of the present disclosure provide an NR-SS burst set design in an advanced wireless communication system.

In one embodiment, a user equipment (UE) in a wireless communication system is provided. The UE comprises a transceiver configured to receive, from a base station (BS), at least one physical broadcasting channel (PBCH) symbol containing resource elements (REs) mapped for at least one demodulation reference signal (DMRS) sequence over a downlink channel. The UE further comprises a processor operably connected to the transceiver. The processor is configured to determine DMRS REs included in the at least one PBCH symbol. A synchronization signal (SS) block hypotheses is carried in the at least one DMRS sequence that is mapped into the DMRS REs. The SS block hypotheses includes at least full or partial SS block indices.

In another embodiment, a BS in a wireless communication system is provided. The BS comprises a processor configured to determine DMRS REs included in at least one PBCH symbol and generate a SS block hypothesis carried in at least one DMRS sequence that is mapped into the DMRS REs, wherein the SS block hypotheses includes at least full or partial SS block indices. The BS further comprises a transceiver operably connected to the processor, the transceiver is configured to transmit, to a UE, the at least one PBCH symbol containing the REs mapped for the at least one DMRS sequence over a downlink channel.

In yet another embodiment, a method of a UE in a wireless communication system is provided. The method comprises receiving, from a BS, at least one PBCH symbol containing REs mapped for at least one DMRS sequence over a downlink channel and determining DMRS REs included in the at least one PBCH symbol, wherein a SS block hypotheses is carried in the at least one DMRS sequence that is mapped into the DMRS REs, and wherein the SS block hypotheses includes at least full or partial SS block indices.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 28C, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: 3GPP TS 36.211 v13.2.0, "E-UTRA, Physical channels and modulation;" 3GPP TS 36.212 v13.2.0, "E-UTRA, Multiplexing and Channel coding;" 3GPP TS 36.213 v13.2.0, "E-UTRA, Physical Layer Procedures;" 3GPP TS 36.321 v13.2.0, "E-UTRA, Medium Access Control (MAC) protocol specification;" and 3GPP TS 36.331 v13.2.0, "E-UTRA, Radio Resource Control (RRC) protocol specification."

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 1:
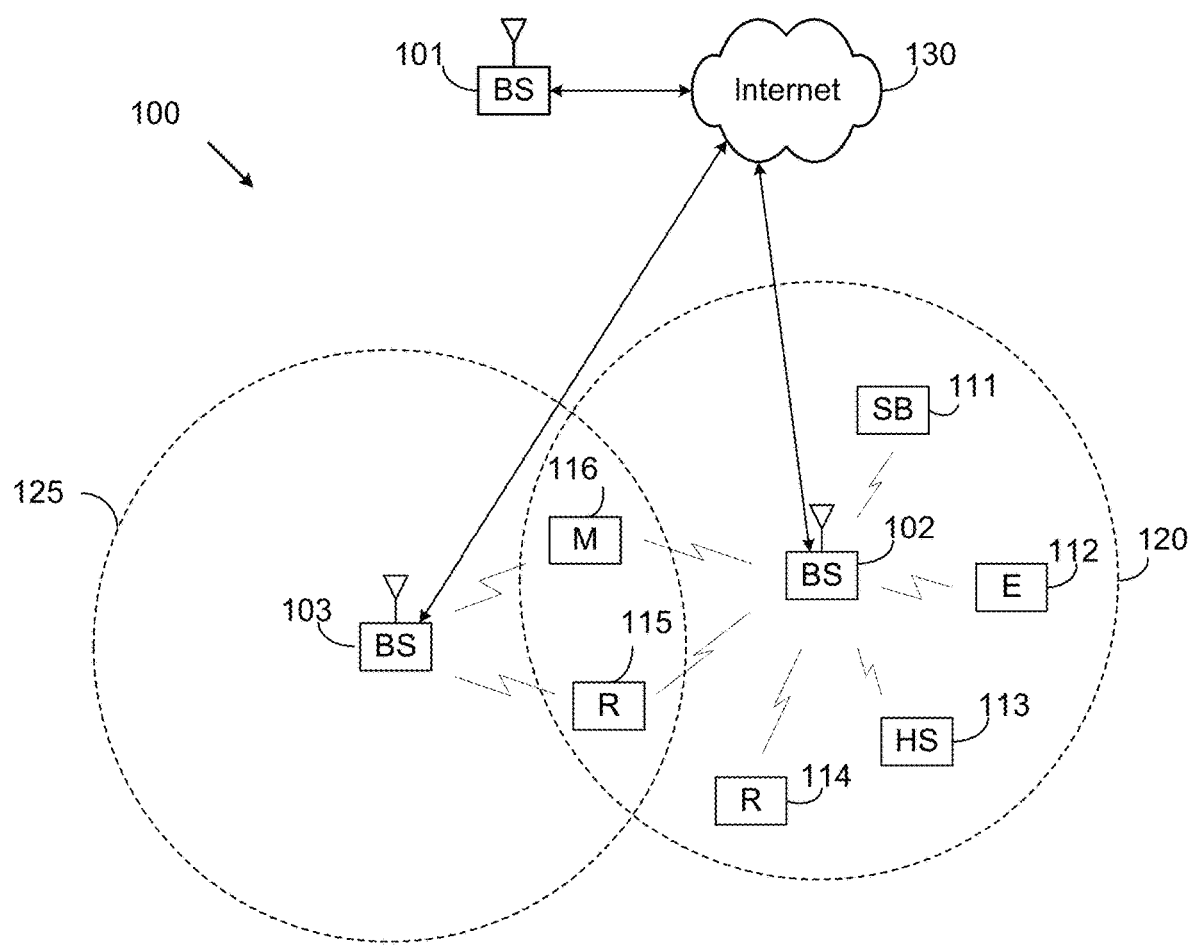
FIG. 1 illustrates an example wireless network according to embodiments of the present disclosure.
Figure 2:
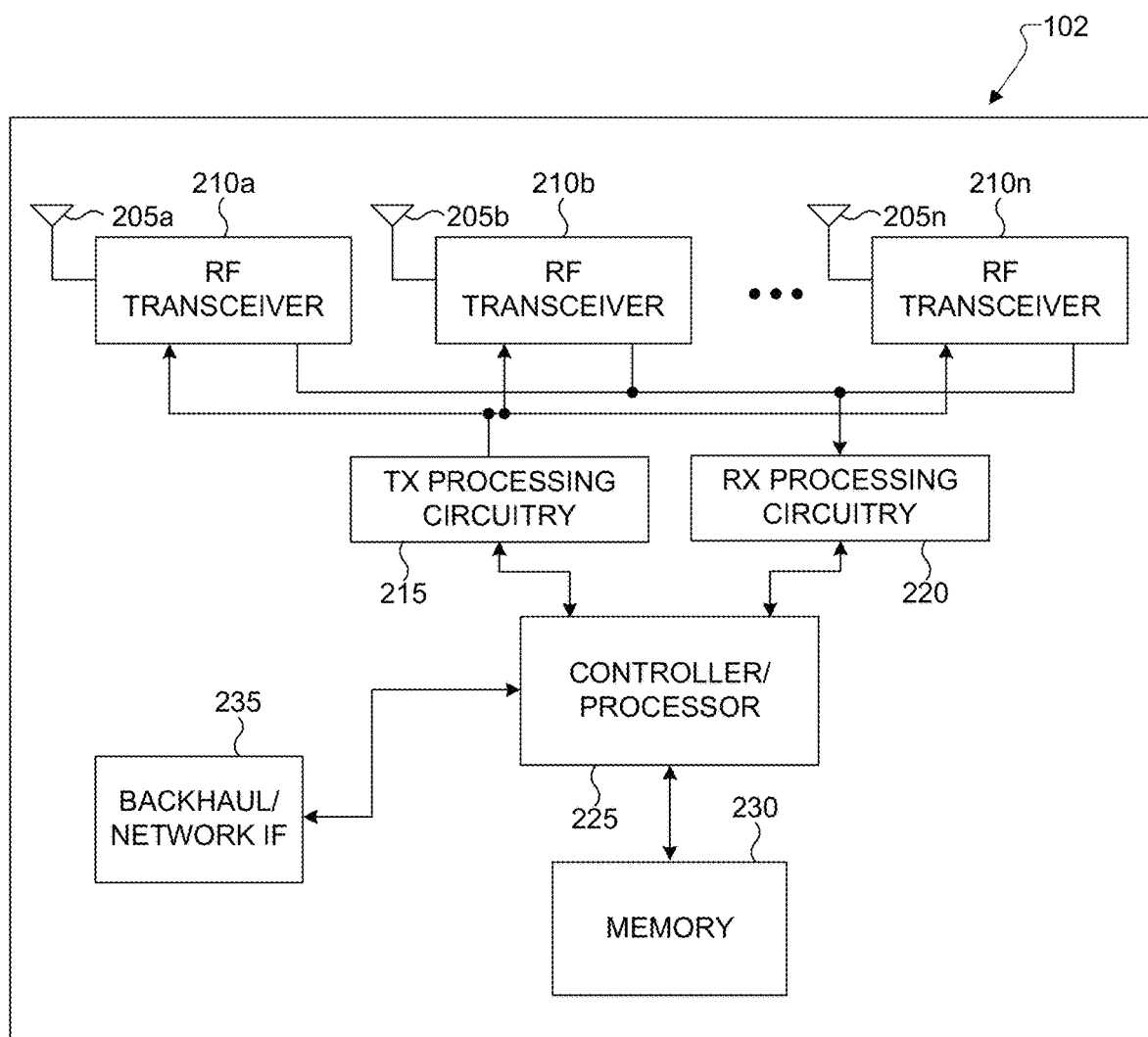
FIG. 2 illustrates an example eNB according to embodiments of the present disclosure.
Figure 3:
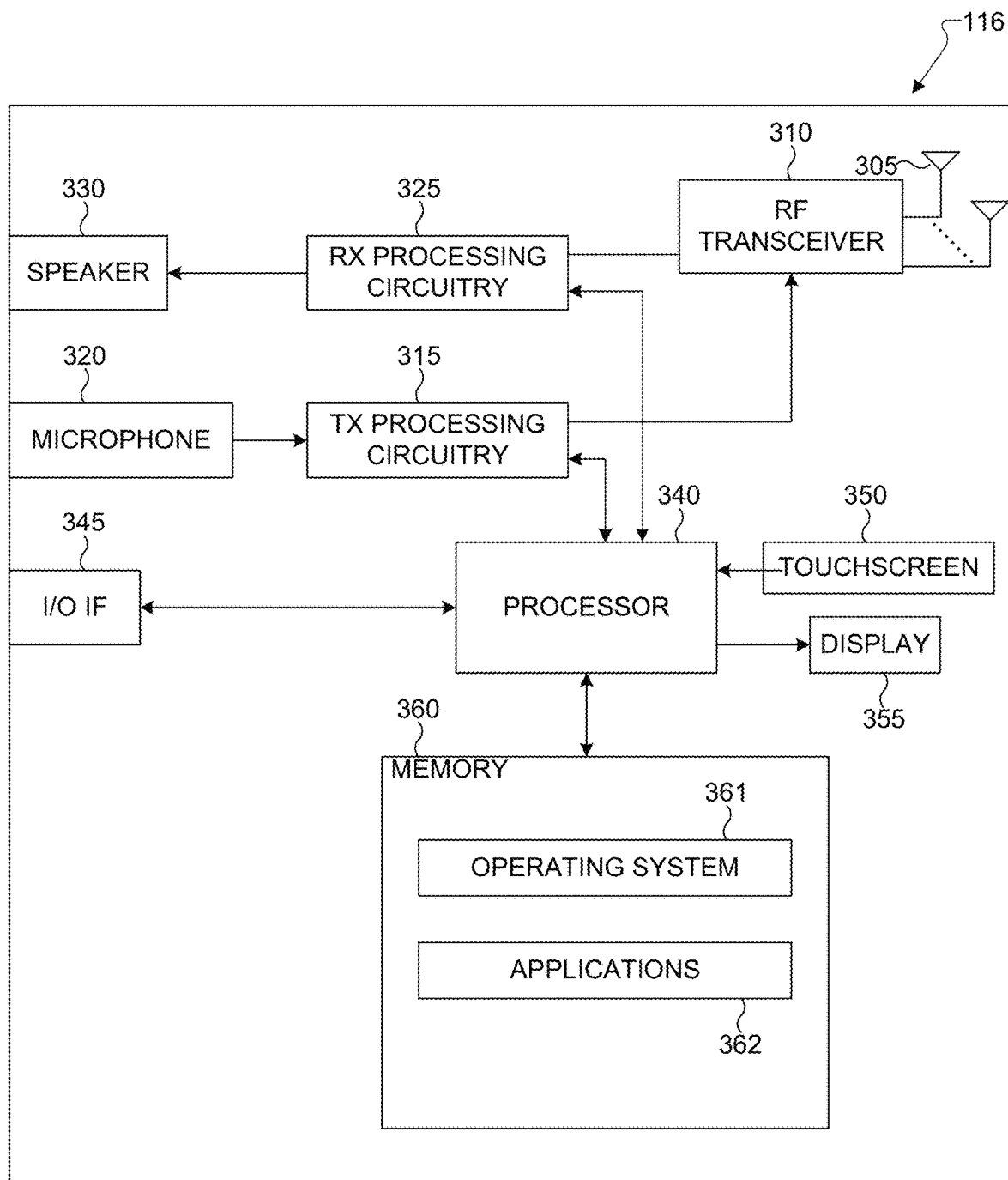
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes an eNB 101, an eNB 102, and an eNB 103. The eNB 101 communicates with the eNB 102 and the eNB 103. The eNB 101 also communicates with at least one network 130, such as the Internet, a proprietary Internet Protocol (IP) network, or other data network.

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of the UEs 111-116 include circuitry, programming, or a combination thereof, for efficient NR-SS burst set design in an advanced wireless communication system. In certain embodiments, and one or more of the eNBs 101-103 includes circuitry, programming, or a combination thereof, for receiving efficient NR-SS burst set in an advanced wireless communication system.

Although FIG. 1 illustrates one example of a wireless network, various changes may be made to FIG. 1. For example, the wireless network could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNBs 101, 102, and/or 103 could provide access to other or additional external networks, such as external telephone networks or other types of data networks.

FIG. 2 illustrates an example eNB 102 according to embodiments of the present disclosure. The embodiment of the eNB 102 illustrated in FIG. 2 is for illustration only, and the eNBs 101 and 103 of FIG. 1 could have the same or similar configuration. However, eNBs come in a wide variety of configurations, and FIG. 2 does not limit the scope of this disclosure to any particular implementation of an eNB.

As shown in FIG. 2, the eNB 102 includes multiple antennas 205a-205n, multiple RF transceivers 210a-210n, transmit (TX) processing circuitry 215, and receive (RX) processing circuitry 220. The eNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

In some embodiments, the RF transceiver 210a-201n is capable of transmitting the PSS and SSS over downlink channels.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the eNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the eNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, or LTE-A), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

In some embodiments, the controller/processor 225 is capable of generating a primary synchronization signal (PSS) including one of multiple PSS sequences that is generated based on a binary phase shift keying (BPSK) modulated length-127 M-sequence in a frequency domain, wherein the PSS includes part of cell identification (ID) information.

In some embodiments, the controller/processor 225 is capable of generating a secondary synchronization signal (SSS) including one of multiple SSS sequences that is generated based on multiple BPSK modulated length-127 M-sequences in the frequency domain, wherein the SSS includes the cell identification (ID) information.

In some embodiments, the controller/processor 225 is capable of determining a number of PSS sequences corresponding to a number of cell ID hypotheses carried by PSS, respectively and a number of SSS sequences corresponding to the number of cell ID hypotheses carried by the PSS and SSS, respectively.

In some embodiments, the controller/processor 225 is capable of determining a polynomial for an M-sequence generating the PSS sequence and a cyclic shift for the M-sequence based on the cell ID information carried by PSS, and generating the PSS sequence by performing the cyclic shift to the M-sequence for a cell ID.

In some embodiments, the controller/processor 225 is capable of determining a polynomial for a first M-sequence generating the SSS sequence, a first cyclic shift for the first M-sequence based on the cell ID information carried by PSS and SSS, the polynomial for a second M-sequence generating the SSS sequence, a second cyclic shift for the second M-sequence based on the cell ID information carried by PSS and SSS, and generating the SSS sequence by performing a product of the first and second M-sequences, wherein each of the first and second M-sequences is generated by the first and second cyclic shifts, respectively, for the cell ID.

In such embodiments, the polynomial for the M-sequence is given by $x^7+x^4+1$ and a corresponding recursive construction scheme is given by $d_M(i+7)=[d_M(i+4)+d_M(i)] \mod 2$, $0 \le i \le 119$, the polynomial for the first M-sequence is given by $x^7+x^4+1$ and a corresponding recursive construction scheme is given by $d_M(i+7)=[d_M(i+4)+d_M(i)]$ mod 2, $0\leq i\leq 119$, and the polynomial for the second M-sequence is given by $x^7+x+1$ and a corresponding recursive construction scheme is given by $d_M(i+7)=[d_M(i+1)+d_M(i)]$ mod 2, $0\leq i\leq 119$.

The memory 230 is coupled to the controller/processor 225. Part of the memory 230 could include a RAM, and another part of the memory 230 could include a Flash memory or other ROM.

Although FIG. 2 illustrates one example of eNB 102, various changes may be made to FIG. 2. For example, the eNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

In some embodiments, the RF transceiver 310 is capable of receiving a primary synchronization signal (PSS) and a secondary synchronization signal (SSS) over downlink channels.

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for CSI reporting on PUCCH. The processor 340 can move data into or out of the memory 360 as required by an executing process. In some embodiments, the processor 340 is configured to execute the applications 362 based on the OS 361 or in response to signals received from eNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

In some embodiments, the processor 340 is capable of determining the PSS including one of multiple PSS sequences that is generated based on a binary phase shift keying (BPSK) modulated length-127 M-sequence in a frequency domain, wherein the PSS includes part of cell identification (ID) information and the SSS including one of multiple SSS sequences that is generated based on multiple BPSK modulated length-127 M-sequences in the frequency domain, wherein the SSS includes the cell identification (ID) information.

In some embodiments, the processor 340 is capable of determining a number of PSS sequences corresponding to a number of cell ID hypotheses carried by PSS, respectively; and a number of SSS sequences corresponding to the number of cell ID hypotheses carried by the PSS and SSS, respectively.

In some embodiments, the processor 340 is capable of determining a polynomial for an M-sequence generating the PSS sequence, a cyclic shift for the M-sequence based on the cell ID information carried by PSS, and generating the PSS sequence by performing the cyclic shift to the M-sequence for a cell ID.

In some embodiments, the processor 340 is capable of determining a polynomial for a first M-sequence generating the SSS sequence, a first cyclic shift for the first M-sequence based on the cell ID information carried by PSS and SSS, the polynomial for a second M-sequence generating the SSS sequence, a second cyclic shift for the second M-sequence based on the cell ID information carried by PSS and SSS, and generating the SSS sequence by performing a product of the first and second M-sequences, wherein each of the first and second M-sequences is generated by the first and second cyclic shifts, respectively, for the cell ID.

In such embodiments, the polynomial for the M-sequence is given by $x^7+x^4+1$ and a corresponding recursive construction scheme is given by $d_M(i+7)=[d_M(i+4)+d_M(i)]$ mod 2, $0\leq i\leq 119$, the polynomial for the first M-sequence is given by $x^7+x^4+1$ and a corresponding recursive construction scheme is given by $d_M(i+7)=[d_M(i+4)+d_M(i)]$ mod 2, $0\leq i\leq 119$, and the polynomial for the second M-sequence is given by $x^7+x+1$ and a corresponding recursive construction scheme is given by $d_M(i+7)=[d_M(i+1)+d_M(i)]$ mod 2, $0\leq i\leq 119$.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
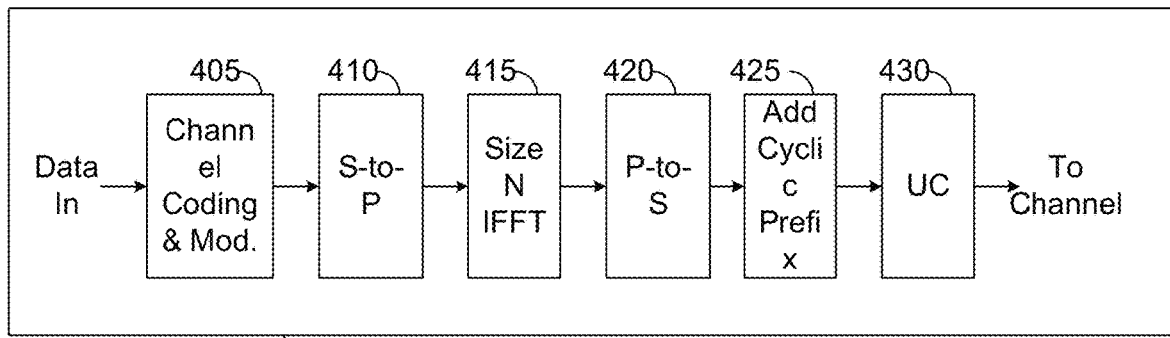
FIG. 4A illustrates a high-level diagram of an orthogonal frequency division multiple access transmit path according to embodiments of the present disclosure.
Figure 4B:
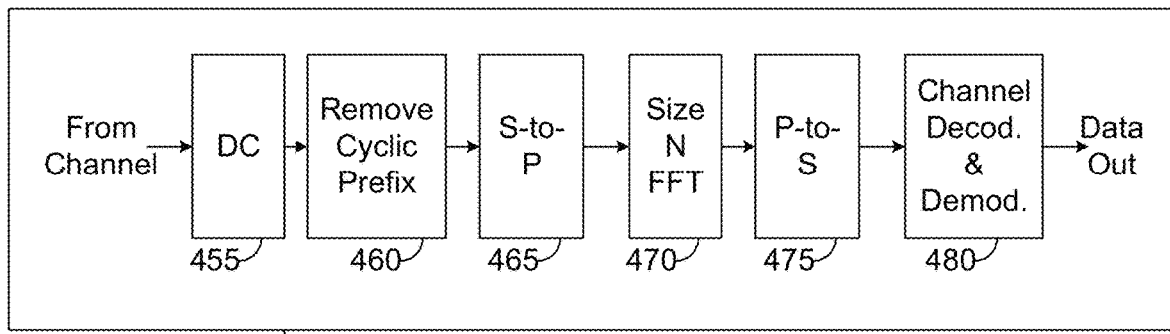
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (eNB) 102 or a relay station, and the receive path circuitry may be implemented in a user equipment (e.g. user equipment 116 of FIG. 1). In other examples, for uplink communication, the receive path circuitry 450 may be implemented in a base station (e.g. eNB 102 of FIG. 1) or a relay station, and the transmit path circuitry may be implemented in a user equipment (e.g. user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at UE 116 after passing through the wireless channel, and reverse operations to those at eNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of eNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to eNBs 101-103 and may implement a receive path corresponding to the architecture for receiving in the downlink from eNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption should be minimized as possible.

A communication system includes a Downlink (DL) that conveys signals from transmission points such as Base Stations (BSs) or NodeBs to User Equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the DL signals convey a master information block (MIB) or to a DL shared channel (DL-SCH) when the DL signals convey a System Information Block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with special system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $N_{sc}^{RB}$ sub-carriers, or resource elements (REs), such as 12 REs. A unit of one RB over one subframe is referred to as a PRB. A UE can be allocated $M_{PDSCH}$ RBs for a total of $M_{sc}^{PDSCH}=M_{PDSCH} \cdot N_{sc}^{RB}$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, it may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{symb}^{UL}$ symbols for transmitting data information, UCI, DMRS, or SRS. A frequency resource unit of an UL system BW is an RB. A UE is allocated $N_{RB}$ RBs for a total of $N_{RB} \cdot N_{sc}^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb}=2 \cdot (N_{symb}^{UL}-1)-N_{SRS}$ where $N_{SRS}=1$ if a last subframe symbol is used to transmit SRS and $N_{SRS}=0$ otherwise.

Figure 5:
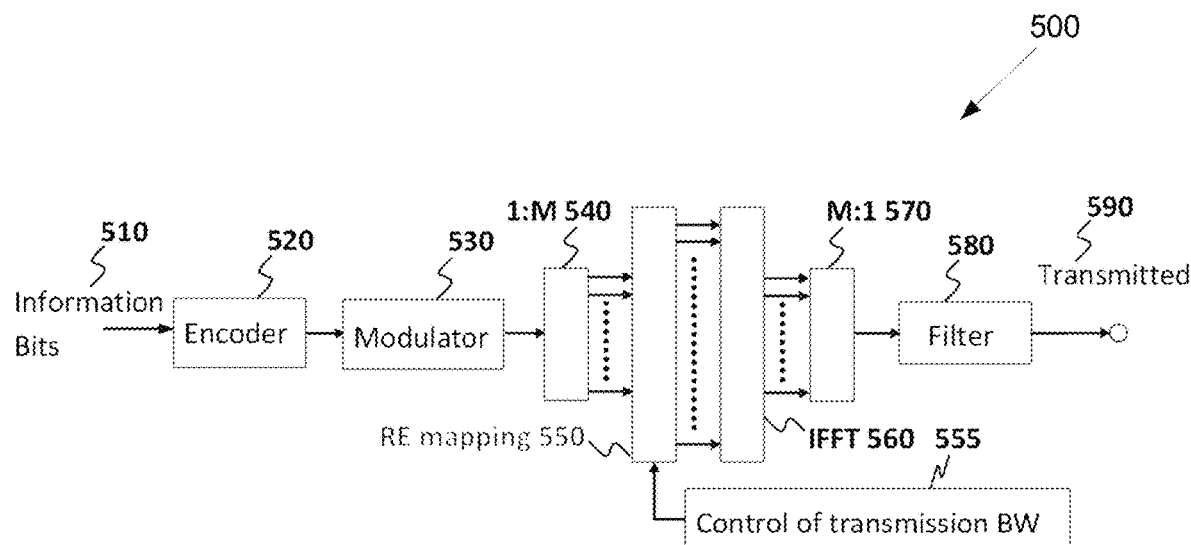
FIG. 5 illustrates a transmitter block diagram for a PDSCH in a subframe according to embodiments of the present disclosure.

FIG. 5 illustrates a transmitter block diagram 500 for a PDSCH in a subframe according to embodiments of the present disclosure. The embodiment of the transmitter block diagram 500 illustrated in FIG. 5 is for illustration only. FIG. 5 does not limit the scope of this disclosure to any particular implementation of the transmitter block diagram 500.

As shown in FIG. 5, information bits 510 are encoded by encoder 520, such as a turbo encoder, and modulated by modulator 530, for example using quadrature phase shift keying (QPSK) modulation. A serial to parallel (S/P) converter 540 generates M modulation symbols that are subsequently provided to a mapper 550 to be mapped to REs selected by a transmission BW selection unit 555 for an assigned PDSCH transmission BW, unit 560 applies an Inverse fast Fourier transform (IFFT), the output is then serialized by a parallel to serial (P/S) converter 570 to create a time domain signal, filtering is applied by filter 580, and a signal transmitted 590. Additional functionalities, such as data scrambling, cyclic prefix insertion, time windowing, interleaving, and others are well known in the art and are not shown for brevity.

Figure 6:
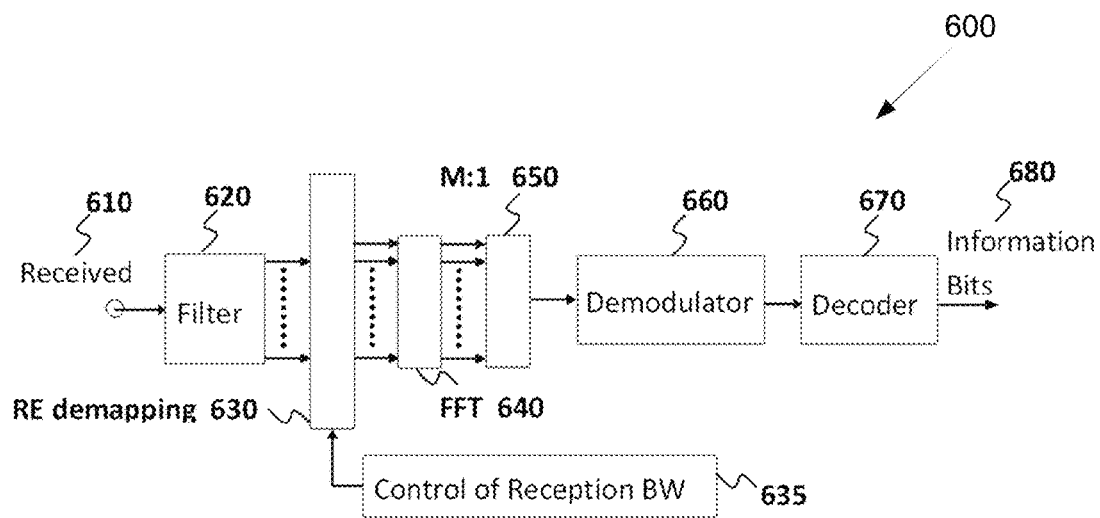
FIG. 6 illustrates a receiver block diagram for a PDSCH in a subframe according to embodiments of the present disclosure.

FIG. 6 illustrates a receiver block diagram 600 for a PDSCH in a subframe according to embodiments of the present disclosure. The embodiment of the diagram 600 illustrated in FIG. 6 is for illustration only. FIG. 6 does not limit the scope of this disclosure to any particular implementation of the diagram 600.

As shown in FIG. 6, a received signal 610 is filtered by filter 620, REs 630 for an assigned reception BW are selected by BW selector 635, unit 640 applies a fast Fourier transform (FFT), and an output is serialized by a parallel-to-serial converter 650. Subsequently, a demodulator 660 coherently demodulates data symbols by applying a channel estimate obtained from a DMRS or a CRS (not shown), and a decoder 670, such as a turbo decoder, decodes the demodulated data to provide an estimate of the information data bits 680. Additional functionalities such as time-windowing, cyclic prefix removal, de-scrambling, channel estimation, and de-interleaving are not shown for brevity.

Figure 7:
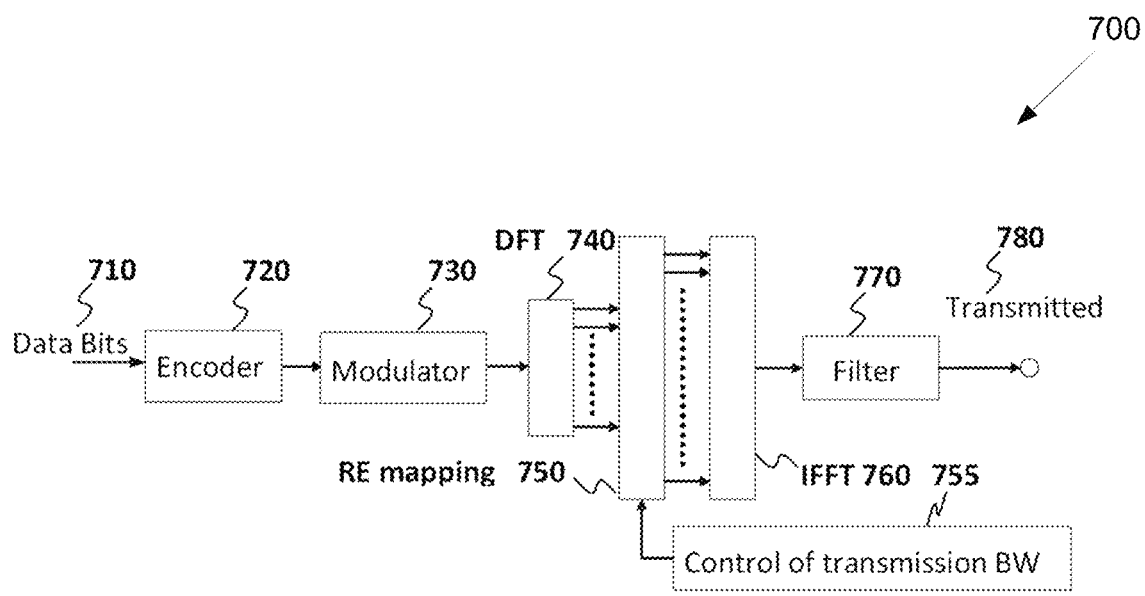
FIG. 7 illustrates a transmitter block diagram for a PUSCH in a subframe according to embodiments of the present disclosure.

FIG. 7 illustrates a transmitter block diagram 700 for a PUSCH in a subframe according to embodiments of the present disclosure. The embodiment of the block diagram 700 illustrated in FIG. 7 is for illustration only. FIG. 7 does not limit the scope of this disclosure to any particular implementation of the block diagram 700.

As shown in FIG. 7, information data bits 710 are encoded by encoder 720, such as a turbo encoder, and modulated by modulator 730. A discrete Fourier transform (DFT) unit 740 applies a DFT on the modulated data bits, REs 750 corresponding to an assigned PUSCH transmission BW are selected by transmission BW selection unit 755, unit 760 applies an IFFT and, after a cyclic prefix insertion (not shown), filtering is applied by filter 770 and a signal transmitted 780.

Figure 8:
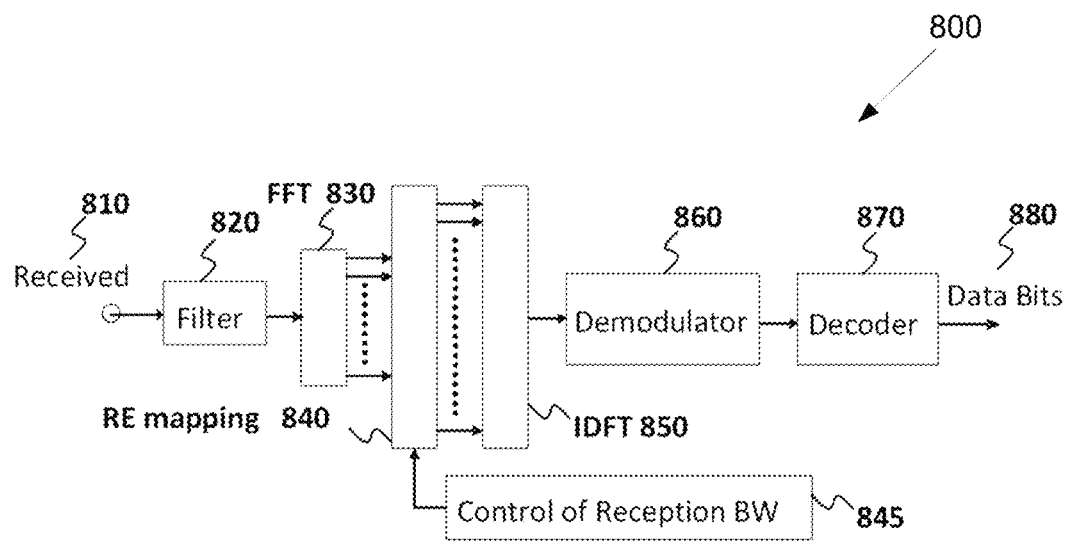
FIG. 8 illustrates a receiver block diagram for a PUSCH in a subframe according to embodiments of the present disclosure.

FIG. 8 illustrates a receiver block diagram 800 for a PUSCH in a subframe according to embodiments of the present disclosure. The embodiment of the block diagram 800 illustrated in FIG. 8 is for illustration only. FIG. 8 does not limit the scope of this disclosure to any particular implementation of the block diagram 800.

As shown in FIG. 8, a received signal 810 is filtered by filter 820. Subsequently, after a cyclic prefix is removed (not shown), unit 830 applies a FFT, REs 840 corresponding to an assigned PUSCH reception BW are selected by a reception BW selector 845, unit 850 applies an inverse DFT (IDFT), a demodulator 860 coherently demodulates data symbols by applying a channel estimate obtained from a DMRS (not shown), a decoder 870, such as a turbo decoder, decodes the demodulated data to provide an estimate of the information data bits 880.

In next generation cellular systems, various use cases are envisioned beyond the capabilities of LTE system. Termed 5G or the fifth generation cellular system, a system capable of operating at sub-6 GHz and above-6 GHz (for example, in mmWave regime) becomes one of the requirements. In 3GPP TR 22.891, 74 5G use cases has been identified and described; those use cases can be roughly categorized into three different groups. A first group is termed 'enhanced mobile broadband' (eMBB), targeted to high data rate services with less stringent latency and reliability requirements. A second group is termed "ultra-reliable and low latency (URLL)" targeted for applications with less stringent data rate requirements, but less tolerant to latency. A third group is termed "massive MTC (mMTC)" targeted for large number of low-power device connections such as 1 million per km$^2$ with less stringent the reliability, data rate, and latency requirements.

In order for the 5G network to support such diverse services with different quality of services (QoS), one method has been identified in LTE specification, called network slicing. To utilize PHY resources efficiently and multiplex various slices (with different resource allocation schemes, numerologies, and scheduling strategies) in DL-SCH, a flexible and self-contained frame or subframe design is utilized.

Figure 9:
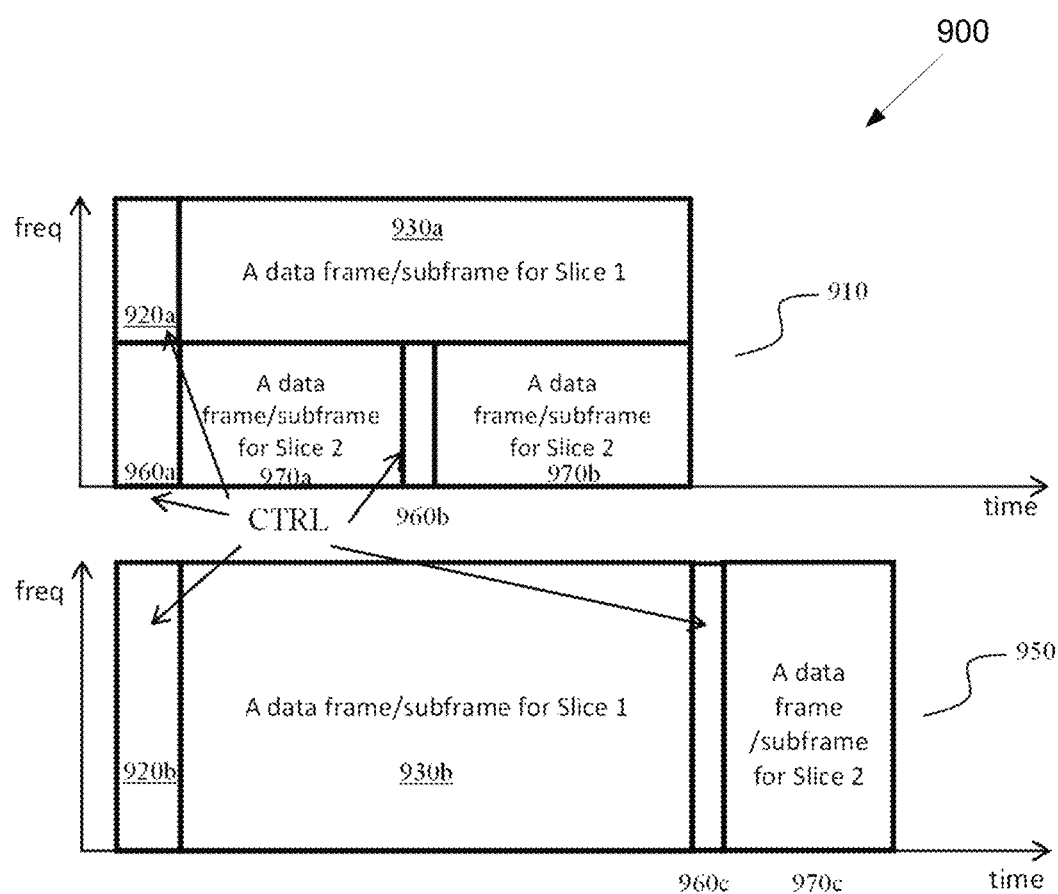
FIG. 9 illustrates an example multiplexing of two slices according to embodiments of the present disclosure.

FIG. 9 illustrates an example multiplexing of two slices 900 according to embodiments of the present disclosure. The embodiment of the multiplexing of two slices 900 illustrated in FIG. 9 is for illustration only. FIG. 9 does not limit the scope of this disclosure to any particular implementation of the multiplexing of two slices 900.

Two exemplary instances of multiplexing two slices within a common subframe or frame are depicted in FIG. 9. In these exemplary embodiments, a slice can be composed of one or two transmission instances where one transmission instance includes a control (CTRL) component (e.g., 920*a*, 960*a*, 960*b*, 920*b*, or 960*c*) and a data component (e.g., 930*a*, 970*a*, 970*b*, 930*b*, or 970*c*). In embodiment 910, the two slices are multiplexed in frequency domain whereas in embodiment 950, the two slices are multiplexed in time domain. These two slices can be transmitted with different sets of numerology.

LTE specification supports up to 32 CSI-RS antenna ports which enable an eNB to be equipped with a large number of antenna elements (such as 64 or 128). In this case, a plurality of antenna elements is mapped onto one CSI-RS port. For next generation cellular systems such as 5G, the maximum number of CSI-RS ports can either remain the same or increase.

Figure 10:
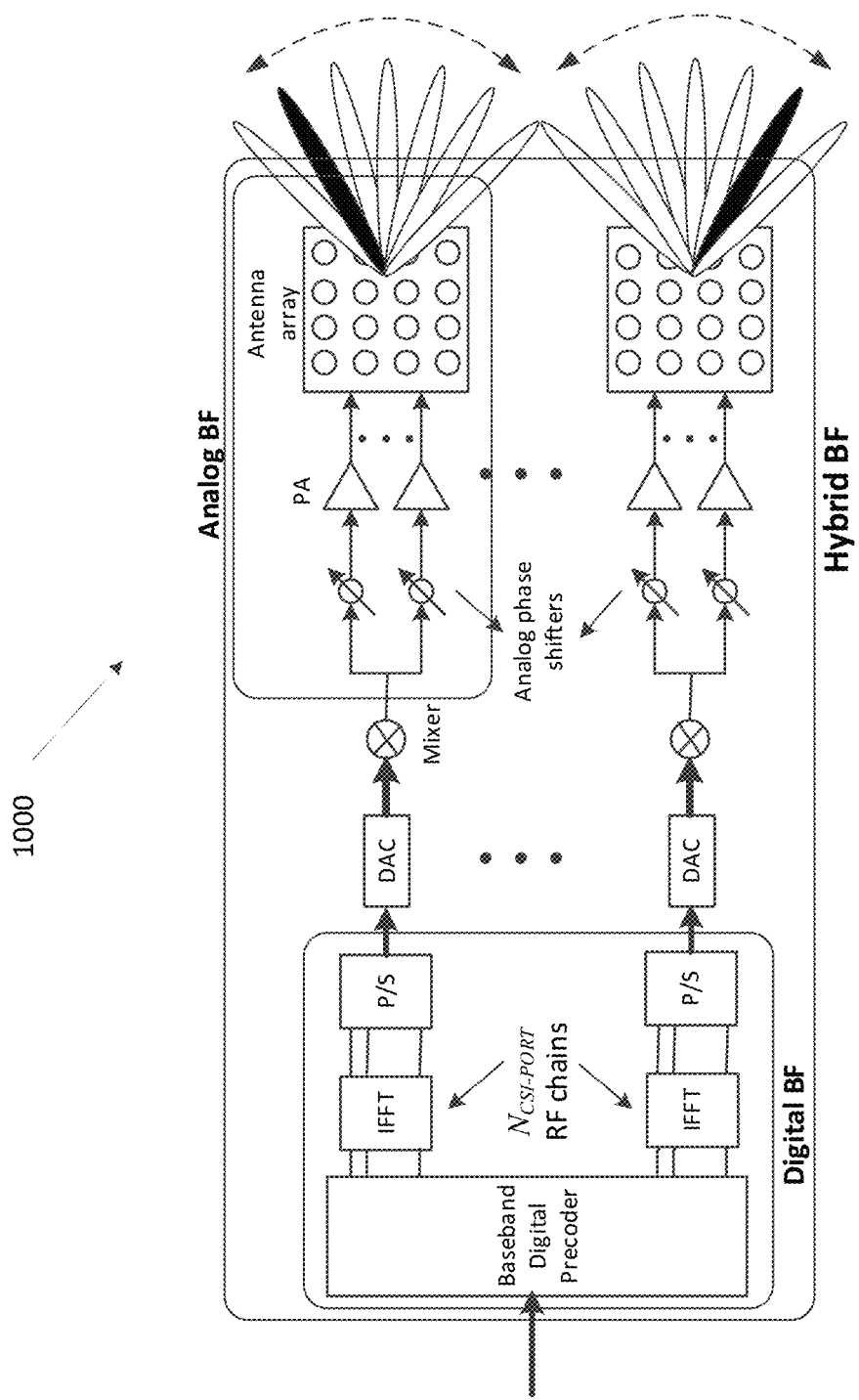
FIG. 10 illustrates an example antenna blocks according to embodiments of the present disclosure.

FIG. 10 illustrates an example antenna blocks 1000 according to embodiments of the present disclosure. The embodiment of the antenna blocks 1000 illustrated in FIG. 10 is for illustration only. FIG. 10 does not limit the scope of this disclosure to any particular implementation of the antenna blocks 1000.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 10. In this case, one CSI-RS port is mapped onto a large number of antenna elements which can be controlled by a bank of analog phase shifters. One CSI-RS port can then correspond to one sub-array which produces a narrow analog beam through analog beamforming. This analog beam can be configured to sweep across a wider range of angles by varying the phase shifter bank across symbols or subframes. The number of sub-arrays (equal to the number of RF chains) is the same as the number of CSI-RS ports $N_{CSI-PORT}$. A digital beamforming unit performs a linear combination across $N_{CSI-PORT}$ analog beams to further increase precoding gain. While analog beams are wideband (hence not frequency-selective), digital precoding can be varied across frequency sub-bands or resource blocks.

In a 3GPP LTE communication system, network access and radio resource management (RRM) are enabled by physical layer synchronization signals and higher (MAC) layer procedures. In particular, a UE attempts to detect the presence of synchronization signals along with at least one cell ID for initial access. Once the UE is in the network and associated with a serving cell, the UE monitors several neighboring cells by attempting to detect their synchronization signals and/or measuring the associated cell-specific RSs (for instance, by measuring their RSRPs). For next generation cellular systems such as 3GPP NR (new radio access or interface), efficient and unified radio resource acquisition or tracking mechanism which works for various use cases (such as eMBB, URLLC, mMTC, each corresponding to a different coverage requirement) and frequency bands (with different propagation losses) is desirable. Most likely designed with a different network and radio resource paradigm, seamless and low-latency RRM is also desirable. Such goals pose at least the following problems in designing an access, radio resource, and mobility management framework.

First, since NR is likely to support even more diversified network topology, the notion of cell can be redefined or replaced with another radio resource entity. As an example, for synchronous networks, one cell can be associated with a plurality of TRPs (transmit-receive points) similar to a COMP (coordinated multipoint transmission) scenario in LTE specification. In this case, seamless mobility is a desirable feature.

Second, when large antenna arrays and beamforming are utilized, defining radio resource in terms of beams (although possibly termed differently) can be a natural approach. Given that numerous beamforming architectures can be utilized, an access, radio resource, and mobility management framework which accommodates various beamforming architectures (or, instead, agnostic to beamforming architecture) is desirable.

Figure 11:
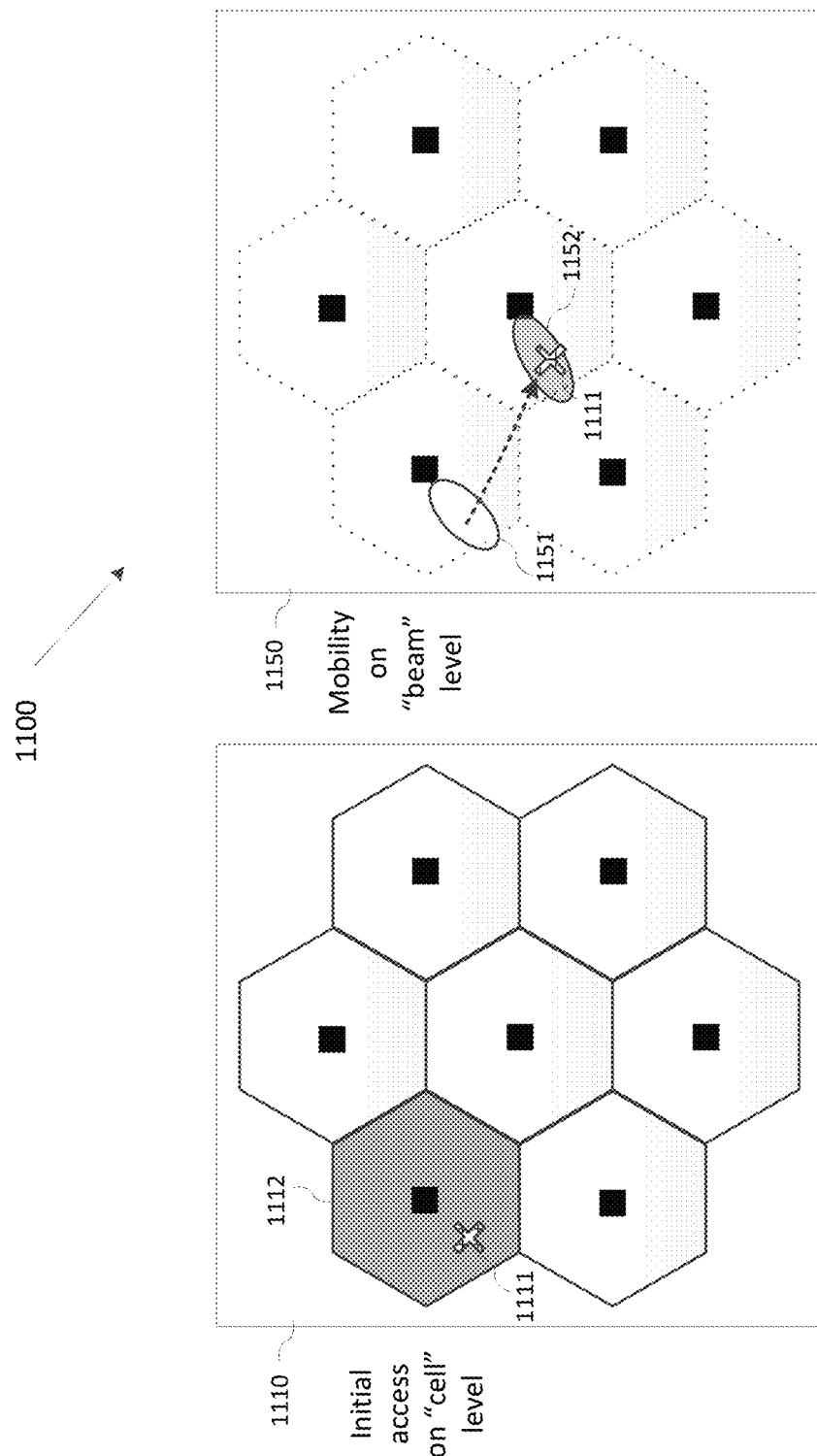
FIG. 11 illustrates an example UE mobility scenario according to embodiments of the present disclosure.

FIG. 11 illustrates an example UE mobility scenario 1100 according to embodiments of the present disclosure. The embodiment of the UE mobility scenario 1100 illustrated in FIG. 11 is for illustration only. FIG. 11 does not limit the scope of this disclosure to any particular implementation of the UE mobility scenario 1100.

For instance, the framework may be applicable for or agnostic to whether one beam is formed for one CSI-RS port (for instance, where a plurality of analog ports are connected to one digital port, and a plurality of widely separated digital ports are utilized) or one beam is formed by a plurality of CSI-RS ports. In addition, the framework may be applicable whether beam sweeping (as illustrated in FIG. 11) is used or not.

Third, different frequency bands and use cases impose different coverage limitations. For example, mmWave bands impose large propagation losses. Therefore, some form of coverage enhancement scheme is needed. Several candidates include beam sweeping (as shown in FIG. 10), repetition, diversity, and/or multi-TRP transmission. For mMTC where transmission bandwidth is small, time-domain repetition is needed to ensure sufficient coverage.

A UE-centric access which utilizes two levels of radio resource entity is described in FIG. 11. These two levels can be termed as "cell" and "beam". These two terms are exemplary and used for illustrative purposes. Other terms such as radio resource (RR) 1 and 2 can also be used. Additionally, the term "beam" as a radio resource unit is to be differentiated with, for instance, an analog beam used for beam sweeping in FIG. 10.

As shown in FIG. 11, the first RR level (termed "cell") applies when a UE enters a network and therefore is engaged in an initial access procedure. In 1110, a UE 1111 is connected to cell 1112 after performing an initial access procedure which includes detecting the presence of synchronization signals. Synchronization signals can be used for coarse timing and frequency acquisitions as well as detecting the cell identification (cell ID) associated with the serving cell. In this first level, the UE observes cell boundaries as different cells can be associated with different cell IDs. In FIG. 11, one cell is associated with one TRP (in general, one cell can be associated with a plurality of TRPs). Since cell ID is a MAC layer entity, initial access involves not only physical layer procedure(s) (such as cell search via synchronization signal acquisition) but also MAC layer procedure(s).

The second RR level (termed "beam") applies when a UE is already connected to a cell and hence in the network. In this second level, a UE 1111 can move within the network without observing cell boundaries as illustrated in embodiment 1150. That is, UE mobility is handled on beam level rather than cell level, where one cell can be associated with Nbeams (N can be 1 or >1). Unlike cell, however, beam is a physical layer entity. Therefore, UE mobility management is handled solely on physical layer. An example of UE mobility scenario based on the second level RR is given in embodiment 1150 of FIG. 11.

After the UE 1111 is associated with the serving cell 1112, the UE 1111 is further associated with beam 1151. This is achieved by acquiring a beam or radio resource (RR) acquisition signal from which the UE can acquire a beam identity or identification. An example of beam or RR acquisition signal is a measurement reference signal (RS). Upon acquiring a beam (or RR) acquisition signal, the UE 1111 can report a status to the network or an associated TRP. Examples of such report include a measured beam power (or measurement RS power) or a set of at least one recommended "beam identity (ID)" or "RR-ID". Based on this report, the network or the associated TRP can assign a beam (as a radio resource) to the UE 1111 for data and control transmission. When the UE 1111 moves to another cell, the boundary between the previous and the next cells is neither observed nor visible to the UE 1111. Instead of cell handover, the UE 1111 switches from beam 1151 to beam 1152. Such a seamless mobility is facilitated by the report from UE 711 to the network or associated TRP—especially when the UE 1111 reports a set of M>1 preferred beam identities by acquiring and measuring Mbeam (or RR) acquisition signals.

Figure 12:
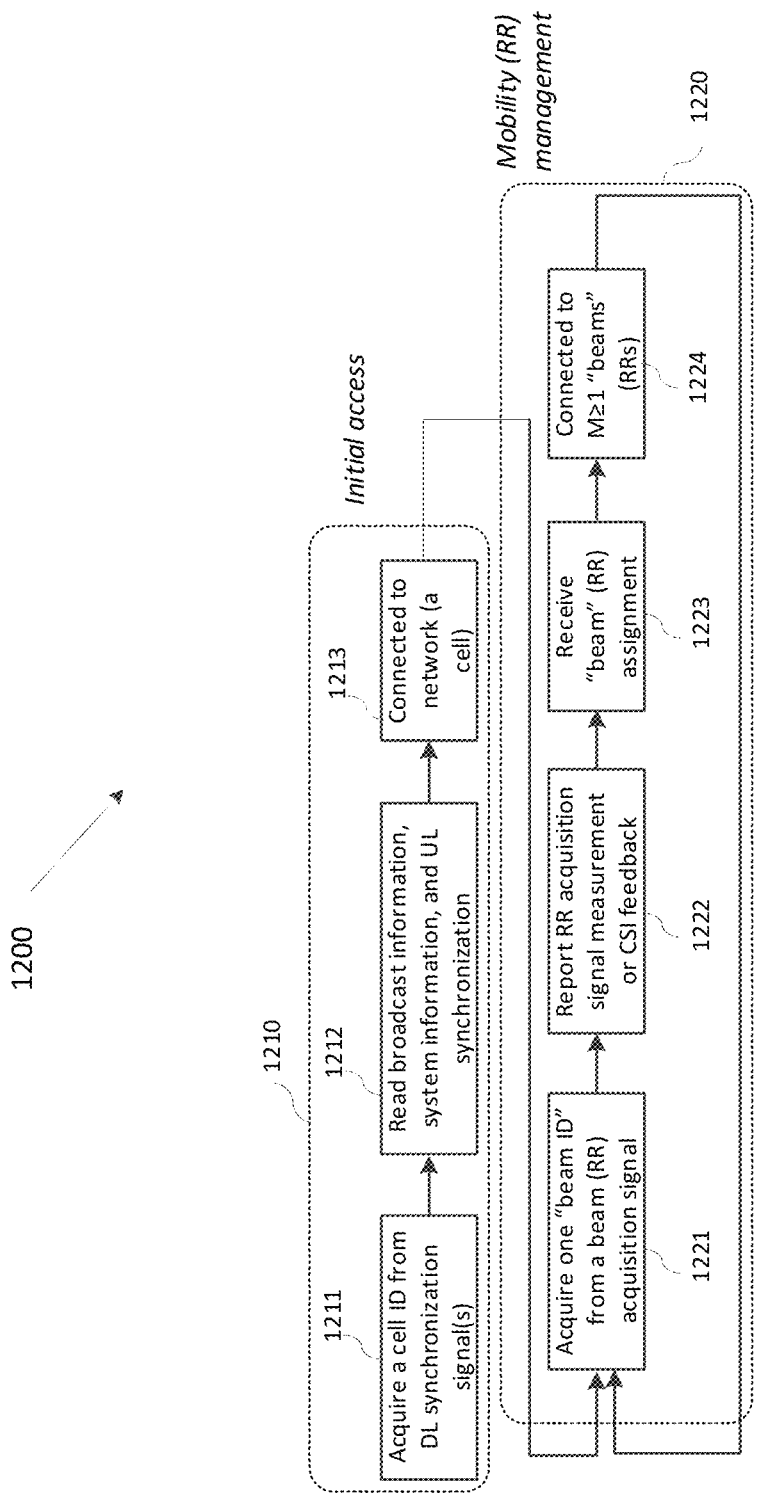
FIG. 12 illustrates an example beam sweeping operation according to embodiments of the present disclosure.

FIG. 12 illustrates an example beam sweeping operation 1200 according to embodiments of the present disclosure. The embodiment of the beam sweeping operation 1200 illustrated in FIG. 12 is for illustration only. FIG. 12 does not limit the scope of this disclosure to any particular implementation of the beam sweeping operation 1200.

As shown in FIG. 12, the aforementioned initial access procedure 1210 and the aforementioned mobility or radio resource management 1220 from the perspective of a UE are described. The initial access procedure 1210 includes cell ID acquisition from DL synchronization signal(s) 1211 as well as retrieval of broadcast information (along with system information required by the UE to establish DL and UL connections) followed by UL synchronization (which can include random access procedure). Once the UE completes 1211 and 1212, the UE is connected to the network and associated with a cell. Following the completion of initial access procedure, the UE, possibly mobile, is in an RRM state described in 1220. This state includes, first, an acquisition stage 1221 where the UE can periodically (repeatedly) attempt to acquire a "beam" or RR ID from a "beam" or RR acquisition signal (such as a measurement RS).

The UE can be configured with a list of beam/RR IDs to monitor. This list of "beam"/RR IDs can be updated or reconfigured by the TRP/network. This configuration can be signaled via higher-layer (such as RRC) signaling or a dedicated L1 or L2 control channel. Based on this list, the UE can monitor and measure a signal associated with each of these beam/RR IDs. This signal can correspond to a measurement RS resource such as that analogous to CSI-RS resource in LTE system. In this case, the UE can be configured with a set of K>1 CSI-RS resources to monitor. Several options are possible for measurement report 1222. First, the UE can measure each of the K CSI-RS resources, calculate a corresponding RS power (similar to RSRP or RSRQ in LTE system), and report the RS power to the TRP (or network). Second, the UE can measure each of the K CSI-RS resources, calculate an associated CSI (which can include CQI and potentially other CSI parameters such as RI and PMI), and report the CSI to the TRP (or network). Based on the report from the UE, the UE is assigned M>1 "beams" or RRs either via a higher-layer (RRC) signaling or an L1/L2 control signaling 1223. Therefore, the UE is connected to these M "beams"/RRs.

For certain scenarios such as asynchronous networks, the UE can fall back to cell ID based or cell-level mobility management similar to 3GPP LTE system. Therefore, only one of the two levels of radio resource entity (cell) is applicable. When a two-level ("cell" and "beam") radio resource entity or management is utilized, synchronization signal(s) can be designed primarily for initial access into the network. For mmWave systems where analog beam sweeping (as shown in FIG. 12) or repetition may be used for enhancing the coverage of common signals (such as synchronization signal(s) and broadcast channel), synchronization signals can be repeated across time (such as across OFDM symbols or slots or subframes). This repetition factor, however, is not necessarily correlated to the number of supported "beams" (defined as radio resource units, to be differentiated with the analog beams used in beam sweeping) per cell or per TRP. Therefore, beam identification (ID) is not acquired or detected from synchronization signal(s). Instead, beam ID is carried by a beam (RR) acquisition signal such as measurement RS. Likewise, beam (RR) acquisition signal does not carry cell ID (hence, cell ID is not detected from beam or RR acquisition signal).

Therefore, considering the above new challenges in initial access procedure and RRM for the new radio access technology (NR), there is a need for designing synchronization signals (along with their associated UE procedures) and primary broadcast channel which carries broadcast information (e.g., master information block or MIB).

In the present disclosure, numerology refers to a set of signal parameters which can include subframe duration, sub-carrier spacing, cyclic prefix length, transmission bandwidth, or any combination of these signal parameters.

For LTE, primary and secondary synchronization signals (PSS and SSS, respectively) are used for coarse timing and frequency synchronization and cell ID acquisition. Since PSS/SSS is transmitted twice per 10 ms radio frame and time-domain enumeration is introduced in terms of system frame number (SFN, included in the MIB), frame timing is detected from PSS/SSS to avoid the need for increasing the detection burden from PBCH.

In addition, cyclic prefix (CP) length and, if unknown, duplexing scheme can be detected from PSS/SSS. The PSS is constructed from a frequency-domain ZC sequence of length 63, with the middle element truncated to avoid using the d.c. subcarrier. Three roots are selected for PSS to represent the three physical layer identities within each group of cells. The SSS sequences are based on the maximum length sequences (also known as M-sequences). Each SSS sequence is constructed by interleaving two length-31 BPSK modulated sequences in frequency domain, where the two source sequences before modulation are different cyclic shifts of the same M-sequence.

The cyclic shift indices are constructed from the physical cell ID group. Since PSS/SSS detection can be faulty (due to, for instance, non-idealities in the auto- and cross-correlation properties of PSS/SSS and lack of CRC protection), cell ID hypotheses detected from PSS/SSS may occasionally be confirmed via PBCH detection. PBCH is primarily used to signal the master block information (MIB) which consists of DL and UL system bandwidth information (3 bits), PHICH information (3 bits), and SFN (8 bits). Adding 10 reserved bits (for other uses such as MTC), the MIB payload amounts to 24 bits.

After appended with a 16-bit CRC, a rate-⅓ tail-biting convolutional coding, 4× repetition, and QPSK modulation are applied to the 40-bit codeword. The resulting QPSK symbol stream is transmitted across 4 subframes spread over 4 radio frames. Other than detecting MIB, blind detection of the number of CRS ports is also needed for PBCH. In LTE, the 8-bit SFN in the PBCH is the most significant bit (MSB) and updated every 40 ms. The 2-bit least significant bit (LSB) of radio frame number is not explicitly indicated in PBCH payload. The UE relies on the blind detection of 4 possible phases for the PBCH scrambling code to identify the LSB so that the four times of NR-PBCH transmission can be coherently combined within 40 ms. TABLE 1 shows PSS/SSS/PBCH for LTE system design.

TABLE 1

LTE PSS/SSS/PBCH

| LTE design | PSS/SSS | PBCH |
|---|---|---|
| Function | Coarse T/F & cell ID acquisition | MIB acquisition, [confirming cell ID acquisition] |
| Parameters included | Cell ID (504 hypotheses), frame timing (2 hypotheses) | MIB: system BW (3 bits), PHICH info (3 bits), System frame number (SFN): 8-bit MSB of radio frame number reserved bits (10 bits) |
| Need for blind detection | CP size, [TDD vs. FDD] | Number of antenna ports (1, 2 or 4 ports) by checking 3 CRC mask 2-bit LSB of radio frame number within 40 ms (1, 2, 3, 4) |
| Reliability | Low to moderate | High (protected with 16-bit CRC + 1/48 effective code rate) |

The essential system information indicated by LTE eNB over logical channel in the BCH or DL SCH. There are two parts in SI static part and dynamic part. Static part is called as MIB and is transmitted using BCH and carried by PBCH once every 40 ms. MIB carries useful information which includes channel bandwidth, PHICH configuration details; transmit power, no. of antennas and SIB scheduling information transmitted along with other information on the DL-SCH. Dynamic part is called as SIB and is mapped on RRC SI messages (SI-1, 2, 3, 4, 5, 6, 7, 8, 9, 10, 11) over DL-SCH and transmitted using PDSCH at periodic intervals. SI-1 transmitted every 80 ms, SI-2 every 160 ms and SI-3 every 320 ms. System Information Blocks are grouped in SI containers. Each SI is composed of multiple Ms. Each SI usually may have different transmission frequency and may be sent in a single sub-frame. SIBs are transmitted using BCCH mapped on DL-SCH which in turn mapped on PDSCH.

However, the NR's carrier frequency as well as bandwidth is different. For NR, the transmission bandwidth containing synchronization signals and PBCH is supposed to be larger than LTE. Moreover, the conventional periodic CRS may not be available as LTE. The NR requires new designs, as well as the corresponding transmission schemes;

NR defines at least two types of synchronization signals; NR-PSS and NR-SSS. NR-PSS is defined at least for initial symbol boundary synchronization to the NR cell. NR-SSS is defined for detection of NR cell ID or at least part of NR cell ID. At least one broadcast channel (NR-PBCH) is defined. NR-PBCH is a non-scheduled broadcast channel carrying at least a part of minimum system information with fixed payload size and periodicity predefined in the specification depending on carrier frequency range.

In both single beam and multi-beam scenario, time division multiplexing of PSS, SSS, and PBCH is supported. NR-PSS, NR-SSS and NR-PBCH can be transmitted within a SS block. For a given frequency band, an SS block corresponds to N OFDM symbols based on the default subcarrier spacing, and N is a constant. The signal multiplexing structure is fixed in a specification. A UE may be able to identify at least OFDM symbol index, slot index in a radio frame and radio frame number from an SS block.

In an SS block, there are at least two types of synchronization signals: NR-PSS and NR-SSS. NR-PSS is defined for initial symbol boundary synchronization to the NR cell and NR-SSS is defined for detecting NR cell ID or at least part of cell ID. There are at most (N−2) NR-PBCH symbol(s) in a SS block. Also, the UE monitoring bandwidth for NR-PBCH decoding may be limited considering the complexity and power consumption in cell (re)selection procedure in IDLE mode. Same or slightly wider bandwidth compared with NR-PSS/SSS can be considered as baseline.

Figure 13:
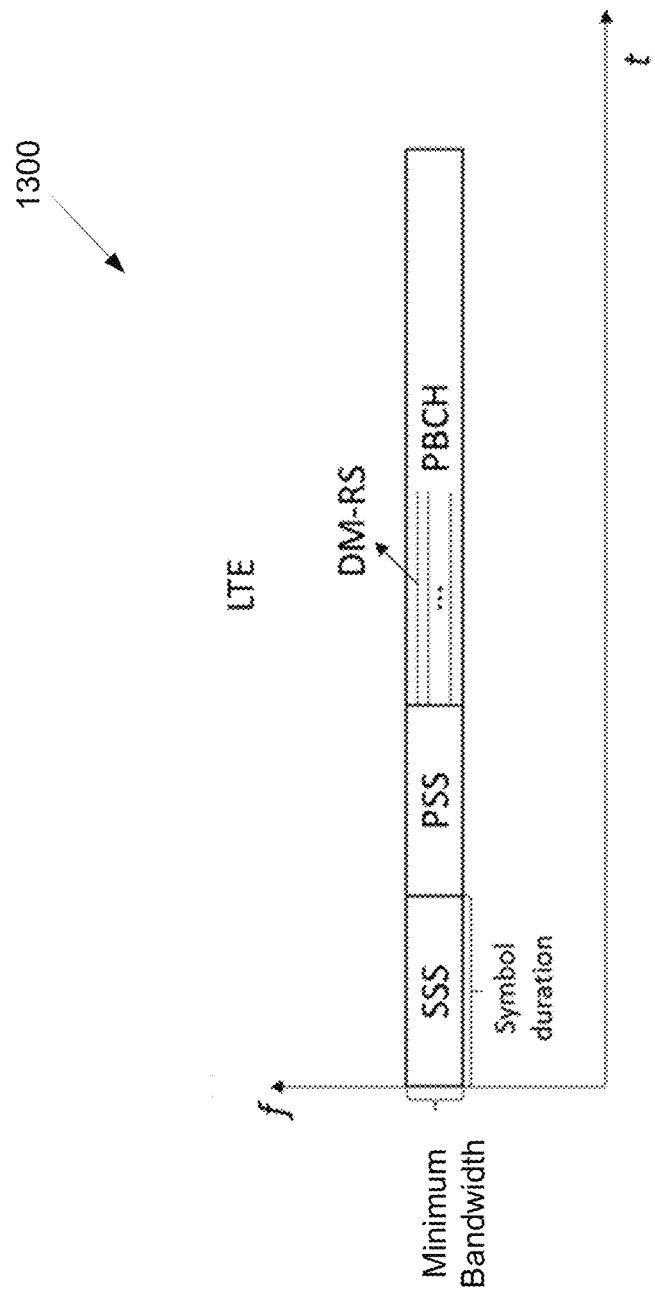
FIG. 13 illustrates an example SSS/PSS/PBCH in LTE according to embodiments of the present disclosure.

FIG. 13 illustrates an example SSS/PSS/PBCH in LTE 1300 according to embodiments of the present disclosure. The embodiment of the SSS/PSS/PBCH in LTE 1300 illustrated in FIG. 13 is for illustration only. FIG. 13 does not limit the scope of this disclosure to any particular implementation.

In LTE, 12×6 RBs×4 symbols=12×24=288 REs are available for PBCH and CRS with 48 REs multiplexed on PBCH symbols with 10 ms periodicity, and 240 REs are used for PBCH having 40 bit payload size as shown in FIG. 13. The CRS are used for demodulating PBCH.

The NR-PBCH payload size can be larger than that of PBCH, considering the multi-beam sweeping. The beam sweeping is used to send NR-PSS/SSS/PBCH and the number of beams is configurable. A small number of wide beams may be considered in case of carrier frequency<6 GHz; while a large number of narrow beams may be used in carrier frequency>6 GHz, such as 30 GHz, to combat with significant path loss/shadowing and extend the coverage.

Figure 14:
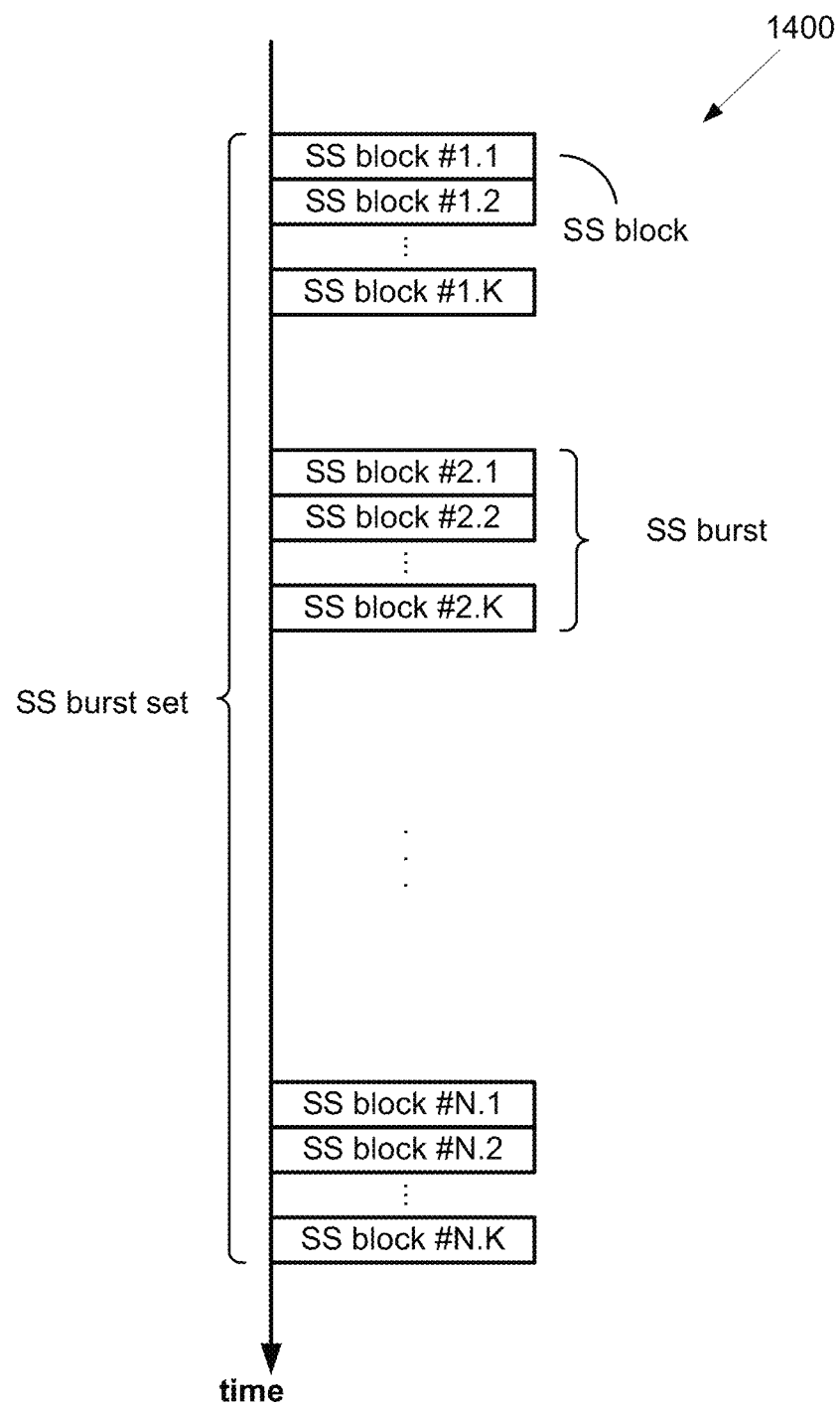
FIG. 14 illustrates a multi-beam NR-PSS/SSS/PBCH according to embodiments of the present disclosure.

FIG. 14 illustrates an example multi-beam NR-PSS/SSS/PBCH 1400 according to embodiments of the present disclosure. The embodiment of the multi-beam NR-PSS/SSS/PBCH 1400 illustrated in FIG. 14 is for illustration only. FIG. 14 does not limit the scope of this disclosure to any particular implementation.

The beam sweeping for multi-beam NR-PSS/SSS/PBCH is illustrated in FIG. 14, where a SS burst set is consisting of multiple non-contiguous SS bursts and each SS burst include multiple SS blocks, which are located in consecutive symbols or slots. The SS burst set is used to carry out the beam sweeping over the whole cell coverage. A DL SS slot is defined as a DL slot with predefined duration containing the DL SS block(s). Note that there can be other terminology regarding the same meaning for "SS slot."

For example, the predefined duration is a subframe of 1 ms and one or more than one SS blocks (with predefined number of SS blocks/positions) are put within the same subframe, they together can be considered as a DL SS slot. In each SS block, there are NR-PSS/SSS/NR-PBCH, which are sent by gNB/TRP with a beamforming/precoding/antenna weights/spatial filtering. The information related to the SS burst set include the SS burst set periodicity, the number of SS burst(s) per SS burst set, the number of SS blocks per burst, the frequency offset of the SS burst set, the time offset of each burst, the time offset of each SS block in a burst, etc. Some of the information can be fixed to reduce the signaling overhead as well as the complexity and power saving for UE searching, e.g., the SS burst set periodicity, the time offset of the $1^{st}$ SS block per SS burst, etc.

In some embodiments for designing of NR-SS block with 288 REs per symbol, the maximum number of resource elements available within one OFDM symbol for transmitting NR-PSS is 288 (equivalent to 24 RBs), which corresponds to: frequency range A associated with 15 kHz subcarrier spacing and 5 MHz NR-PSS transmission bandwidth (including guard band); frequency range B associated with 30 kHz subcarrier spacing and 10 MHz NR-PSS transmission bandwidth (including guard band); frequency range C associated with 60 kHz subcarrier spacing and 20 MHz NR-PSS transmission bandwidth (including guard band); frequency range D associated with 120 kHz subcarrier spacing and 40 MHz NR-PSS transmission bandwidth (including guard band); and/or frequency range E associated with 240 kHz subcarrier spacing and 80 MHz NR-PSS transmission bandwidth (including guard band).

For example, frequency range A can be around 0 to 2 GHz, frequency range B can be around 2 to 6 GHz, frequency range D can be above 6 GHz. For another example, frequency range A can be around 0 to 2 GHz, frequency range B can be around 2 to 6 GHz, frequency range E can be above 6 GHz. For yet another example, frequency range A can be around 0 to 6 GHz, frequency range D can be above 6 GHz. For yet another example, frequency range A can be around 0 to 6 GHz, frequency range E can be above 6 GHz. TABLE 2A-1, TABLE 2A-2, TABLE 2B-1, and TABLE 2B-2 show NR-SS designs.

TABLE 2A-1

NR-SS design with 288REs per symbol and NR-SS burst set periodicity of 10 ms

| | SCS (kHz) | symbol length (us) | CP length (us) | Max. num. of SS blocks | Avg. num. of OFDM symbols per block | Periodicity (ms) | Overhead in time |
|---|---|---|---|---|---|---|---|
| LTE | 15 | 66.67 | 4.67 | 1 | 4 | 5 | 5.7% |
| NR (<6 GHz) | 15 | 66.67 | 4.67 | 2 | 4 | 10 | 5.7% |
| | 30 | 33.33 | 2.33 | 4 | 4 | 10 | 5.7% |
| | 60 | 16.67 | 1.17 | 8 | 4 | 10 | 5.7% |
| NR (>6 GHz) | 120 | 8.33 | 0.58 | 16 | 4 | 10 | 5.7% |
| | 240 | 4.17 | 0.29 | 32 | 4 | 10 | 5.7% |

TABLE 2A-2

NR-SS design with 288REs per symbol and NR-SS burst set periodicity of 10 ms

| | Num. of RBs | Num. of REs | minBW (MHz) | sysBW (MHz) | Overhead in freq. | Total overhead |
|---|---|---|---|---|---|---|
| LTE | 6 | 72 | 1.08 | 10 | 10.8% | 0.6% |
| NR (<6 GHz) | 24 | 288 | 4.32 | 40 | 10.8% | 0.6% |
| | 24 | 288 | 8.64 | 80 | 10.8% | 0.6% |
| | 24 | 288 | 17.28 | 160 | 10.8% | 0.6% |
| NR (>6 GHz) | 24 | 288 | 34.56 | 320 | 10.8% | 0.6% |
| | 24 | 288 | 69.12 | 640 | 10.8% | 0.6% |

TABLE 2B-1

NR-SS design with 288REs per symbol and
NR-SS burst set periodicity of 20 ms

|  | SCS (kHz) | symbol length (us) | CP length (us) | Max. num. of SS blocks | Avg. num. of OFDM symbols per block | Periodicity (ms) |
| --- | --- | --- | --- | --- | --- | --- |
| LTE | 15 | 66.67 | 4.67 | 1 | 4 | 5 |
| NR | 15 | 66.67 | 4.67 | 4 | 4 | 20 |
| (<6 GHz) | 30 | 33.33 | 2.33 | 8 | 4 | 20 |
|  | 60 | 16.67 | 1.17 | 16 | 4 | 20 |
| NR | 120 | 8.33 | 0.58 | 32 | 4 | 20 |
| (>6 GHz) | 240 | 4.17 | 0.29 | 64 | 4 | 20 |

TABLE 2B-2

NR-SS design with 288REs per symbol and NR-SS burst set periodicity of 20 ms

|  | Overhead in time | Num. of RBs | Num. of REs | minBW (MHz) | sysBW (MHz) | Overhead in freq. | Total overhead |
| --- | --- | --- | --- | --- | --- | --- | --- |
| LTE | 5.7% | 6 | 72 | 1.08 | 10 | 10.8% | 0.6% |
| NR | 5.7% | 24 | 288 | 4.32 | 40 | 10.8% | 0.6% |
| (<6 GHz) | 5.7% | 24 | 288 | 8.64 | 80 | 10.8% | 0.6% |
|  | 5.7% | 24 | 288 | 17.28 | 160 | 10.8% | 0.6% |
| NR | 5.7% | 24 | 288 | 34.56 | 320 | 10.8% | 0.6% |
| (>6 GHz) | 5.7% | 24 | 288 | 69.12 | 640 | 10.8% | 0.6% |

In one embodiment, the NR-SS designs with NR-SS/PBCH numerology, minimum BW as well as NR-SS burst set periodicity of 10 ms and 20 ms is illustrated in TABLE 2A-1 and TABLE 2A-2 respectively. To keep the similar overhead in time/frequency, the maximum number of SS blocks within the predefined SS burst set periodicity is scaled according to the parameter set of subcarrier spacing (SCS), minimum bandwidth (BW), system BW as well as the periodicity. The SS block index (or corresponding time index) is different for each SS block.

For example, if SCS=15 kHz*$2^n$ is defined NR-SS block, the maximum number of SS blocks is equal to $2 \times 2^n$ in case of NR SS burst set periodicity of 10 ms. Assuming a DL SS slot include a pair of DL SS blocks, the maximum number of DL SS slot number is L=$2^n$. Another example is that if SCS=15 kHz*$2^n$ is defined NR-SS block, the maximum number of SS blocks is equal to $2 \times 2^{n+1}$ in case of NR SS burst set periodicity of 20 ms. Assuming a DL SS slot include 2 DL SS blocks, the maximum number of DL SS slot number is L=$2^{n+1}$.

In some embodiments for designing of NR-SS block with 144 REs per symbol, the maximum number of resource elements available within one OFDM symbol for transmitting NR-PSS is 144 (equivalent to 12 RBs), which corresponds to: frequency range A associated with 15 kHz subcarrier spacing and 2.5 MHz NR-PSS transmission bandwidth (including guard band); frequency range B associated with 30 kHz subcarrier spacing and 5 MHz NR-PSS transmission bandwidth (including guard band); frequency range C associated with 60 kHz subcarrier spacing and 10 MHz NR-PSS transmission bandwidth (including guard band); frequency range D associated with 120 kHz subcarrier spacing and 20 MHz NR-PSS transmission bandwidth (including guard band); and/or frequency range E associated with 240 kHz subcarrier spacing and 40 MHz NR-PSS transmission bandwidth (including guard band).

For example, frequency range A can be around 0 to 2 GHz, frequency range B can be around 2 to 6 GHz, frequency range D can be above 6 GHz. For another example, frequency range A can be around 0 to 2 GHz, frequency range B can be around 2 to 6 GHz, frequency range E can be above 6 GHz. For yet another example, frequency range A can be around 0 to 6 GHz, frequency range D can be above 6 GHz. For yet another example, frequency range A can be around 0 to 6 GHz, frequency range E can be above 6 GHz. TABLE 2C-1, TABLE 2C-2, TABLE 2D-1, and TABLE 2D-2 show NR-SS designs.

TABLE 2C-1

NR-SS design with 144REs per symbol and
NR-SS burst set periodicity of 10 ms

|  | SCS (kHz) | symbol length (us) | CP length (us) | Max. num. of SS blocks | Avg. num. of OFDM symbols per block | Periodicity (ms) |
| --- | --- | --- | --- | --- | --- | --- |
| LTE | 15 | 66.67 | 4.67 | 1 | 4 | 5 |
| NR | 15 | 66.67 | 4.67 | 2 | 4 | 10 |
| (<6 GHz) | 30 | 33.33 | 2.33 | 4 | 4 | 10 |
|  | 60 | 16.67 | 1.17 | 8 | 4 | 10 |
| NR | 120 | 8.33 | 0.58 | 16 | 4 | 10 |
| (>6 GHz) | 240 | 4.17 | 0.29 | 32 | 4 | 10 |

TABLE 2C-2.

NR-SS design with 144REs per symbol and NR-SS burst set periodicity of 10 ms

|  | Overhead in time | Num. of RBs | Num. of REs | minBW (MHz) | sysBW (MHz) | Overhead in freq. | Total overhead |
| --- | --- | --- | --- | --- | --- | --- | --- |
| LTE | 5.7% | 6 | 72 | 1.08 | 10 | 10.8% | 0.6% |
| NR | 5.7% | 12 | 144 | 2.16 | 20 | 10.8% | 0.6% |
| (<6 GHz) | 5.7% | 12 | 144 | 4.32 | 40 | 10.8% | 0.6% |
|  | 5.7% | 12 | 144 | 8.64 | 80 | 10.8% | 0.6% |

TABLE 2C-2.-continued

NR-SS design with 144REs per symbol and NR-SS burst set periodicity of 10 ms

|  | Overhead in time | Num. of RBs | Num. of REs | minBW (MHz) | sysBW (MHz) | Overhead in freq. | Total overhead |
|---|---|---|---|---|---|---|---|
| NR | 5.7% | 12 | 144 | 17.28 | 160 | 10.8% | 0.6% |
| (>6 GHz) | 5.7% | 12 | 144 | 34.56 | 320 | 10.8% | 0.6% |

TABLE 2D-1

NR-SS design with 144REs per symbol and NR-SS burst set periodicity of 20 ms

|  | SCS (kHz) | symbol length (us) | CP length (us) | Max. num. of SS blocks | Avg. num. of OFDM symbols per block | Periodicity (ms) |
|---|---|---|---|---|---|---|
| LTE | 15 | 66.67 | 4.67 | 1 | 4 | 5 |
| NR | 15 | 66.67 | 4.67 | 4 | 4 | 20 |
| (<6 GHz) | 30 | 33.33 | 2.33 | 8 | 4 | 20 |
|  | 60 | 16.67 | 1.17 | 16 | 4 | 20 |
| NR | 120 | 8.33 | 0.58 | 32 | 4 | 20 |
| (>6 GHz) | 240 | 4.17 | 0.29 | 64 | 4 | 20 |

TABLE 2D-2

NR-SS design with 144REs per symbol and NR-SS burst set periodicity of 20 ms

|  | Overhead in time | Num. of RBs | Num. of REs | minBW (MHz) | sysBW (MHz) | Overhead in freq. | Total overhead |
|---|---|---|---|---|---|---|---|
| LTE | 5.7% | 6 | 72 | 1.08 | 10 | 10.8% | 0.6% |
| NR | 5.7% | 12 | 144 | 2.16 | 20 | 10.8% | 0.6% |
| (<6 GHz) | 5.7% | 12 | 144 | 4.32 | 40 | 10.8% | 0.6% |
|  | 5.7% | 12 | 144 | 8.64 | 80 | 10.8% | 0.6% |
| NR | 5.7% | 12 | 144 | 17.28 | 160 | 10.8% | 0.6% |
| (>6 GHz) | 5.7% | 12 | 144 | 34.56 | 320 | 10.8% | 0.6% |

In one embodiment, the NR-SS designs with NR-SS/PBCH numerology, minimum BW as well as NR-SS burst set periodicity of 10 ms and 20 ms is illustrated in TABLE 2C-1, TABLE 2C-2, TABLE 2D-1, and TABLE 2D-2, respectively. To keep the similar overhead in time/frequency, the maximum number of SS blocks within the predefined SS burst set periodicity is scaled according to the parameter set of subcarrier spacing (SCS), minimum bandwidth (BW), system BW as well as the periodicity. The SS block index (or corresponding time index) is different for each SS block.

For example, if SCS=15 kHz*$2^n$ is defined NR-SS block, the maximum number of SS blocks is equal to $2 \times 2^n$ in case of NR SS burst set periodicity of 10 ms. Assuming a DL SS slot include a pair of DL SS blocks, the maximum number of DL SS slot number is L=$2^n$. Another example is that if SCS=15 kHz*$2^n$ is defined NR-SS block, the maximum number of SS blocks is equal to $2 \times 2^{n+1}$ in case of NR SS burst set periodicity of 20 ms. Assuming a DL SS slot include 2 DL SS blocks, the maximum number of DL SS slot number is L=$2^{n+1}$.

Figure 15:
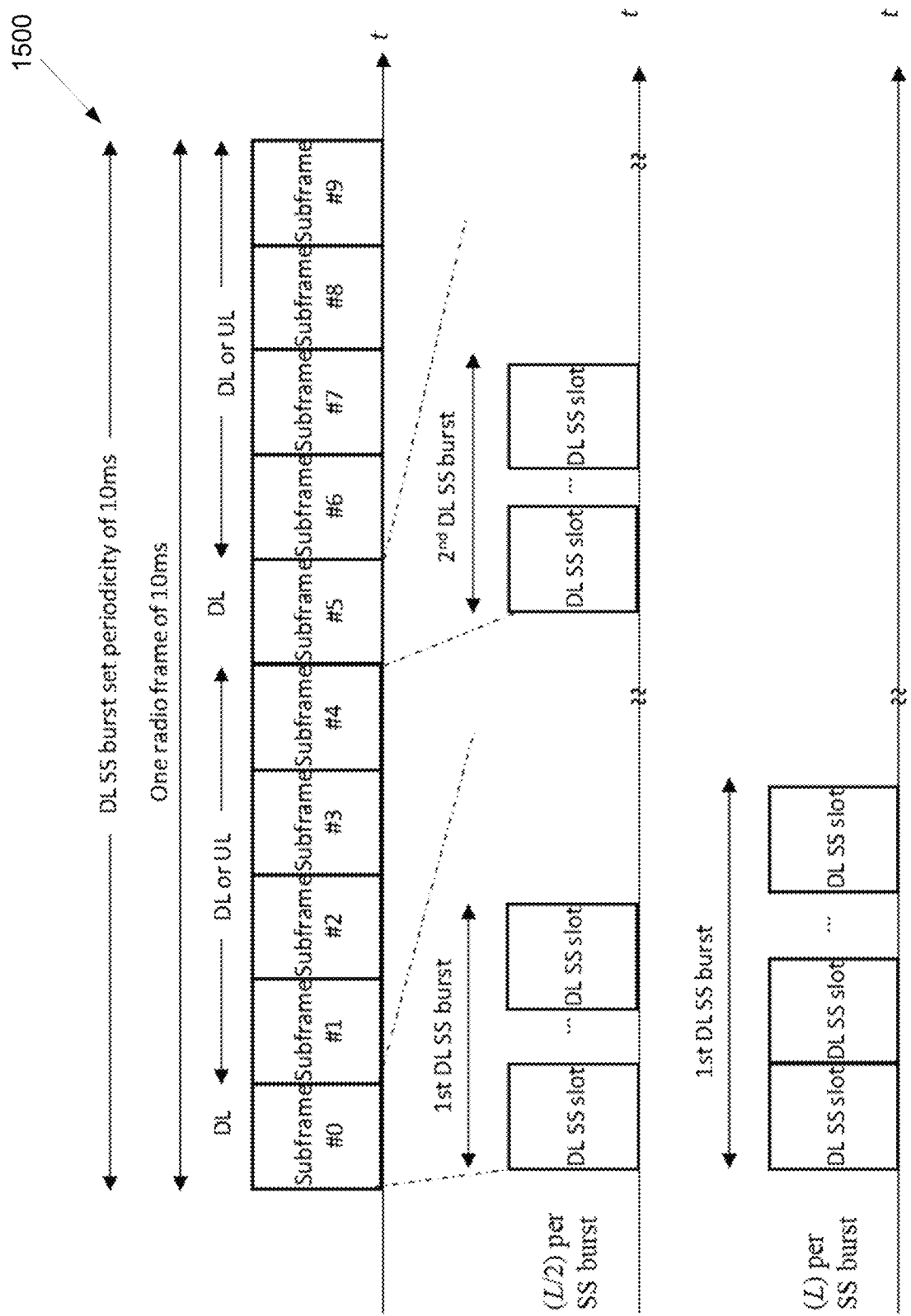
FIG. 15 illustrates an example NR-SS burst set composition according to embodiments of the present disclosure.

FIG. 15 illustrates an example NR-SS burst set composition 1500 according to embodiments of the present disclosure. The embodiment of the NR-SS burst set composition 1500 illustrated in FIG. 15 is for illustration only. FIG. 15 does not limit the scope of this disclosure to any particular implementation.

Figure 16:
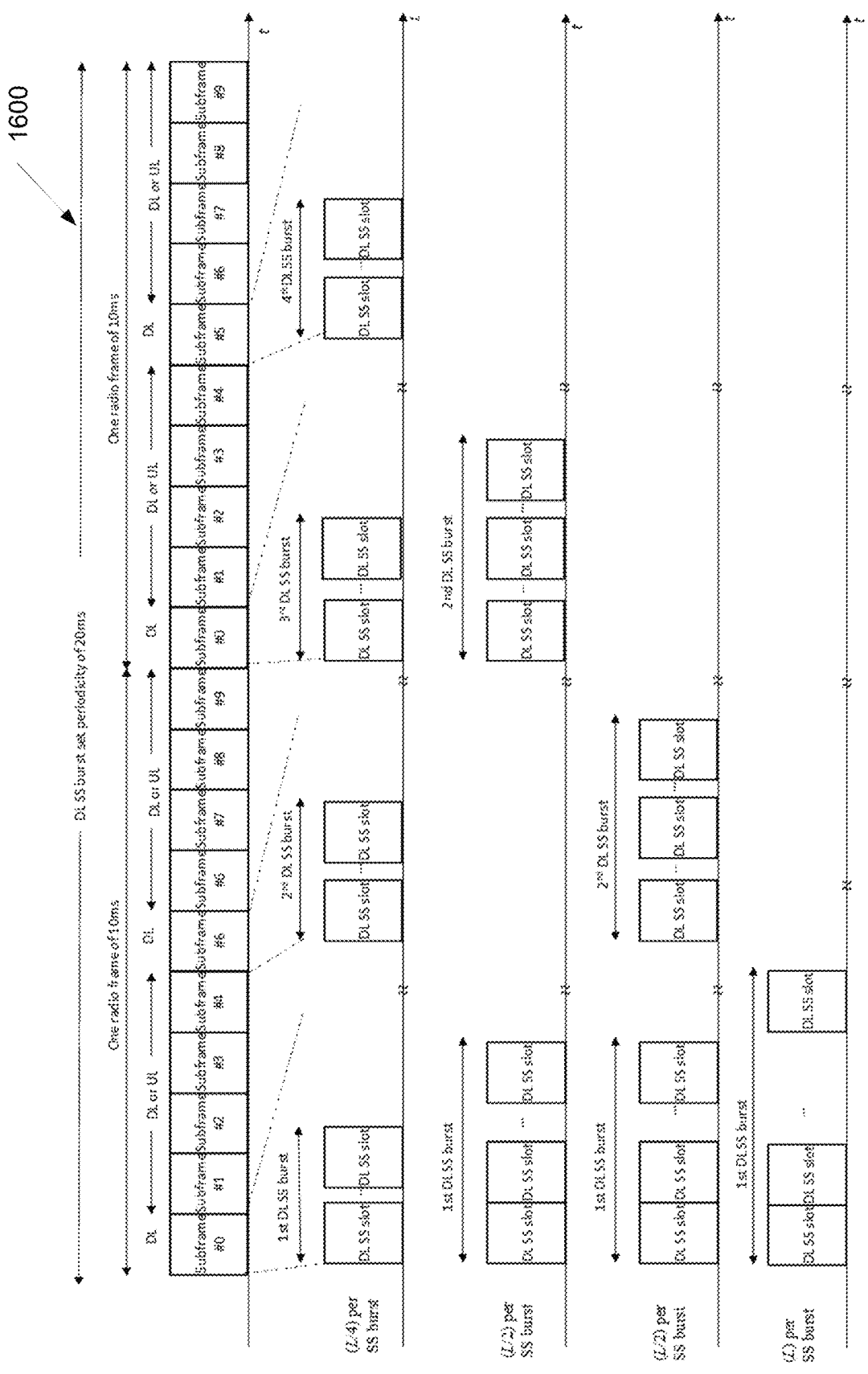
FIG. 16 illustrates another example NR-SS burst set composition according to embodiments of the present disclosure.

FIG. 16 illustrates another example NR-SS burst set composition 1600 according to embodiments of the present disclosure. The embodiment of the NR-SS burst set composition 1600 illustrated in FIG. 16 is for illustration only. FIG. 16 does not limit the scope of this disclosure to any particular implementation.

In some embodiments for designing of NR-SS burst set composition, the NR-SS burst set composition is illustrated in FIG. 15 for the case of SS burst set periodicity of 10 ms and FIG. 16 for the case of SS burst set periodicity of 20 ms, respectively.

In one embodiment of FIG. 15, there are two DL SS bursts within DL SS burst set periodicity of 10 ms, located in subframe #0 and #5 for DL transmission per a radio frame. The other subframes #1~#4 and #6~#9 per a radio frame are flexible, e.g., for TDD DL/UL configuration. Each DL SS burst has maximum (L/2) NR DL-SS slots and each DL SS slot have a pair of SS blocks. At least the NR DL-SS blocks within a DL SS burst consisting of in consecutive maximum (L/2) DL SS slots can have common the PBCH payload for coherent combining. The NR DL-SS blocks in different DL SS bursts distributed in non-consecutive DL SS slots may have different the PBCH payload.

In one embodiment, the NR SS burst index can be indicated in NR-PBCH payload and the DL SS slot index with l=1 . . . (L/2) or the DL SS block index (2l-1) or 2l with l=1 . . . (L/2) per DL SS burst is indicated by using the additional DMRS for demodulation NR-PBCH. In another embodiment, both the NR SS burst index and the DL SS slot index with l=1 . . . (L/2) or the DL SS block index (2l−1) or 2l with l=1 . . . (L/2) per DL SS burst (or equivalent to a single index indicating both timing information) is indicated by using the additional DMRS for demodulation NR-PBCH.

In one embodiment of FIG. 15, there is only one DL SS burst within DL SS burst set periodicity of 10 ms, located in subframe #0 for DL transmission per a radio frame. The other subframes #1~#9 per a radio frame are flexible, e.g., for TDD DL/UL configuration. The DL SS burst has maximum (L) NR DL-SS slots and each DL SS slot have a pair of SS blocks. The NR DL-SS blocks within a DL SS burst consisting of in consecutive maximum (L) DL SS slots can have common the PBCH payload for coherent combining. The DL SS slot index with l=1 . . . (L) or the DL SS block index (2l−1) or 2l with l=1 . . . (L) per DL SS burst is indicated by using the additional DMRS for demodulation NR-PBCH. Other examples are to place a SS burst in more than one consecutive DL subframes or put the SS bursts in more than one consecutive DL subframes.

In one embodiment of FIG. 16, there are 4 DL SS bursts within DL SS burst set periodicity of 20 ms, located in subframe #0 and #5 for DL transmission per a radio frame. The other subframes #1~#4 and #6~#9 per a radio frame are flexible, e.g., for TDD DL/UL configuration. Each DL SS burst has maximum (L/4) NR DL-SS slots and each DL SS slot have a pair of SS blocks. At least the NR DL-SS blocks within a DL SS burst consisting of in consecutive maximum (L/4) DL SS slots can have common the PBCH payload for coherent combining. The NR DL-SS blocks in different DL SS bursts distributed in non-consecutive DL SS slots may have different the PBCH payload.

In one embodiment, the NR SS burst index can be indicated in NR-PBCH payload and the DL SS slot index with l=1 . . . (L/4) or the DL SS block index (2l−1) or 2l with l=1 . . . (L/4) per DL SS burst is indicated by using the additional DMRS for demodulation NR-PBCH. In another embodiment, both the NR SS burst index and the DL SS slot index with l=1 . . . (L/4) or the DL SS block index (2l−1) or 2l with l=1 . . . (L/4) per DL SS burst (or equivalent to a single index indicating both timing information) is indicated by using the additional DMRS for demodulation NR-PBCH.

In one embodiment of FIG. 16, there are two DL SS bursts within DL SS burst set periodicity of 20 ms, located in subframe #0 or subframe #5 for DL transmission per radio frame, or located in subframe #0 and #5 of one radio frame within DL SS burst set periodicity of 20 ms. The other subframes within radio frame are flexible, e.g., for TDD DL/UL configuration. Each DL SS burst has maximum (L/2) NR DL-SS slots and each DL SS slot have a pair of SS blocks. At least the NR DL-SS blocks within a DL SS burst consisting of in consecutive maximum (L/2) DL SS slots can have common the PBCH payload for coherent combining.

The NR DL-SS blocks in different DL SS bursts distributed in non-consecutive DL SS slots may have different the PBCH payload. In one embodiment, the NR SS burst index can be indicated in NR-PBCH payload and the DL SS slot index with l=1 . . . (L/2) or the DL SS block index (2l−1) or 2l with l=1 . . . (L/2) per DL SS burst is indicated by using the additional DMRS for demodulation NR-PBCH. In another embodiment, both the NR SS burst index and the DL SS slot index with l=1 . . . (L/2) or the DL SS block index (2l−1) or 2l with l=1 . . . (L/2) per DL SS burst (or equivalent to a single index indicating both timing information) is indicated by using the additional DMRS for demodulation NR-PBCH.

In one embodiment of FIG. 16, there is only one DL SS burst within DL SS burst set periodicity of 20 ms, located in subframe #0 for DL transmission per a radio frame. The other subframes in DL SS burst set periodicity of 20 ms are flexible, e.g., for TDD DL/UL configuration. The DL SS burst has maximum (L) NR DL-SS slots and each DL SS slot have a pair of SS blocks. The NR DL-SS blocks within a DL SS burst consisting of in consecutive maximum (L) DL SS slots can have common the PBCH payload for coherent combining. The DL SS slot index with l=1 . . . (L) or the DL SS block index (2l−1) or 2l with l=1 . . . (L) per DL SS burst is indicated by using the additional DMRS for demodulation NR-PBCH.

For the above embodiments/sub-embodiments, an important aspect of SS burst set composition is how to map SS blocks with a DL SS slot (note that the sub-embodiment of the design on SS blocks mapping within a DL SS slot can be combined with all above embodiments/sub-embodiments regarding the SS burst composition). The symbols mapped for DL-SS blocks may not overlap with the symbols mapped for NR-PDCCH (potentially 1-2 symbols at the beginning of an NR slot) or NR-PUCCH (potentially 1-2 symbols at the end of an NR slot) in the same NR slot. In addition, the design may consider the possibility of the data field in the same slot duration with 14 symbols using normal CP or the same slot duration with 12 symbols using extended CP.

Figure 17A:
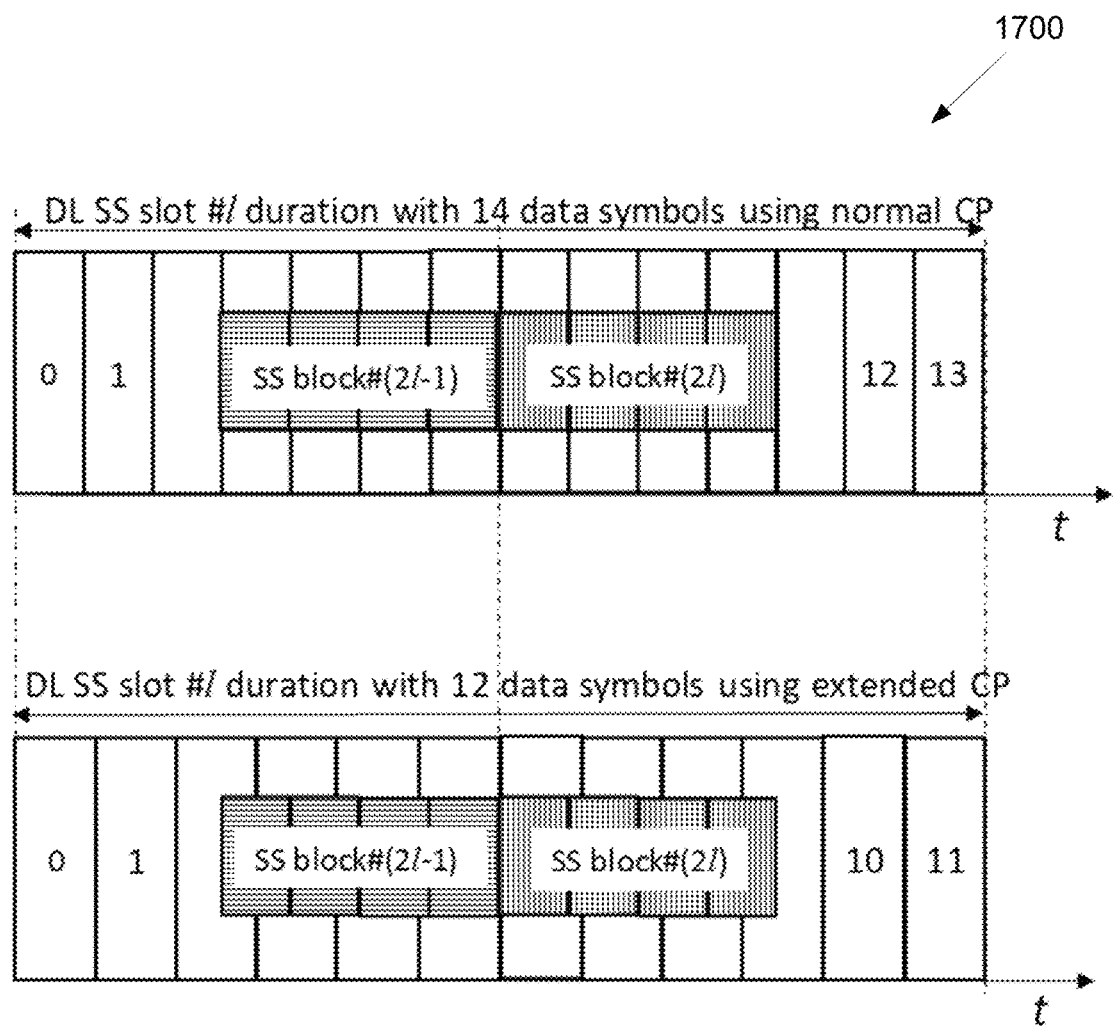
FIG. 17A illustrates an example SS block position according to embodiments of the present disclosure.

FIG. 17A illustrates an example SS block position 1700 according to embodiments of the present disclosure. The embodiment of the SS block position 1700 illustrated in FIG. 17A is for illustration only. FIG. 17A does not limit the scope of this disclosure to any particular implementation.

In one embodiment, SS block position within the DL SS slot # 1 is illustrated in FIG. 17A, where the subcarrier spacing (SCS) for NR-SS blocks (SCS_SS) is same as SCS of data (SCS_data). There is a pair of SS blocks in the symmetric positions relative to the half slot boundary. The SS block #(2l−1) is placed in the left side of half slot boundary and the SS block (2l) is placed in the right side of half slot boundary. Their relative positions within a DL SS lot are fixed no matter whether normal CP or extended CP is used (if extended CP is supported for NR SS block). For example, the normal CP is defined as 7% symbol length and the extended CP is defined as 25% symbol length. Then, the UE can identify the half slot boundary no matter which SS block within the DL SS slot is detected.

For example, if detecting the SS block index as #(2l−1), the UE can use the end timing of the SS block to identify the half slot boundary; similarly, if detecting the SS block index as #(2l), the UE can use the start timing of the SS block to identify the half slot boundary. The CP information is explicitly/implicitly indicated in the detected SS block, e.g., in NR-PBCH or by using CRC of NR-PBCH payload, or using NR-PSS/SSS sequences or additional DMRS for demodulating NR-PBCH. With the knowledge of the CP type, the symbol boundary can be calculated at the UE side. One SS block has fixed number of symbols. In one example, the number can be 4. In another example, the number can be 3 or 5.

Figure 17B:
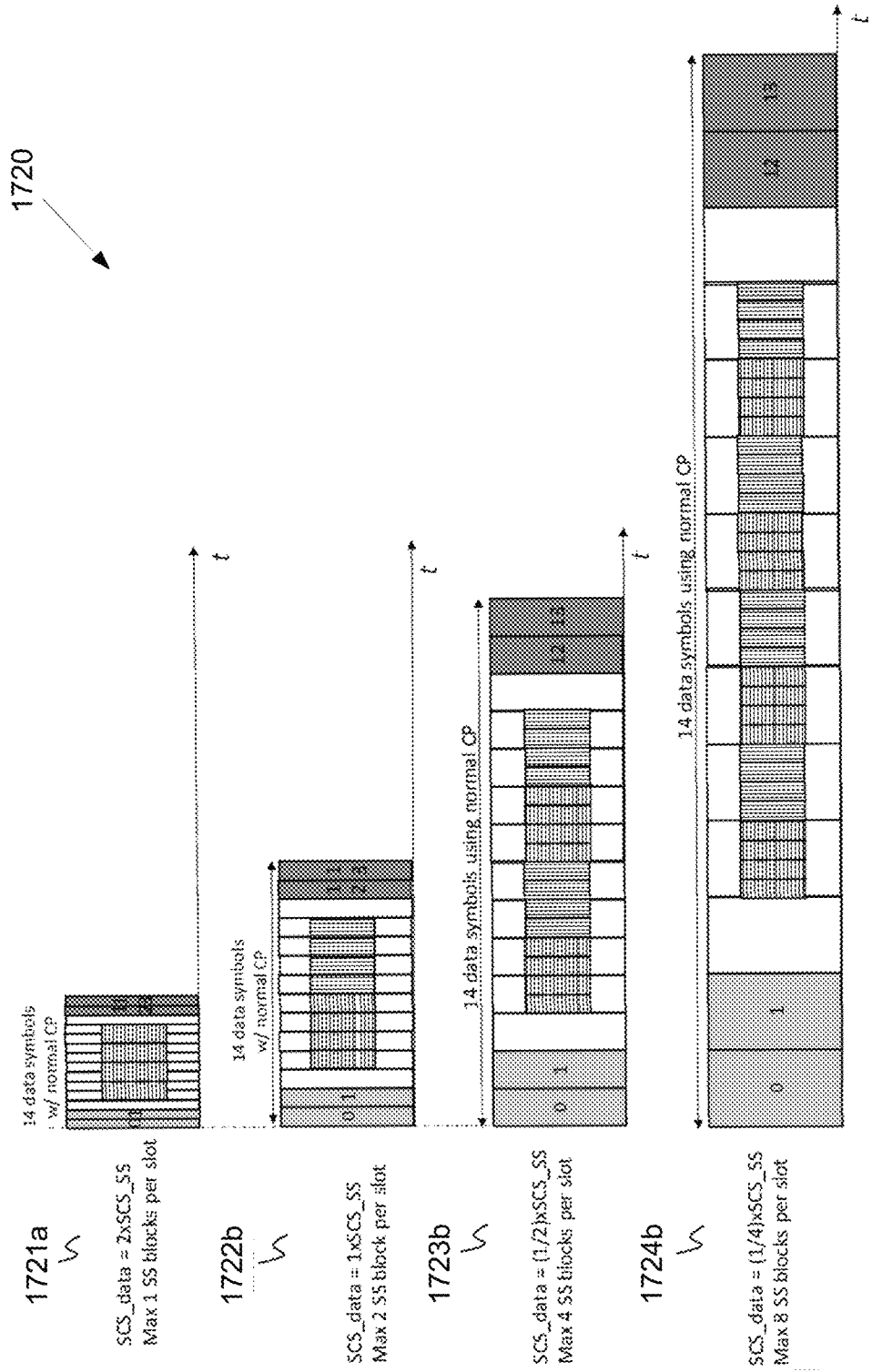
FIG. 17B illustrates another example SS block position according to embodiments of the present disclosure.

FIG. 17B illustrates another example SS block position 1720 according to embodiments of the present disclosure. The embodiment of the SS block position 1720 illustrated in FIG. 17B is for illustration only. FIG. 17B does not limit the scope of this disclosure to any particular implementation.

In one embodiment, as illustrated in FIG. 17B, the mapping pattern of NR-SS block(s) in a slot for different cases of SCS_data=2×SCS_SS, SCS_data=1×SCS_SS, SCS_data=(½)×SCS_SS and SCS_data=(¼)×SCS_SS, respectively, where a slot have 14 symbols with normal CP. In case of SCS_data=2×SCS_SS (as shown in 1301b), there is maximum 1 DL SS block within the slot. In case of SCS_data=1×SCS_SS (as shown in 1302b), there are maximum 2 DL SS blocks within the slot. In case of SCS_data=(½)×SCS_SS SS (as shown in 1303b), there are maximum 4 DL SS blocks within the slot. In case of SCS_data=(¼)×SCS_SS SS (as shown in 1724b), there are maximum 8 DL SS blocks within the slot. In all cases, the DL SS blocks are not overlapped with the possible 1-2 PDCCH symbols at the beginning and possible 1-2 PUCCH symbols at the end of 14-symbol slot. In case that there are less than 4 NR-SS blocks to be sent, it is flexible to configure the remaining resources by using the PDCCH/PUCCH in each 14-symbols slot.

Figure 17C:
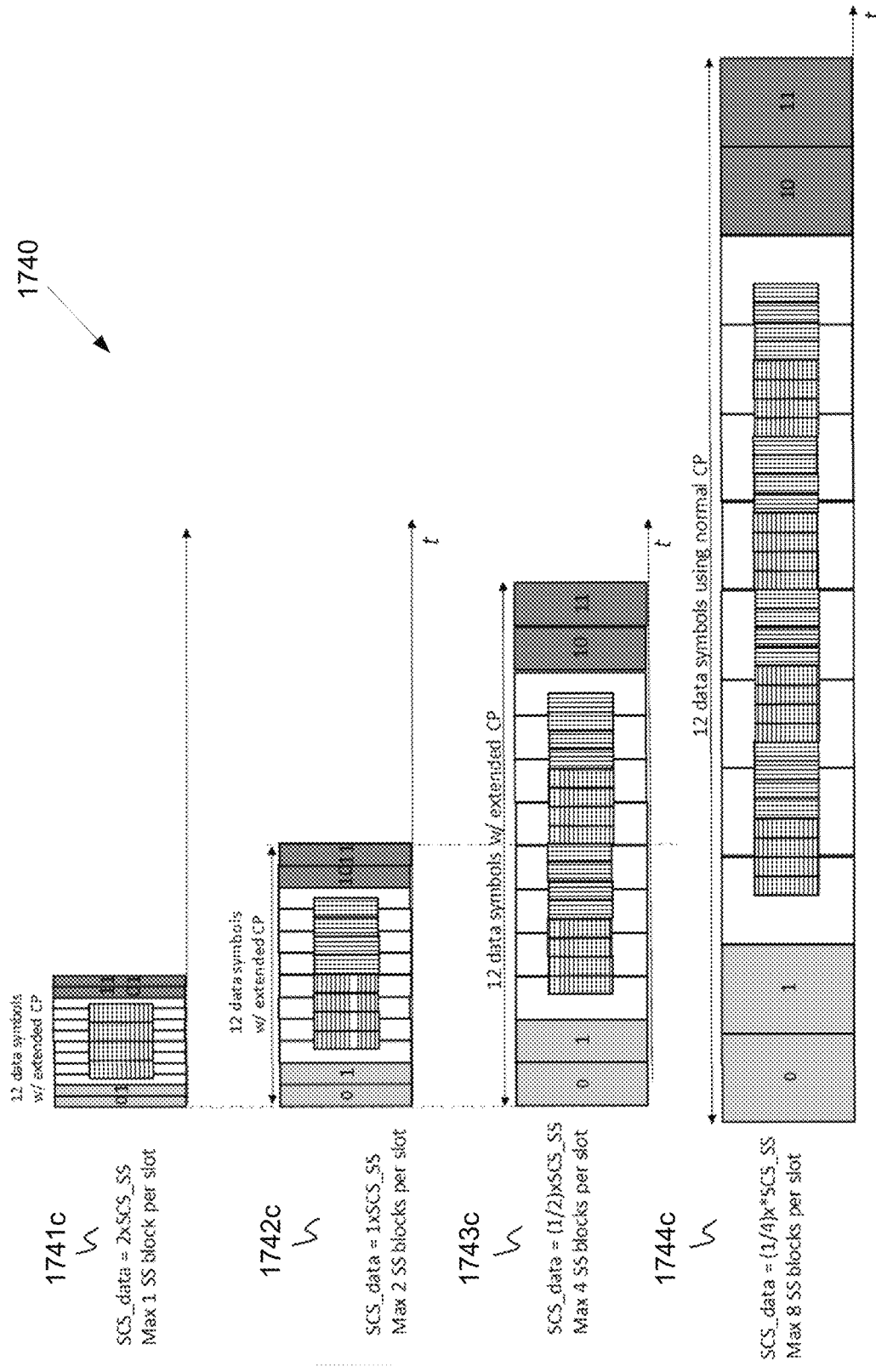
FIG. 17C illustrates yet another example SS block position according to embodiments of the present disclosure.

FIG. 17C illustrates yet another example SS block position 1740 according to embodiments of the present disclosure. The embodiment of the SS block position 1740 illustrated in FIG. 17C is for illustration only. FIG. 17C does not limit the scope of this disclosure to any particular implementation.

In one embodiment, as illustrated in FIG. 17C, the mapping pattern of NR-SS block(s) in a slot for different cases of SCS_data=2×SCS_SS, SCS_data=1×SCS_SS, SCS_data=(½)×SCS_SS and SCS_data=(¼)×SCS_SS, respectively, where a slot have 12 symbols with extended CP. In case of SCS_data=2×SCS_SS (as shown in 1741c), there is maximum 1 DL SS block within the slot. In case of SCS_data=1×SCS_SS (as shown in 1742c), there are maximum 2 DL SS blocks within the slot. In case of SCS_data=(½)×SCS_SS SS (as shown in 1743c), there are maximum 4 DL SS blocks within the slot.

In case of SCS_data=(¼)×SCS_SS SS (as shown in 1744c), there are maximum 8 DL SS blocks within the slot. In all cases, the DL SS blocks are not overlapped with the possible 1-2 PDCCH symbols at the beginning and possible 1-2 PUCCH symbols at the end of 12-symbol slot. In case that there are less than 4 NR-SS blocks to be sent, it is flexible to configure the remaining resources by using the PDCCH/PUCCH in each 12-symbols slot.

It can be further extended to the case that there are maximum 2k NR-SS blocks in a slot if SCS_SS=(k)×SCS_data, i.e., SCS_data=(1/k)SCS_SS with k=(¼), (½), 1, 2, 4, where a slot has 14 symbols with normal CP and 12 symbols with extended CP. If k=(½), 1, 2, 4, the (2k) NR-SS blocks are consecutive symbols and mapped in the middle of a slot, e.g., 0th~(k−1)-th NR-SS blocks are located in the left side of the half slot boundary and the k-th~(2k)-th NR-SS blocks are located in the right side of the half slot boundary.

It can avoid the overlapping with 1-2 NR-PDCCH symbols at the beginning and 1-2 NR-PUCCH symbols at the end of a slot. If k=(¼), 1 NR-SS block is mapped cross a pair of two data slots, e.g., 1st half of the NR-SS block is located in the left slot and the 2nd half of the NR-SS block is located in the right slot. It can avoid the overlapping with 1-2 NR-PDCCH symbols at the beginning and 1-2 NR-PUCCH symbols at the end of a pair of two slots. No blind detection of fixed/pre-defined positions/patterns of SS blocks in a subframe and no SS block cross the slot boundary. And it allows flexible configuration of remaining resources by allowing UEs to read PDCCH/PUCCH.

Figure 17D:
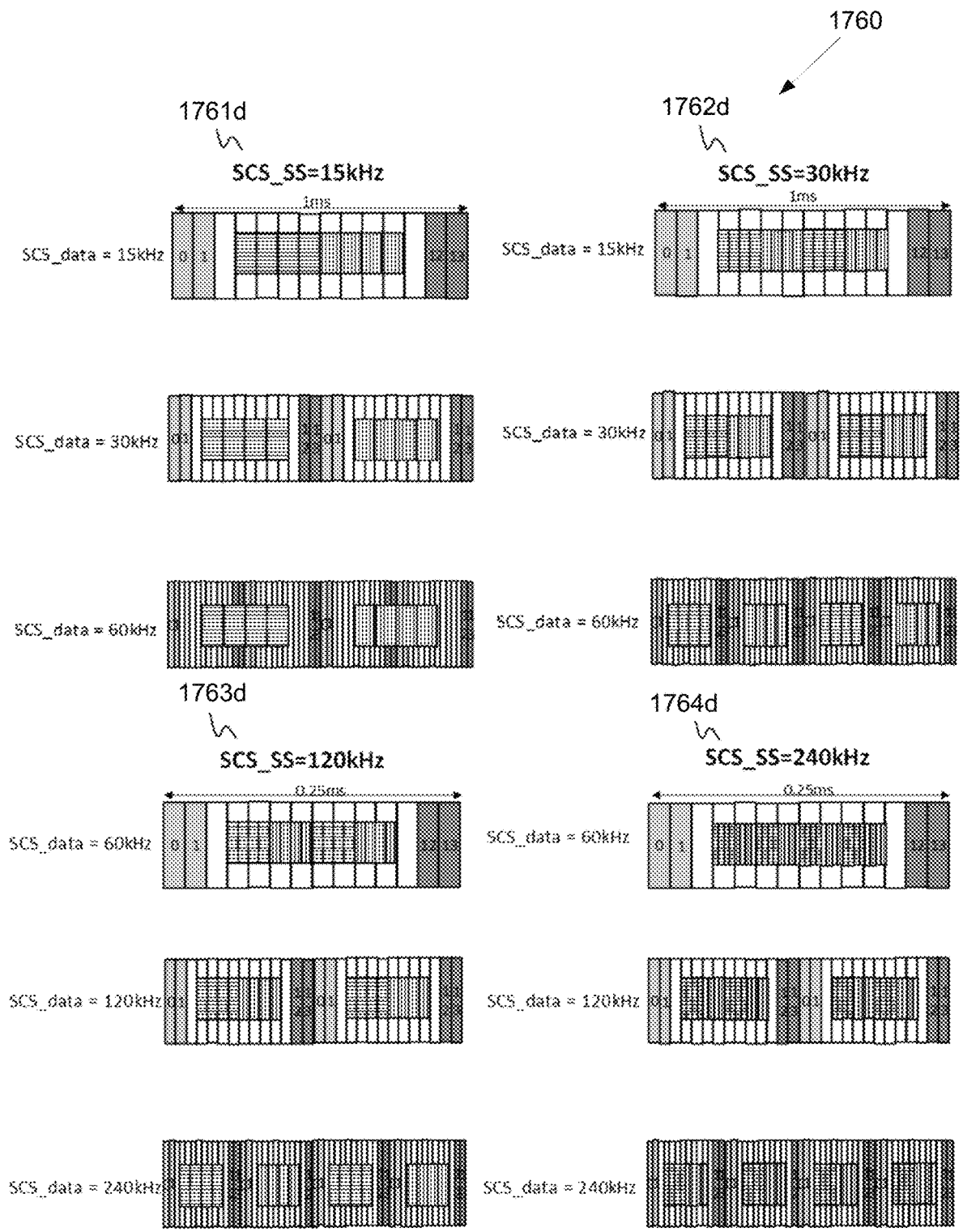
FIG. 17D illustrates yet another example SS block position according to embodiments of the present disclosure.

FIG. 17D illustrates yet another example SS block position 1760 according to embodiments of the present disclosure. The embodiment of the SS block position 1760 illustrated in FIG. 17D is for illustration only. FIG. 17D does not limit the scope of this disclosure to any particular implementation.

The relationship of SCS_data and SCS_SS, e.g., the 5 cases of SCS_SS=k*SCS_data, with k=(¼), (½), 1, 2, 4, can be explicitly/implicitly indicated or partially indicated in the detected SS block, e.g., in NR-PBCH or by using CRC of NR-PBCH payload, or using NR-PSS/SSS sequences or additional DMRS for demodulating NR-PBCH. For example, for <6 GHz, the case of SCS_SS=15 kHz with SCS_data=15/30/60 kHz, i.e., k=1, (½), (¼) is as illustrated in 1761d of FIG. 17D, and the case of SCS_SS=30 kHz with SCS_data=15/30/60 kHz, i.e., k=(½), 1, 2 is as illustrated in 1762D of FIG. 17D.

For example, for >6 GHz, the case of SCS_SS=120 kHz with SCS_data=60/120/240 kHz, i.e., k=2, 1, (½) is as illustrated in 1761D of FIG. 17D, and the case of SCS_SS=240 kHz with SCS_data=60/120/240 kHz, i.e., k=4, 2, 1 is as illustrated in 176d of FIG. 17D. Only 2-bit indication is needed for each type of SCS_SS.

A subframe of 1 ms include maximum $(2^{n+1})$ NR-SS blocks with SCS_SS=$(2^n)$×15 kHz, distributed in $(2^n/k)$ time segments and maximum (2k) NR-SS blocks per time segment of $(k/2^n)$×1 ms, where n is integer number such as n=0, 1, 2, 3, 4, 5 so that $(2^n)$=1, 2, 4, 8, 16, 32 and k can be (¼), ½, 1, 2 or 4. One time segment is defined as the time duration for a cluster of NR-SS blocks, or regarded as an NR-SS slot (or a DL SS slot, or a DL NR-SS slot). Therefore, there are $(2^n/k)$ NR-SS clusters within 1 ms and each NR-SS cluster has (2k) consecutive NR-SS blocks using SCS_SS=$(2^n)$*15 kHz, located in the middle of the time segment or the NR-SS slot. The number of the NR-SS slots within 1 ms is dependent on parameter (k) and the SCS_SS. The NR-SS burst pattern as well as the NR-SS slot pattern within an NR-SS burst and NR-SS block pattern within an NR-SS slot requires the knowledge of (k) and SCS_SS.

Assuming the actual number of NR-SS blocks is X for SCS_SS=$(2^n)$*15 kHz, if X<=$(2^{n+1})$, the NR-SS blocks are sent in the pre-defined 1 ms-subframe, such as the $0^{th}$ subframe within the NR-SS burst set periodicity; if $(2^{n+1})$<X<=$2*(2^{n+1})$, the NR-SS blocks are sent in two pre-defined 1 ms-subframes, such as the $0^{th}$ subframe as the $0^{th}$ NR-SS burst and $5^{th}$ subframe as the $1^{st}$ NR-SS burst within the NR-SS burst set periodicity of 10 ms, or the $0^{th}$ subframe per 10 ms-frame within the NR-SS burst set periodicity of 20 ms. The x={0, . . . X−1} is the index of the NR-SS block and X is smaller than the pre-defined maximum number of NR-SS blocks, L. For example, if (i)*(2k)<=x<=(i+1)*(2k) with i={0, 1, . . . $(2^n/k)$−1}, the NR-SS blocks are sent in the $i^{th}$ NR-SS slot in the 0th NR-SS burst; if $(2^{n+1})$+(i)*(2k)<=x<=$(2^{n+1})$+(i+1)*(2k) with i={0, 1, . . . $(2^n/k)$−1}, the NR-SS blocks are sent in the $i^{th}$ NR-SS slot in the $1^{st}$ NR-SS bust.

With the knowledge of the relationship of SCS_data and SCS_SS as SCS_SS=k*SCS_data and the corresponding pre-defined mapping pattern of NR SS blocks, and the CP type, e.g., 1-bit for normal CP or extended CP, the slot boundary as well as symbol boundary can be calculated at the UE side. One SS block has fixed number of symbols. In one example, the number can be 4. In another example, the number can be 3 or 5.

The possible SCS of NR-SS blocks as well as the SCS of data are illustrated at TABLE 3. The number of slot(s) with different SCS of data and NR-SS blocks within subframe of 1 ms is given in TABLE 4, where each slot has 14 symbols with normal CP and 12 symbols with extended CP.

TABLE 3

SCS of NR-SS blocks vs SCS of data

| SCS_SS | SCS_data = 4 × SCS_SS | SCS_data = 2 × SCS_SS | SCS_data = 1 × SCS_SS | SCS_data = (½) × SCS_SS | SCS_data = (¼) × SCS_SS |
|---|---|---|---|---|---|
| 15 kHz | 60 kHz | 30 kHz | 15 kHz | 7.5 kHz | 3.75 kHz |
| 30 kHz | 120 kHz | 60 kHz | 30 kHz | 15 kHz | 7.5 kHz |
| 60 kHz | 240 kHz | 120 kHz | 60 kHz | 30 kHz | 15 kHz |
| 120 kHz | 4800 kHz | 240 kHz | 120 kHz | 60 kHz | 30 kHz |
| 240 kHz | 480 kHz | 480 kHz | 240 kHz | 120 kHz | 60 kHz |

TABLE 4

Number of slot(s) with different SCS of data and NR-SS blocks within subframe of 1 ms (each slot has 14 symbols with normal CP and 12 symbols with extended CP)

| SCS of NR-SS blocks | SCS_data = 4 × SCS_SS | SCS_data = 2 × SCS_SS | SCS_data = 1 × SCS_SS | SCS_data = (½) × SCS_SS | SCS_data = (¼) × SCS_SS |
|---|---|---|---|---|---|
| 15 kHz | 4 slots | 2 slots | 1 slot | 0.5 slot | 0.25 slot |
| 30 kHz | 8 slots | 4 slots | 2 slots | 1 slot | 0.5 slot |
| 60 kHz | 16 slots | 8 slots | 4 slots | 2 slots | 1 slot |
| 120 kHz | 32 slots | 16 slots | 8 slots | 4 slots | 2 slots |
| 240 kHz | 64 slots | 32 slots | 16 slots | 8 slots | 4 slots |

Figure 17E:
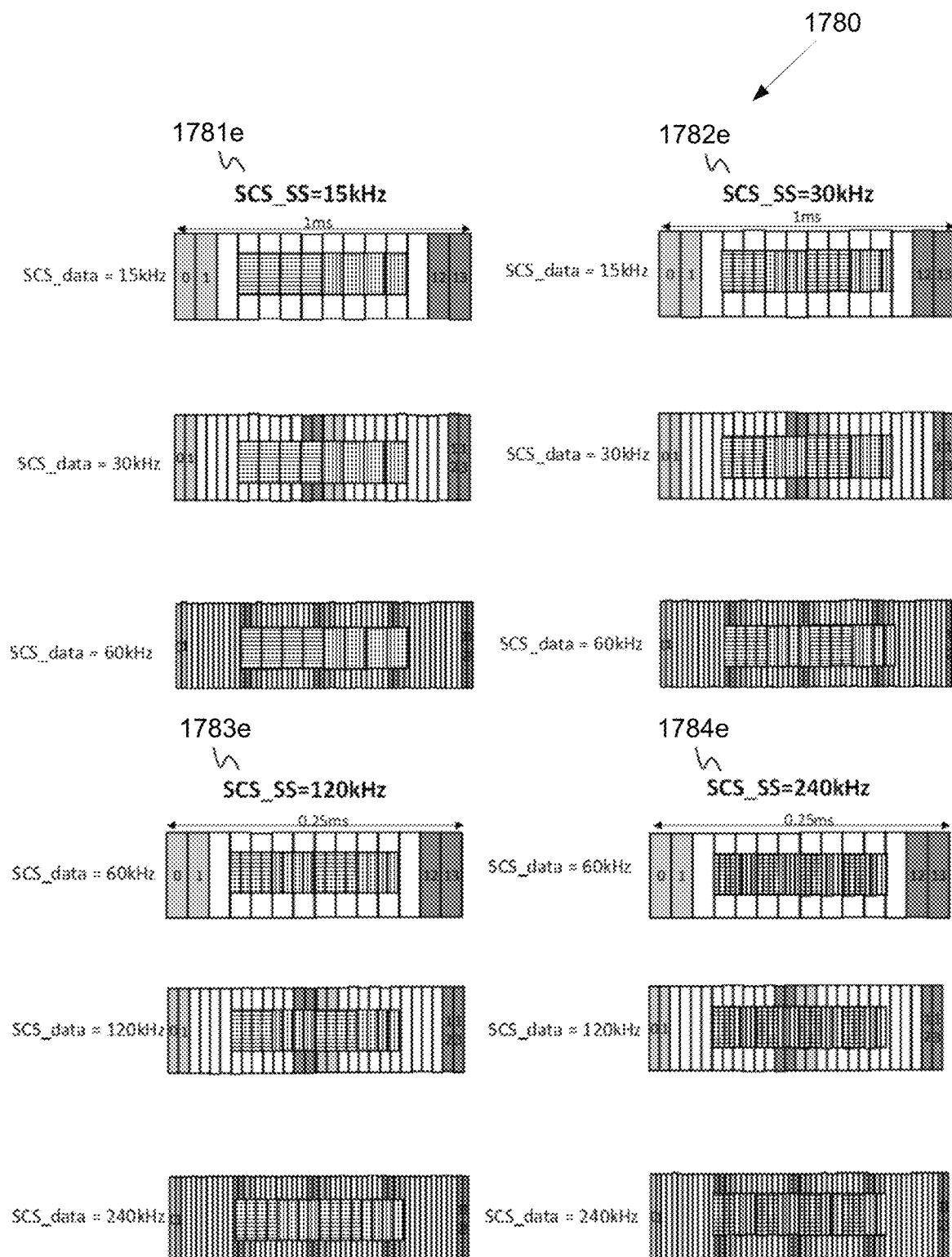
FIG. 17E illustrates yet another example SS block position according to embodiments of the present disclosure.

FIG. 17E illustrates yet another example SS block position 1780 according to embodiments of the present disclosure. The embodiment of the SS block position 1780 illustrated in FIG. 17E is for illustration only. FIG. 17E does not limit the scope of this disclosure to any particular implementation.

In one embodiment, one pattern defined in FIG. 17E is used for a type of SCS_SS in a predefined time segment duration, or a predefined NR-SS slot duration. Accordingly, the pattern is only dependent on the SCS_SS and fixed no matter what kind of SCS_data is used in the control and data region. There are q time segments with each time segment, defined as an NR-SS slot, has maximum (2k') consecutive NR-SS blocks mapped in the middle in a predefined NR-SS slot duration.

Figure 17F:
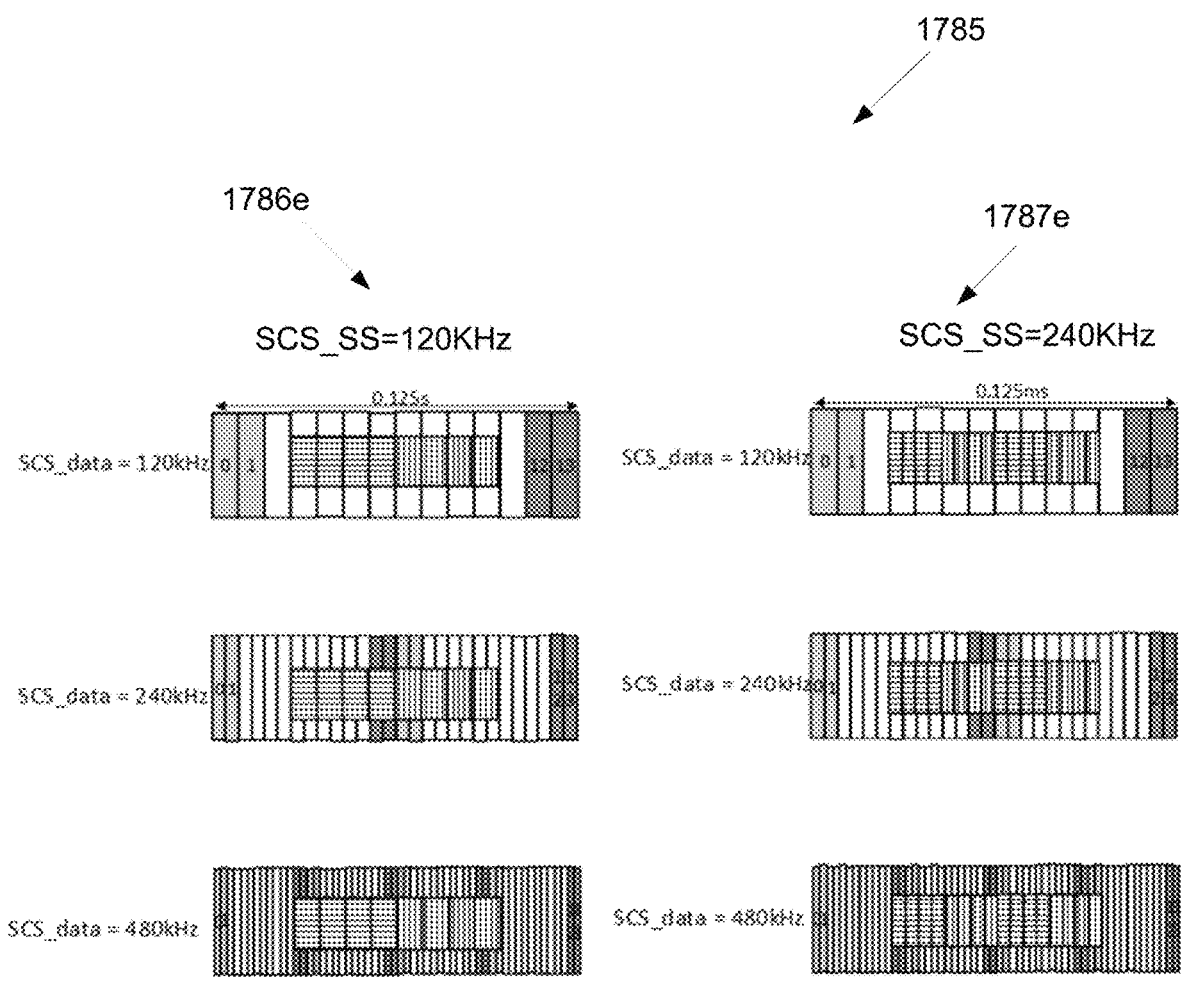
FIG. 17F illustrates yet another example SS block position according to embodiments of the present disclosure.

FIG. 17F illustrates yet another example SS block position 1785 according to embodiments of the present disclosure. The embodiment of the SS block position 1785 illustrated in FIG. 17F is for illustration only. FIG. 17F does not limit the scope of this disclosure to any particular implementation.

In FIG. 17E and FIG. 17F, the NR-SS slot is the time segment of (1/q)×1 ms. The defined time segment or NR-SS slot have 14 symbols with normal CP and 12 symbols with extended CP if the data/control symbols use SCS_data=(q)× 15 kHz. In such a slot with duration of (1/q)×1 ms with q=$2^{n-n'}$, 0th~($2^{n'}$−1)-th NR-SS blocks are located in the left side of the half NR-SS slot boundary and the $2^{n'}$-th~($2^{n'+1}$)-th NR-SS blocks are located in the right side of the half NR-SS slot boundary. By avoiding the overlapping with 1-2 NR-PDCCH symbols at the beginning and 1-2 NR-PUCCH symbols at the end of an NR-SS slot. No blind detection of fixed/pre-defined positions/patterns of SS blocks, it allows flexible configuration of remaining resources in an NR-SS slot by allowing UEs to read PDCCH/PUCCH in the pre-defined duration of (1/q)×1 ms.

A subframe of 1 ms include maximum ($2^{n+1}$) NR-SS blocks, distributed in q time segments and maximum ($2^{n'}$) NR-SS blocks per time segment of (1/q)×1 ms, where n is integer number such as n=0, 1, 2, 3, 4, 5 so that ($2^n$)=1, 2, 4, 8, 16, 32 and n' is integer number such as n'=0, 1, 2, 3, 4 so that ($2^{n'}$)=1, 2, 4, 8, 16 but n>=n' and q=$2^{n-n'}$>=1. One time segment is defined as the time duration for a cluster of NR-SS block(s), or regarded as an NR-SS slot (or a DL SS slot, or a DL NR-SS slot).

Therefore, there are q=$2^{n-n'}$ NR-SS slots within 1 ms and each NR-SS slot has a cluster of ($2^{n'+1}$) consecutive NR-SS blocks using SCS_SS=($2^n$)×15 kHz, located in the middle of the time segment or the NR-SS slot. The number of the NR-SS slots within 1 ms is dependent on the SCS_SS. The number of the NR-SS slots within 1 ms is dependent on the SCS_SS. No blind detection is needed to identify the NR-SS burst pattern as well as the NR-SS slot pattern within an NR-SS burst and NR-SS block pattern within an NR-SS slot.

Assuming the actual number of NR-SS blocks is X for SCS_SS=($2^n$)×15 kHz, if X<=($2^{n'+1}$), the NR-SS blocks are sent in the pre-defined 1 ms-subframe, such as the $0^{th}$ subframe within the NR-SS burst set periodicity; if ($2^{n'+1}$)<X<=2×($2^{n'+1}$), the NR-SS blocks are sent in two pre-defined NR-SS bursts with 1 ms-subframe per NR-SS burst, such as the $0^{th}$ subframe as the $0^{th}$ NR-SS burst and $5^{th}$ subframe as the $1^{st}$ NR-SS burst within the NR-SS burst set periodicity of 10 ms, or the $0^{th}$ subframe per 10 ms-frame within the NR-SS burst set periodicity of 20 ms.

The x={0, ... X−1} is the index of the NR-SS block and X is smaller than the pre-defined maximum number of NR-SS blocks, L. For example, if (i)*($2^{n'+1}$)/q<=x<=(i+1)*($2^{n'+1}$) with 1={0, 1, ... q−1}, the NR-SS blocks are sent in the $i^{th}$ NR-SS slot in the 0th NR-SS burst; if ($2^{n'+1}$)+(i)*($2^{n'+1}$)/q<=x<=($2^{n'+1}$)+(i+1)*($2^{n'+1}$)/q with i={0, 1, ... q−1}, the NR-SS blocks are sent in the $i^{th}$ NR-SS slot in the 1st NR-SS burst.

The subcarrier spacing of NR-SS blocks, defined as SCS_SS=($2^n$)×15 kHz=($2^n$)×(q)×15 kHz, is dependent on the carrier frequency band. For example, for carrier frequency $f_c$<6 GHz, the case of SCS_SS=15 kHz used in e.g., $f_c$=2 or 4 GHz, i.e., ($2^n$)=1 and q=1 is as illustrated in 1781e of FIG. 13E, and the case of SCS_SS=30 kHz used in e.g., $f_c$=2 or 4 GHz, i.e., ($2^n$)=2, q=1 is as illustrated in 1782E of FIG. 17E. There is q=1 NR-SS slot within an NR burst and each NR-SS slot has a cluster of 2 NR-SS blocks in case of SCS_SS=15 kHz or a cluster of 4 NR-SS blocks in case of SCS_SS=30 kHz. The NR-SS pattern is fixed in a predefined duration of 1 ms and does not change for SCS_data=15/30/60 kHz used in sub6 GHz.

For example, for carrier frequency $f_c>6$ GHz, the case of SCS_SS=120 kHz if used in, e.g., $f_c=30$ GHz, i.e., $(2^n)=2$ and q=4 is illustrated in 1783E of FIG. 17E, and the case of SCS_SS=240 kHz if used in, e.g., $f_c=30$ GHz, i.e., i.e., $(2^n)=4$, q=4 is as illustrated in 1784e of FIG. 17E. There is q=4 NR-SS slots within an NR burst and each NR-SS slot has a cluster of 4 NR-SS blocks in case of SCS_SS=120 kHz or a cluster of 8 NR-SS blocks in case of SCS_SS=240 kHz. The NR-SS pattern is fixed in a predefined duration of $(1/q)*1$ ms=0.25 ms and does not change for SCS_data=60/120/240 kHz used in sub6 GHz.

Another example, for carrier frequency $f_c>6$ GHz, the case of SCS_SS=120 kHz if used in, e.g., $f_c=30$ GHz, i.e., $(2^n)=1$ and q=8 is as illustrated in 1786e of FIG. 17F, and the case of SCS_SS=240 kHz if used in, e.g., $f_c=30$ GHz, i.e., i.e., $(2^n)=2$, q=8 is as illustrated in 1787e of FIG. 17F. There is q=8 NR-SS slot within an NR burst and each NR-SS slot has a cluster of 2 NR-SS blocks in case of SCS_SS=120 kHz or a cluster of 4 NR-SS blocks in case of SCS_SS=240 kHz. The NR-SS pattern is fixed in a predefined duration of $(1/q)*1$ ms=0.125 ms and does not change for SCS_data=120/240/480 kHz used in sub6 GHz.

For each frequency band, the UEs use different SCS_SS to detect the NR-SS blocks. Corresponding to each SCS_SS, UEs use the pre-defined mapping pattern of NR SS blocks in pre-defined time duration to identify the segment boundary of $(1/q)\times1$ ms.

The slot/symbol numerology information of control/data, such as SCS_data (or the relationship of SCS_SS=k*SCS_data) and CP is needed to let UEs detect the slot boundary as well as the symbol boundary to detect at least the residual minimum system information. Such the slot/symbol numerology information can be explicitly indicated or partially indicated in NR-PBCH as common information within the NR-PBCH periodicity. Or it can be indicated in different redundancy versions (RB) of CRC, which can be variable within the NR-PBCH periodicity. Other methods to indicate the slot/symbol numerology information include the hypotheses of NR-PSS sequences with different roots (such as conjugate roots), or an NR-SSS sequence with different cyclic shifts, or NR-SSS sequences, or NR-DMRS sequences, or the NR-DMSR IFDM patterns in NR-PBCH symbols with different frequency offset of the DMRS subcarriers.

The maximum number of NR-SS blocks in 1 subframe with 1 ms, e.g., one NR SS burst in subframe #0, are calculated as $L=(2^{n+1})$ if SCS_SS=$(2^n)$*15 kHz. And the maximum number of NR-SS blocks in 2 subframes with 2 ms, e.g., two NR SS bursts in subframe #0 and subframe #5, are $L=(2^{n+2})$ if SCS_SS=$(2^n)$*15 kHz. The cluster of NR-SS blocks within a subframe of 1 ms can be regarded as an NR burst. TABLE 4 shows a maximum number of SS blocks.

TABLE 5

| | Maximum number of SS blocks with different SCS of NR-SS blocks | |
|---|---|---|
| SCS of NR-SS blocks | Max. number of NR-SS blocks in 1 subframe of 1 ms | Max. number of NR-SS blocks in 2 subframes of 2 ms |
| 15 kHz | 2 | 4 |
| 30 kHz | 4 | 8 |
| 60 kHz | 8 | 16 |
| 120 kHz | 16 | 32 |
| 240 kHz | 32 | 64 |

The actual number of NR-SS blocks and/or the number of NR-SS bursts per NR-SS burst set can be configured by gNB/TRP. The actual number of NR-SS blocks and/or the number of NR-SS bursts per NR-SS burst set can be indicated by PBCH. The users detect the PBCH and know the actual number of SS blocks. Using the knowledge of the detected NR-SS block index and pre-defined NR-SS mapping pattern, the users can identify the frame boundary, subframe index/boundary, slot index/boundary, symbol index/boundary. The actual number of NR-SS blocks helps users to make use of remaining slots/symbols to detect control/data signals in the DL subframe including DL NR-SS block(s).

Regarding the mapping location of the actual X number of NR-SS blocks with X<=L, it can use the first X locations of NR-SS blocks in the pattern pre-defined for the case of L number of NR-SS blocks and the remaining (L-X) locations of NR-SS blocks are released for data transmission.

In one example, the adjusted X locations of NR-SS blocks with X NR-SS blocks equally distributed in the slots within the subframe(s) or the time segment(s) predefined for NR SS block transmission is used. In such example, the starting position of the NR-SS block in each time segment and in each subframe predefined for NR-SS blocks is fixed but the number of NR-SS block(s) in each time segment or subframe is adjusted based on actual X number of NR-SS blocks.

Figure 18:
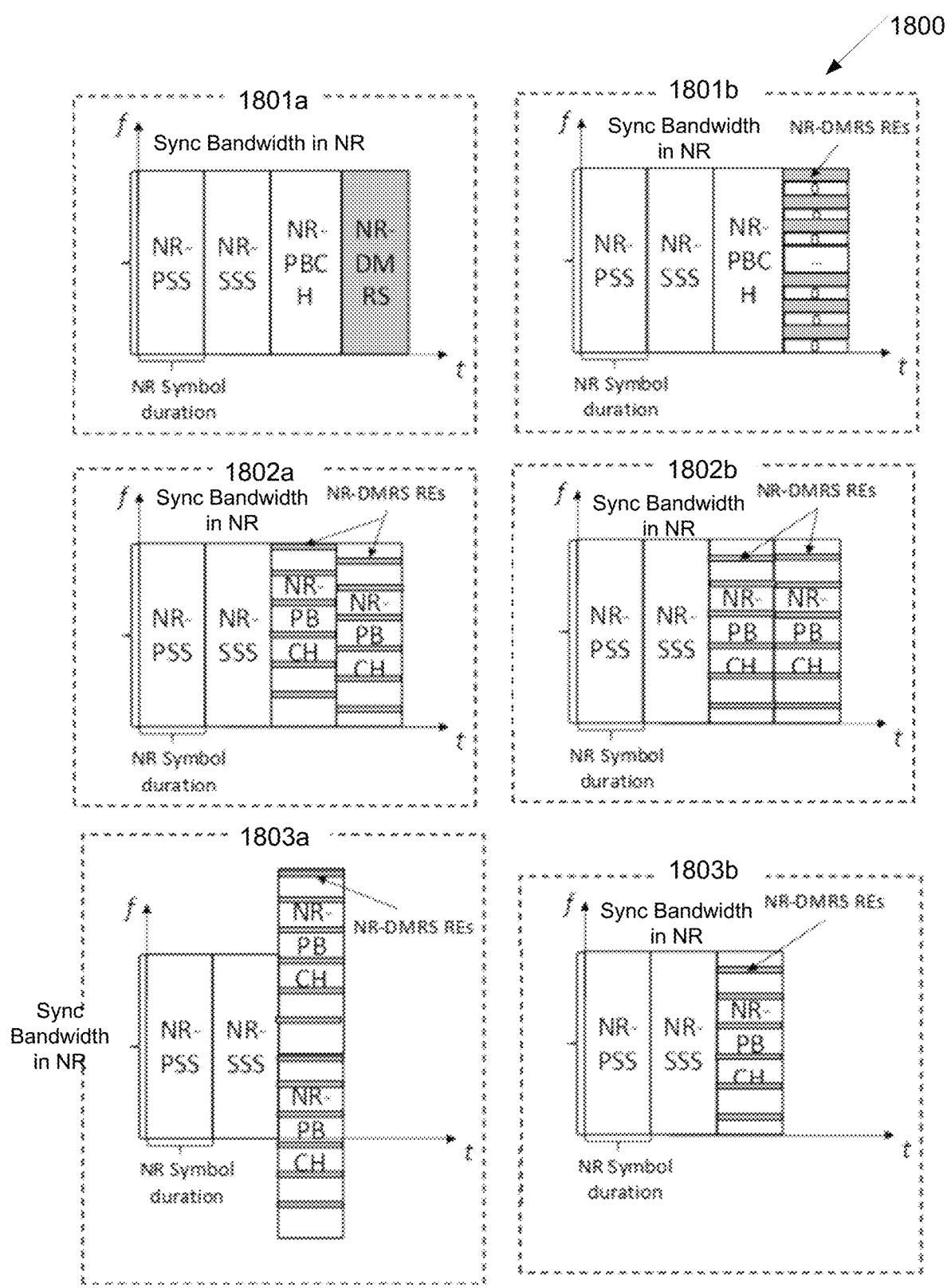
FIG. 18 illustrates an example RS used for demodulating the NR-PBCH according to embodiments of the present disclosure.

FIG. 18 illustrates an example RS used for demodulating the NR-PBCH 1800 according to embodiments of the present disclosure. The embodiment of the RS used for demodulating the NR-PBCH 1800 illustrated in FIG. 18 is for illustration only. FIG. 18 does not limit the scope of this disclosure to any particular implementation.

The RS used for demodulating the NR-PBCH may include the NR-SSS and/or additional NR-DMRS, as shown in FIG. 18. The NR-DMRS can be time-domain multiplexed (TDM) after the NR-PBCH symbol as shown in 1801a and 1801b, or interleaved frequency-domain multiplexed (IFDM) within NR-NR-PBCH symbol(s), as shown in 1802a and 1802b. Here, NR-PSS/SSS, NR-PBCH as well as NR-DMRS have same SCS but the number of REs for NR-PSS, SSS, NR-PBCH, NR-DMRS can be different.

In one embodiment as illustrated in 1801a of FIG. 18, the number of NR-PBCH REs is same as NR-DMRS REs. A long sequence can be used for NR-DMRS with the same antenna ports as NR-PBCH. For example, if there are 288 REs within NR-PBCH symbol(s), the 255-length sequences, e.g., Zadoff-Chu sequences or m-sequences can be used for indicating the SS block timing or part of the SS block timing, such as, SS block index per SS burst, and/or SS slot index per SS burst, and/or SS burst index if there are more than one SS burst. Referring to TABLE 2A-1 for the DL SS burst set periodicity of 10 ms, SCS=30 kHz=2×15 kHz and 4 orthogonal or low-correlated sequences are used to identify maximum 4 SS blocks; SCS=120 kHz=8×15 kHz and 16 orthogonal sequences are used to identify maximum 16 SS blocks or 8 orthogonal or low-correlated sequences are used to identify maximum 8 SS slots.

In one embodiment, as illustrated in 1801b of FIG. 18, the number of NR-PBCH REs is two times of NR-DMRS REs. A short sequence can be used for NR-DMRS with the same antenna ports as NR-PBCH. For example, if there are 288 REs within NR-PBCH symbol(s), the 127-length sequences mapping every two subcarriers, e.g., Zadoff-Chu sequences or m-sequences can be used for indicating the SS block timing or part of the SS block timing, such as, SS block index per SS burst, and/or SS slot index per SS burst, and/or SS burst index if there are more than one SS burst.

In one embodiment, as illustrated in 1802a of FIG. 18, the NR-DMRS REs are inserted in the NR-PBCH symbols with interleaved frequency-domain multiplexed (IFDM) pattern. For example, if assuming ⅙ REs per NR-PBCH symbol with 255 REs (excluding guard band) are used as NR-DMRS REs, there are 85 REs in two NR-PBCH symbols. A short sequence can be used for NR-DMRS with the same antenna ports as NR-PBCH. For example, the $L_{DMRS}$-length sequences mapping every two subcarriers, e.g., Zadoff-Chu sequences ($L_{DMRS}$=85, or 83, or 63) or m-sequences (single sequence with $L_{DMRS}$=63 or interleaved two m-sequences with length 31) can be used for indicating the SS block timing or part of the SS block timing, such as, SS block index per SS burst, and/or SS slot index per SS burst, and/or SS burst index if there are more than one SS burst.

In one embodiment, as illustrated in 1802b of FIG. 18, the NR-DMRS REs are inserted in the NR-PBCH symbols with same subcarrier positions in adjacent NR-PBCH symbols. If assuming ⅙ REs per NR-PBCH symbol with 255 REs (excluding guard band) are used as NR-DMRS REs, there are 85 REs in two NR-PBCH symbols. A short sequence can be used for NR-DMRS with the same antenna ports as NR-PBCH. For example, the $L_{DMRS}$-length sequences mapping on one subcarrier every 6 subcarriers, e.g., Zadoff-Chu sequences ($L_{DMRS}$=83, or 63) or m-sequences (single sequence with $L_{DMRS}$=63 or interleaved two m-sequences with length 31) can be used for indicating the SS block timing or part of the SS block timing, such as, SS block index per SS burst, and/or SS slot index per SS burst, and/or SS burst index if there are more than one SS burst.

For another example, the $L_{DMRS}$-length sequences mapping every two subcarriers and the sequences in two symbols are identical (actually the two symbols containing both NR-PBCH and NR-DMRS are identical), e.g., Zadoff-Chu sequences ($L_{DMRS}$=43, or 41, or 31) or m-sequences (single sequence with $L_{DMRS}$=31 or interleaved two m-sequences with length 15) can be used for indicating the SS block timing or part of the SS block timing, such as, SS block index per SS burst, and/or SS slot index per SS burst, and/or SS burst index if there are more than one SS burst.

In one embodiment, as illustrated in 1803a of FIG. 18, there are three symbols in NR-SS block. The NR-PBCH symbol with inserted NR-DRMS REs has wider bandwidth than that of NR-PSS/SSS. The wider bandwidth provides more REs in the frequency domain for information delivery. The inserted NR-DMRS are used to achieve the CSI estimation over the wide BW. For example, if the NR-DMRS overhead is ⅓ REs within the NR-PBCH symbol, the BW can be extended to 1.5 times of the sync BW to keep the similar NR-PBCH coding rate in case of no NR-DMRS. If the NR-DMRS overhead is ½ REs within the NR-PBCH symbol, the BW can be extended to 2 times of the sync BW.

In one embodiment, as illustrated in 1803b of FIG. 18, there are three symbols in NR-SS block. The NR-PBCH symbol with inserted NR-DRMS REs has same bandwidth as that of NR-PSS/SSS. Compared with two-symbol NR-PBCH, less REs are available for information delivery. The inserted NR-DMRS together with NR-SSS can be used to achieve the improved CSI estimation over the sync BW.

Figure 19:
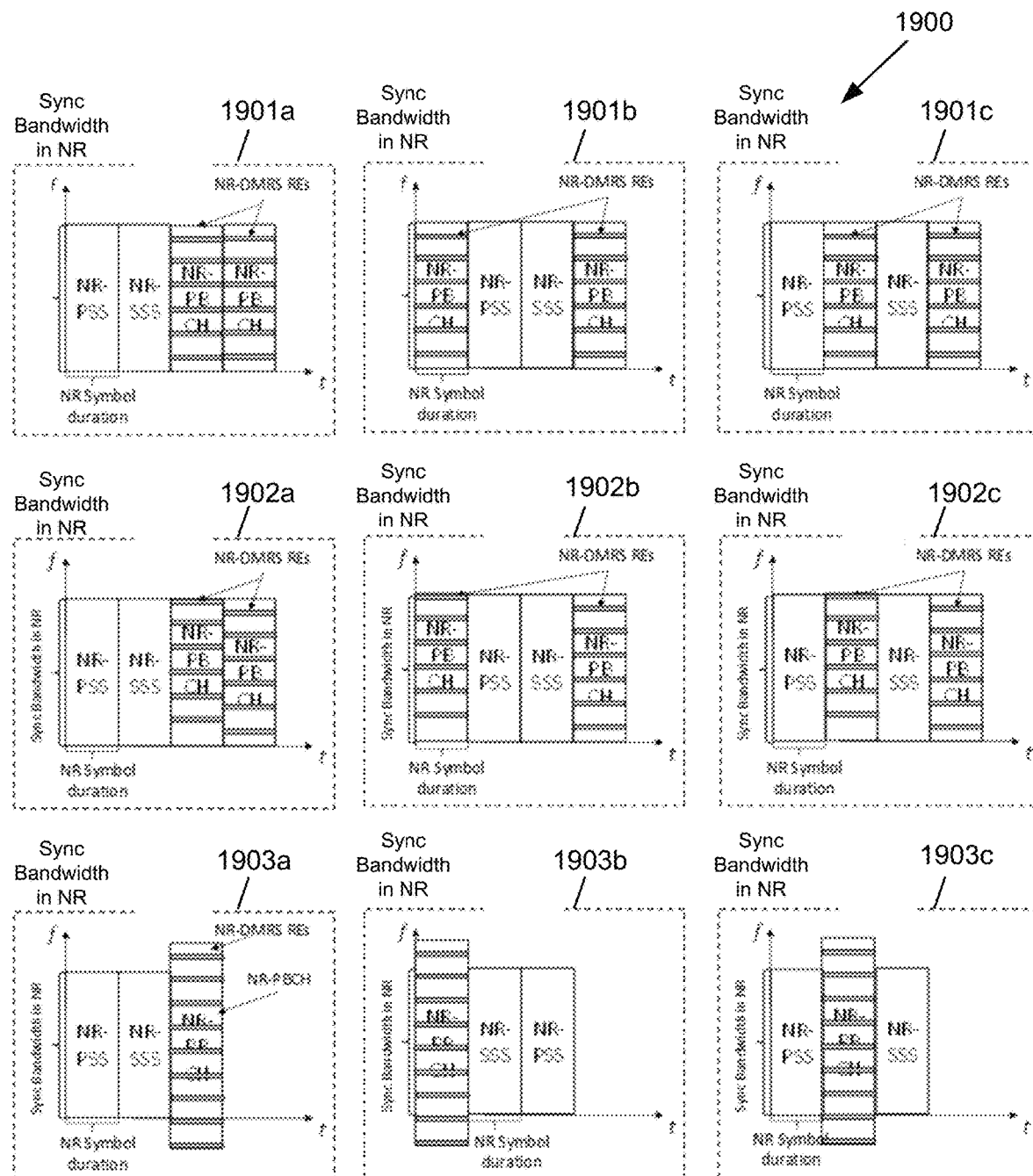
FIG. 19 illustrates an example TDM PSS/SSS/PBCH symbols according to embodiments of the present disclosure.

FIG. 19 illustrates an example TDM PSS/SSS/PBCH symbol 1900 according to embodiments of the present disclosure. The embodiment of the TDM PSS/SSS/PBCH symbol 1900 illustrated in FIG. 19 is for illustration only. FIG. 19 does not limit the scope of this disclosure to any particular implementation.

Figure 20:
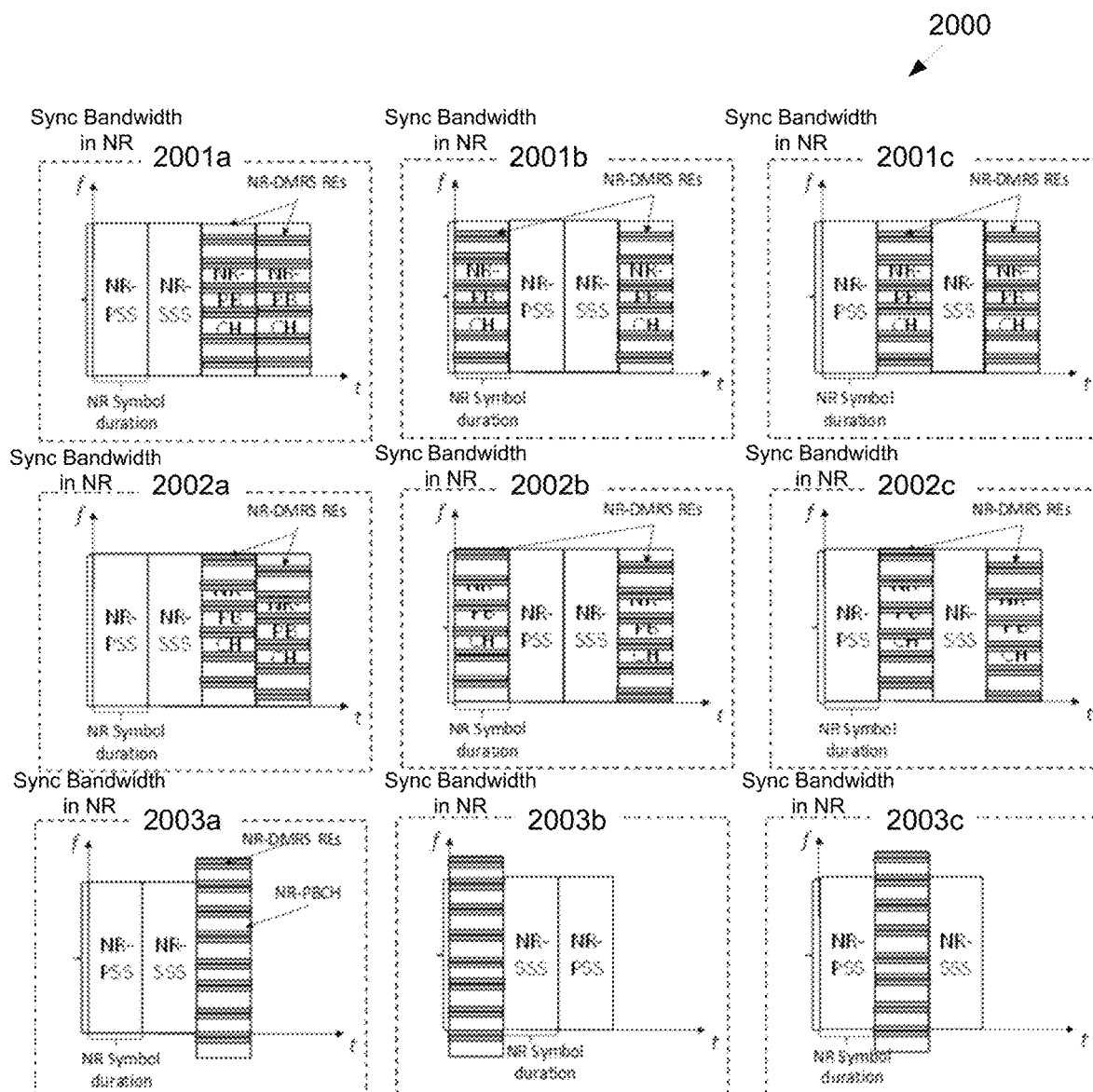
FIG. 20 illustrates another example TDM PSS/SSS/PBCH symbols according to embodiments of the present disclosure.

FIG. 20 illustrates another example TDM PSS/SSS/PBCH symbol 2000 according to embodiments of the present disclosure. The embodiment of the TDM PSS/SSS/PBCH symbol 2000 illustrated in FIG. 20 is for illustration only. FIG. 20 does not limit the scope of this disclosure to any particular implementation.

More embodiments with varied positions of the PSS/SSS/PBCH symbols as well as the IFDM PBCH/DMRS are illustrated in FIG. 19 and FIG. 20.

FIG. 19 illustrate the embodiments of TDM PSS/SSS/PBCH symbols, where the DMRS REs are inserted in PBCH symbols by using IFDM. The NR-SSS can be used for coherent detection of the DMRS sequences. The NR-PBCH demodulation is based on the CSI obtained by the NR-SSS together with the DMRS. The relative position of NR-SSS and NR-PBCH may have different impact on the channel estimation accuracy especially for mobile user terminals.

As shown in FIG. 19, in 1901a/b/c of FIG. 19, the DMRS REs use the same subcarrier positions in more than one PBCH symbols. In 1902a/b/c of FIG. 19, the DMRS REs use the shifted subcarrier positions in two PBCH symbols. The DMRS REs are shifted in two PBCH symbols, which can be jointly used for the CSI interpolation/smoothing. For example, assuming ⅙ DMRS overhead, the DMRS REs are mapped every 6 subcarriers and the DMRS REs in the second PBCH symbol is shifted by 3 subcarriers relative to those of the first PBCH symbol. The same PBCH bits can be mapped on the remaining REs in two PBCH symbols. The time-domain phase comparison between same REs of the two PBCH symbols can be used for CFO estimation before PBCH decoding.

For 1901a/b/c and 1902a/b/c of FIG. 19, both same short DMRS sequences in one PBCH symbol and long DMRS sequences over multiple PBCH symbols can be considered. One sub-embodiment is to use same short DMRS sequences in each PBCH symbol and the DMRS length is dependent on the DMRS REs in each PBCH symbol. For example, assuming ⅙ DMRS overhead, there are 42 DMRS REs in one PBCH symbol with 255 REs. The $L_{DMRS}$-length sequences, mapping on one subcarrier every 6 subcarriers, e.g., Zadoff-Chu sequences ($L_{DMRS}$=31, 37 or 41) or m-sequences (single sequence with $L_{DMRS}$=31), can be used for indicating the SS block timing or part of the SS block timing, such as, SS block index per SS burst, and/or SS slot index per SS burst, and/or SS burst index if there are more than one SS burst.

In one embodiment, a long DMRS sequence mapping into the DMRS REs of two PBCH symbols and the DMRS sequence length is dependent on the total DMRS REs of two PBCH symbols. In one example, assuming ¼ DMRS overhead, there are 63 DMRS REs in one PBCH symbol with 255 REs. The $L_{DMRS}$-length sequences, mapping on one subcarrier every 4 subcarriers, e.g., Zadoff-Chu sequences ($L_{DMRS}$=61) or m-sequences (single sequence with $L_{DMRS}$=63 or interleaved two m-sequences with length 31) can, can be used for indicating the SS block timing or part of the SS block timing, such as, SS block index per SS burst, and/or SS slot index per SS burst, and/or SS burst index if there are more than one SS burst.

In one embodiment, a long DMRS sequence mapping into the DMRS REs of two PBCH symbols and the DMRS sequence with length of 2*63 can use the interleaved two m-sequences with length of 63. For example, assuming ⅓ DMRS overhead, there are 85 DMRS REs in two PBCH symbols with 255 REs per symbol. The $L_{DMRS}$-length sequences mapping every 3 subcarriers in two PBCH symbols, e.g., Zadoff-Chu sequences ($L_{DMRS}$=83, or 79) or m-sequences (single sequence with $L_{DMRS}$=63 or interleaved two m-sequences with length 31) can be used for indicating the SS block timing or part of the SS block timing, such as, SS block index per SS burst, and/or SS slot index per SS burst, and/or SS burst index if there are more than one SS burst. The DMRS sequences are used to identify different hypotheses and longer DMRS sequence length carry a larger number of hypotheses at the price of higher detection complexity at the UE side.

In one embodiment, as illustrated in 1903a/b/c of FIG. 19, there are three symbols in NR-SS block. The NR-PBCH symbol with inserted NR-DRMS REs has wider bandwidth than that of NR-PSS/SSS. The wider bandwidth provides more REs in the frequency domain for information delivery. The inserted NR-DMRS are used to achieve the CSI estimation over the wide BW. For example, if the NR-DMRS overhead is ⅙ REs within the NR-PBCH symbol, the BW can be extended to lightly larger than that of the sync BW with comparable NR-PBCH coding rate in case of no NR-DMRS. The length of DMRS sequences depends on the total number of DMRS REs in an NR-PBCH symbol.

For example, assuming ⅙ DMRS overhead, there are 42, 48 or 50 DMRS REs if the PBCH symbol have 252, 288 or 300 REs in total. The $L_{DMRS}$-length sequences mapping every 6 subcarriers in two PBCH symbols, e.g., Zadoff-Chu sequences ($L_{DMRS}$=41, 43 or 47) or m-sequences (single sequence with $L_{DMRS}$=31) can be used. Another example, assuming ⅙ DMRS overhead, there are 50 DMRS REs with 25 RBs if the PBCH symbol have 300 REs in total of 25 RBs. The $L_{DMRS}$-length sequences mapping every 6 subcarriers in two PBCH symbols, e.g., Zadoff-Chu sequences ($L_{DMRS}$=53) or m-sequences (single sequence with $L_{DMRS}$=63 or interleaved two m-sequences with length 31) can be used.

FIG. 20 illustrates the embodiments of TDM PSS/SSS/PBCH symbols, where the block IFDM DMRS pattern is used for DMRS inserted in PBCH symbols. A group of consecutive DMRS REs is regarded as a block. For example, assuming ⅓ DMRS overhead, a DMRS block has 2 consecutive subcarriers, mapping the 2 subcarriers every 6 subcarriers. The NR-SSS can be used for coherent detection of the DMRS sequences. The NR-PBCH demodulation is based on the CSI obtained by the NR-SSS together with the DMRS. The relative position of NR-SSS and NR-PBCH may have different impact on the channel estimation accuracy especially for mobile user terminals.

As shown in FIG. 20, in 2001a/b/c of FIG. 20, the DMRS REs use the same subcarrier positions in more than one PBCH symbols. In 2002a/b/c of FIG. 20, the DMRS RE blocks use the shifted subcarrier positions in two PBCH symbols. The DMRS RE blocks are shifted in two PBCH symbols, which can be jointly used for the CSI interpolation/smoothing. For example, assuming ⅓ DMRS overhead, each DMRS RE block with 2 subcarriers are mapped every 6 subcarriers and the DMRS RE blocks in the second PBCH symbol is shifted by 3 subcarriers relative to those of the first PBCH symbol. The same PBCH bits can be mapped on the remaining REs in two PBCH symbols. The time-domain phase comparison between same REs of the two PBCH symbols can be used for CFO estimation before PBCH decoding.

For 2001a/b/c and 2002/a/b/c of FIG. 20, both same short DMRS sequences per PBCH symbol and long DMRS sequences over PBCH symbols can be considered. One sub-embodiment is to use same short DMRS sequences in each PBCH symbol and the DMRS length is dependent on the DMRS REs in each PBCH symbol. For example, assuming ⅙ DMRS overhead, there are 42 DMRS REs in one PBCH symbol with 255 REs. The $L_{DMRS}$-length sequences, mapping on one subcarrier every 6 subcarriers, e.g., Zadoff-Chu sequences ($L_{DMRS}$=83, or 79) or m-sequences (single sequence with $L_{DMRS}$=63 or interleaved two m-sequences with length 31) can, can be used for indicating the SS block timing or part of the SS block timing, such as, SS block index per SS burst, and/or SS slot index per SS burst, and/or SS burst index if there are more than one SS burst.

In one embodiment, a long DMRS sequence mapping into the DMRS REs of two PBCH symbols and the DMRS sequence length is dependent on the total DMRS REs of two PBCH symbols. Another example, assuming ¼ DMRS overhead, there are 63 DMRS REs in one PBCH symbol with 255 REs. The $L_{DMRS}$-length sequences, mapping on one subcarrier every 4 subcarriers, e.g., Zadoff-Chu sequences ($L_{DMRS}$=61) or m-sequences (single sequence with $L_{DMRS}$=63 or interleaved two m-sequences with length 31) can, can be used for indicating the SS block timing or part of the SS block timing, such as, SS block index per SS burst, and/or SS slot index per SS burst, and/or SS burst index if there are more than one SS burst.

In one embodiment, a long DMRS sequence mapping into the DMRS REs of two PBCH symbols and the DMRS sequence with length of 2*63 can use the interleaved two m-sequences with length of 63. In one example, assuming ⅓ DMRS overhead, there are 170 DMRS REs in two PBCH symbols with 255 REs per symbol. The $L_{DMRS}$-length sequences mapping every 6 subcarriers in two PBCH symbols, e.g., Zadoff-Chu sequences ($L_{DMRS}$=127, 163, or 167) or m-sequences (single sequence with $L_{DMRS}$=127 or interleaved two m-sequences with length 63) can be used for indicating the SS block timing or part of the SS block timing, such as, SS block index per SS burst, and/or SS slot index per SS burst, and/or SS burst index if there are more than one SS burst. The DMRS sequences are used to identify different hypotheses and longer DMRS sequence length carry a larger number of hypotheses at the price of higher detection complexity at the UE side.

In one embodiment, as illustrated in 2003a/b/c of FIG. 20, there are three symbols in NR-SS block. The NR-PBCH symbol with inserted NR-DRMS RE blocks has wider bandwidth than that of NR-PSS/SSS. The wider bandwidth provides more REs in the frequency domain for information delivery. The inserted NR-DMRS are used to achieve the CSI estimation over the wide BW. For example, if the NR-DMRS overhead is ⅙ REs within the NR-PBCH symbol, the BW can be extended to lightly larger than that of the sync BW with comparable NR-PBCH coding rate in case of no NR-DMRS. The length of DMRS sequences depends on the total number of DMRS REs in an NR-PBCH symbol.

For example, assuming ⅙ DMRS overhead, there are 42, 48 or 50 DMRS REs if the PBCH symbol have 252, 288 or 300 REs in total. The $L_{DMRS}$-length sequences mapping every 6 subcarriers in two PBCH symbols, e.g., Zadoff-Chu sequences ($L_{DMRS}$=41, 43 or 47) or m-sequences (single sequence with $L_{DMRS}$=31) can be used. Another example, assuming ⅙ DMRS overhead, there are 50 DMRS REs with 25 RBs if the PBCH symbol have 300 REs in total of 25 RBs. The $L_{DMRS}$-length sequences mapping every 6 subcarriers in two PBCH symbols, e.g., Zadoff-Chu sequences ($L_{DMRS}$=53) or m-sequences (single sequence with $L_{DMRS}$=63 or interleaved two m-sequences with length 31) can be used.

Note that the NR-PBCH together with NR-DMRS is scrambled by using the cell-specific sequence to separate the SS blocks with different cell ID. The NR-DRMS sequence detection can be carried out using the CSI estimation achieved by NR-SSS. The NR-PBCH is demodulated by using the CSI estimation based on NR-SSS and NR-DMRS together to combat with Doppler and residual CFO as well as the noise and interference.

Also note that the SS block hypotheses carried in NR-DMRS can be full or partial SS burst indices and/or full or partial SS block indices or SS timing indices. If there are multiple combinations of the part of the SS burst indices and/or SS block indices to be indicated, the CRC/inverse CRC, and/or scrambling sequences, and/or the NR-PBCH/NR-DMRS multiplexing patterns (such as changing frequency offset of the NR-DMRS subcarriers as different multiplexing patterns) can be utilized to indicate part of the combinations, and other signal(s) and/or channel(s) can be utilized to indicate the remaining combinations.

Figure 21A:
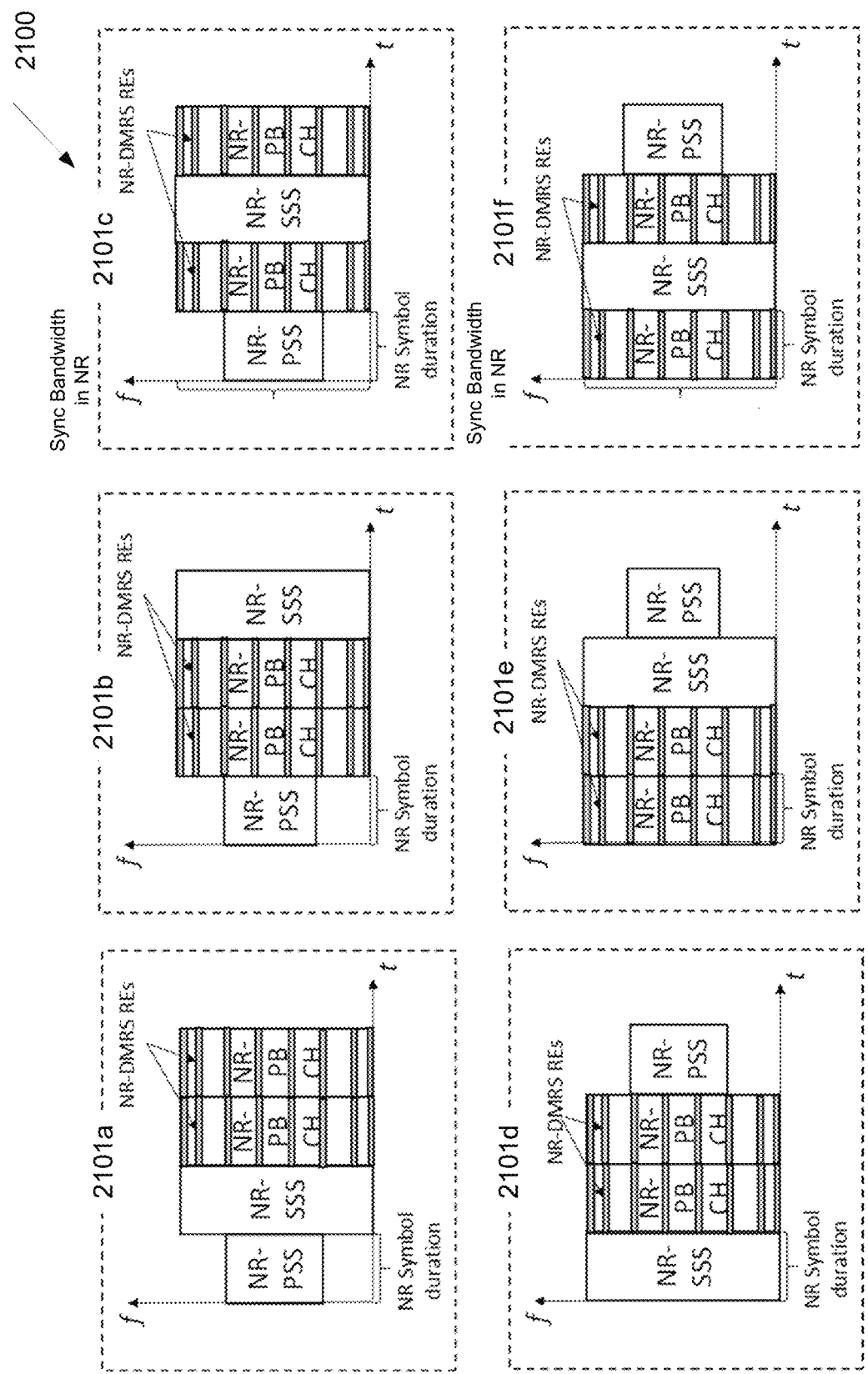
FIG. 21A illustrates an example NR-SSS sequence according to embodiments of the present disclosure.

FIG. 21A illustrates an example NR-SSS sequence 2100 according to embodiments of the present disclosure. The embodiment of the NR-SSS sequence 2100 illustrated in FIG. 21A is for illustration only. FIG. 21A does not limit the scope of this disclosure to any particular implementation.

Figure 21B:
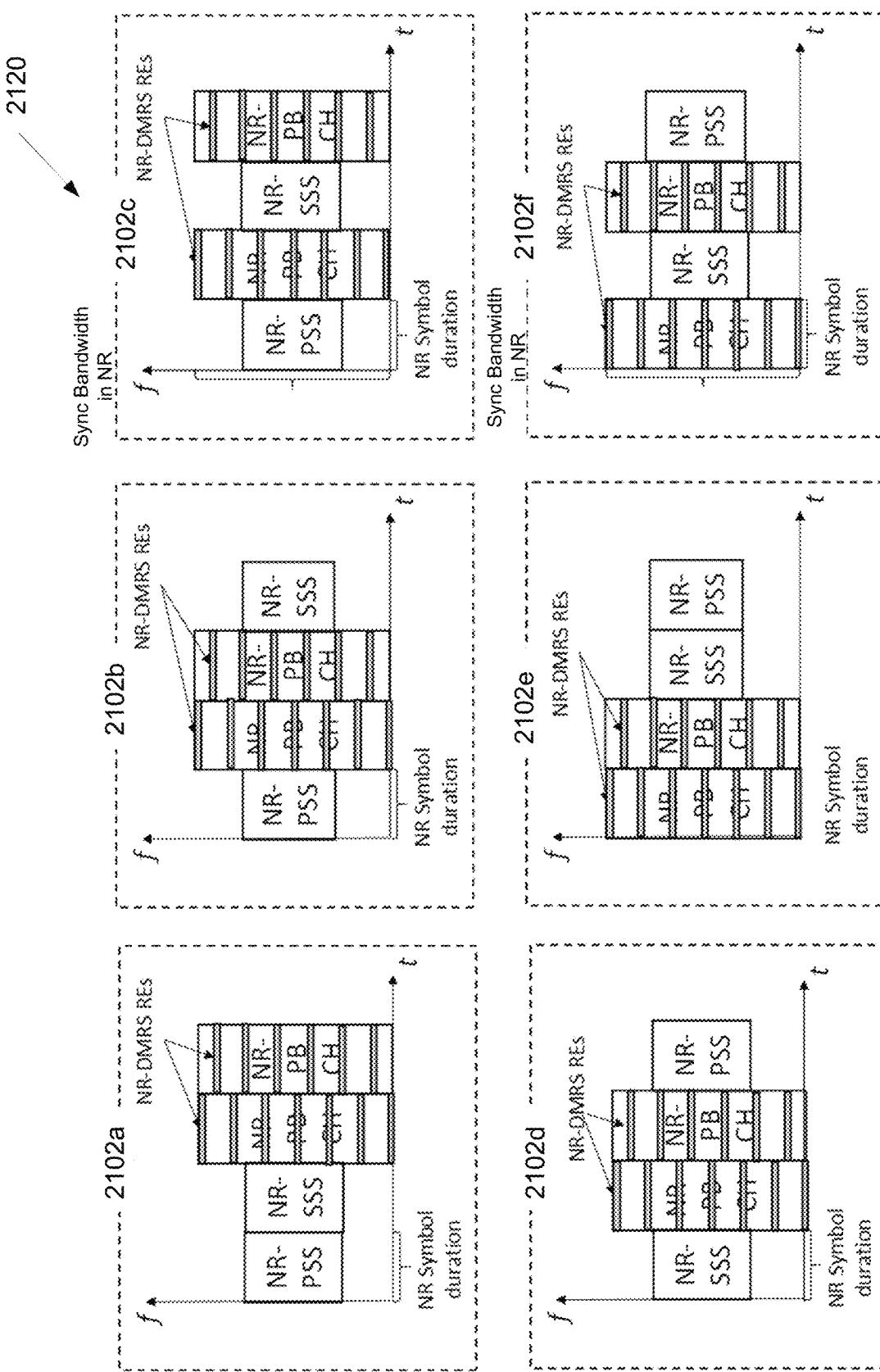
FIG. 21B illustrates another example NR-SSS sequence according to embodiments of the present disclosure.

FIG. 21B illustrates another example NR-SSS sequence 2120 according to embodiments of the present disclosure. The embodiment of the NR-SSS sequence 2120 illustrated in FIG. 21B is for illustration only. FIG. 21B does not limit the scope of this disclosure to any particular implementation.

Also note that the NR-DMRS can also be termed as additional RS, additional SS, new SS, tertiary sync signal (TSS), extended SS (ESS), etc. Besides the RS based on the sequence design, the RS based on message coding can also be used to indicate the information for SS block timing. The message-based RS can use NR-SSS for coherent detection. Two codewords are used for NR-PBCH and message-based RS separately. The NR-PBCH/NR-DMRS TDM/IFDM multiplexing patterns illustrated in FIGS. 18, 19, and 20 can be used to distribute the REs of the messaged-based RS in the bandwidth for PBCH symbol(s) to achieve frequency diversity. Also note that the location of NR-PSS and NR-SSS in FIGS. 19, 20, 21A, and 21B can also be shifted as variation of the sub-embodiments.

And the bandwidth of the NR-PBCH symbol(s) in FIGS. 19, 20, 21A, and 21B could be adjusted slightly larger than that of NR-PSS/SSS considering more information bits to be included in MIB or some implementation consideration, such as filter processing of the NR-PSS/SSS, etc.

Another embodiment is to have different bandwidth for NR-PSS and NR-SSS but keep the NR-SSS bandwidth same or similar with NR-PBCH, as illustrated in FIGS. 21A and 21B. Assuming same transmit power for NR-PSS/SSS/PBCH symbols, the NR-PSS with power boosting over smaller bandwidth can achieve similar timing/CFO/cell ID detection while reducing the detection complexity at the UE side.

However, the NR-PBCH symbols with wider bandwidth provide more REs to include self-contained DMRS and sufficient remaining REs to send information MIB and other timing-related information, e.g., SS block index, burst index and/or the LSB of SFN (system frame number). The SFN is defined as the index of 10 ms radio frames. The NR-SSS with same or similar bandwidth as that of NR-PBCH can be used to get the channel estimation for PBCH demodulation and the DMRS/TSS demodulation if NR-SSS and NR-PBCH as well as NR-DMRS use same transmission scheme on the same antenna port.

For example, the NR-PSS bandwidth has 12 RBs and the NR-PSS sequence with length of 127 is mapped onto consecutive 127 subcarriers of $\{-63,-62\ldots-1,0,1,\ldots 62, 63\}$. The 144−127=17 subcarriers at the edges are reserved as the 11.8% guard band to avoid the interference from the data in case the data numerology is different from that of NS-PSS OFDM symbol.

Regarding the NR-SSS bandwidth and NR-SSS sequence design, the following two sub-embodiments are illustrated. One sub-embodiment is shown in FIG. 21A, where the NR-SSS bandwidth has 24 RBs, larger than that of NR-PSS but same with that of NR-PBCH. And another sub-embodiment is shown in FIG. 21B, where the NR-SSS bandwidth has 12 RBs, similar to that of NR-PSS.

In case of FIG. 21A with NR-SSS with 24 RBs, the NR-SSS sequence with length of 255 can be mapped onto the consecutive subcarriers of the 255 subcarriers (including DC) as $\{-127, -126, \ldots -1, 0, 1, 2, \ldots, 126, 127\}$. Another alternative is that the NR-SSS sequence with length of 127 is mapped onto the even or odd subcarriers of the 254 subcarriers as $\{-126, -124, \ldots -2, 0, 2, 4, \ldots, 124, 126\}$ or $\{-125, -123, \ldots -1, 1, 3, \ldots 125, 127\}$. The 288−254=34 subcarriers at the edges are reserved as the 11.8% guard band to avoid the interference from the data in case the data numerology is different from that of NS-SSS OFDM symbol.

The NR-PBCH bandwidth also has 24 RBs and there are 254 (or 260) REs are used and the 288−254=34 (or 288−260=28) subcarriers at the edges are reserved as the 11.8% (or 9.7%) guard band to avoid the interference from the data in case the data numerology is different from that of NS-PBCH OFDM symbol(s).

Therefore, the DMRS-sequence with length can be repeated twice in the time-domain or in the frequency-domain. If the DMRS-sequence is repeated in the time domain, the sequence is mapped on the DMRS REs distributed in the center 254-subcarrier (except DC) bandwidth of two NR-PBCH symbols, which is overlapped with the NR-SSS bandwidth. For the center 254 REs in NR-PBCH symbols, the self-contained DMRS with smaller overhead, e.g., 1 DMRS RE every 4 or 6 subcarriers, can be used together with the NR-SSS using same transmission scheme on the same antenna port to achieve the improved channel estimation. For the REs outside the center 254 REs, e.g., 260−254=6 REs, the self-contained DMRS with same or slightly larger overhead, e.g., 1 DMRS RE every 3 subcarriers, is used only to get the channel estimation. Note that at least one DMRS RE may be located at each edge respectively, e.g., subcarrier index of −130 and 129 to assist the channel interpolation.

If the NR-SSS sequence mapping on either odd subcarriers or even subcarriers are both supported, it can be used to indicate timing-related information, such as 1-bit part of the SS block index, or 1-bit part of the SS burst index, or the 1-bit part of SFN, or further timing information within an SFN (e.g. first or second 5 ms within an SFN). For example, the most significant bits of the SFN indicated in PBCH explicitly and/or implicitly, such as 7 bits of (SFN mode 8)

is indicated in MIB and 2 bits by using implicit indication based on the 4 scrambling codes of CRC same as LTE to identify the four 20 ms within 80 ms PBCH TTI. And the two NR-SSS sequence mapping patterns are used to let UE identify the two 10 ms-frame every 20 ms.

In one example, the NR-SSS sequence mapping only on the even subcarriers is used to allow the UE to derive the 1st 10 ms every 20 ms and the NR-SSS sequence mapping only on the odd subcarriers is used to indicate the 2nd 10 ms every 20 ms. It is useful for the CONN/IDLE UEs with periodicity of 10 ms to identify the timing of the NR-SS block(s). For the CONN/IDLE UEs with periodicity of 5 ms could detect the 10 ms frame boundary and identify the detected $1^{st}$ and $2^{nd}$ NR-SS blocks in each 10 ms.

In another example, the most significant bits of the SFN indicated in PBCH explicitly and/or implicitly, such as 7 bits of (SFN mode 8), is indicated in MIB and 3 bits by using implicit indication based on the 8 scrambling codes of CRC to identify the 8 10 ms within 80 ms PBCH TTI. And the two NR-SSS sequence mapping patterns are used to let UE identify the two 5 ms-frame every 10 ms. For example, the NR-SSS sequence mapping only on the even subcarriers is used to allow the UE to derive the 1st 5 ms every 10 ms and the NR-SSS sequence mapping only on the odd subcarriers is used to indicate the 2nd 5 ms every 10 ms. It is useful for the CONN/IDLE UEs with periodicity of 5 ms to identify the timing of the NR-SS block(s).

If there is no such indication based on the multiple NR SSS mapping patterns, to keep 7-bit most significant bits of the SFN in MIB (SFN mode 8) indicated in PBCH explicitly, the network could use 4 bits implicit indication based on the 16 scrambling codes of CRC to identify the 16 5 ms-intervals within 80 ms PBCH TTI. Otherwise, if network only use 2 bits implicit indication based on the 4 scrambling codes of CRC to identify the 4 20 ms-intervals within 80 ms PBCH TTI. The UEs with periodicity of 10 ms (or 5 ms) have to detect the 20 ms frame boundary first and then identify the detected two (or four) NR-SS blocks in each 10 ms (5 ms). Of if network only use 3 bits implicit indication based on the 8 scrambling codes of CRC to identify the 8 10 ms-intervals within 80 ms PBCH TTI. The UEs with periodicity of 5 ms have to detect the 10 ms frame boundary first and then identify the detected two NR-SS blocks in each 5 ms.

In case of FIG. 21B with NR-SSS with 12 RBs, the NR-SSS sequence with length of 127 is mapped onto consecutive 127 subcarriers of {−63,−62 . . . −1, 0, 1, . . . 62, 63}. The 144−127=17 subcarriers at the edges are reserved as the 11.8% guard band to avoid the interference from the data in case the data numerology is different from that of NS-PSS OFDM symbol.

The NR-PBCH bandwidth of 24 RBs is two times wider than that of NR-SSS. There are 254 (or 260) REs are used and the 288−254=34 (or 288−260=28) subcarriers at the edges are reserved as the 11.8% (or 9.7%) guard band to avoid the interference from the data in case the data numerology is different from that of NS-SS block(s).

The self-contained DMRS with overhead of, e.g., 1 DMRS RE every 4 subcarriers, provide around 63×2 REs in two PBCH symbols. Therefore, the DMRS-sequence with length 63 can be repeated twice in the time-domain or in the frequency-domain. If the DMRS-sequence is repeated in the frequency domain, the sequence is mapped on the DMRS REs distributed in the center 126-subcarrier bandwidth of two NR-PBCH symbols, which is overlapped with the NR-PSS bandwidth (same as NR-SSS bandwidth if the NR-SSS is the same as NR-PSS).

And the repeated same DMRS sequence is mapped on the remaining DMRS REs outside the center 126-subcarrier bandwidth of two NR-PBCH symbols. For the center 126 REs in NR-PBCH symbols, the NR-SSS, if using same transmission scheme on the same antenna port as that of NR-PBCH and DMRS, could be used to get the channel estimation for coherent demodulation of DMRS/TSS sequence as well as the REs for PBCH payload. The different repeated methods of DMRS in frequency domain, if defined, can also be used to indicate the timing-related information. For example, the DMRS sequence in frequency domain can be divided into two parts as {A, B}. The repetition methods of {A, A, B, B} and {B, A, B, A} in the frequency domain are both supported, which can be used to indicate the part of the NR-SS block index, NR-SS burst index, and/or the LSB of SFN, and/or further timing information within an SFN (e.g. first or second 5 ms within an SFN).

The identified the DMRS sequence is used to indicate the timing-related information, such as NR-SS block index, burst index, etc. The identified DMRS sequence together with the NR-SSS using same transmission scheme on the same antenna port to achieve the improved channel estimation. For the REs outside the center 254 REs, e.g., 260−254=6 REs, the self-contained DMRS with same or slightly larger overhead, e.g., 1 DMRS RE every 3 subcarriers, is used only to get the channel estimation. Note that at least one DMRS RE may be located at each edge, respectively, e.g., subcarrier index of −130 and 129 to assist the channel interpolation. For sake of simplicity, the additional DMRS RE at the two edges can repeat the adjacent DMRS RE.

Figure 22A:
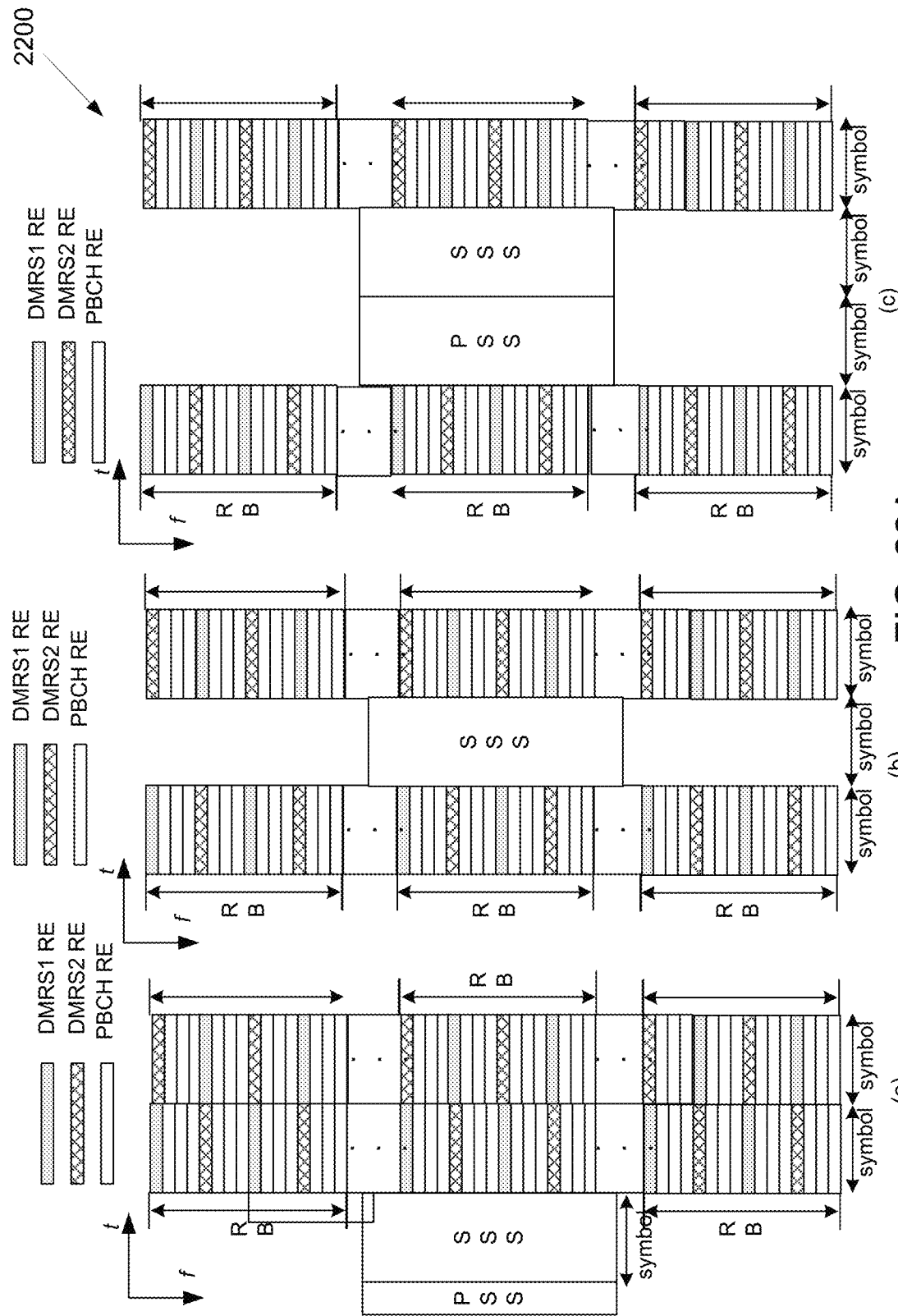
FIG. 22A illustrates an example self-contained DMRS design in NR-PBCH according to embodiments of the present disclosure.

FIG. 22A illustrates an example self-contained DMRS design in NR-PBCH 2200 according to embodiments of the present disclosure. The embodiment of the self-contained DMRS design in NR-PBCH 2200 illustrated in FIG. 22A is for illustration only. FIG. 22A does not limit the scope of this disclosure to any particular implementation.

Figure 22B:
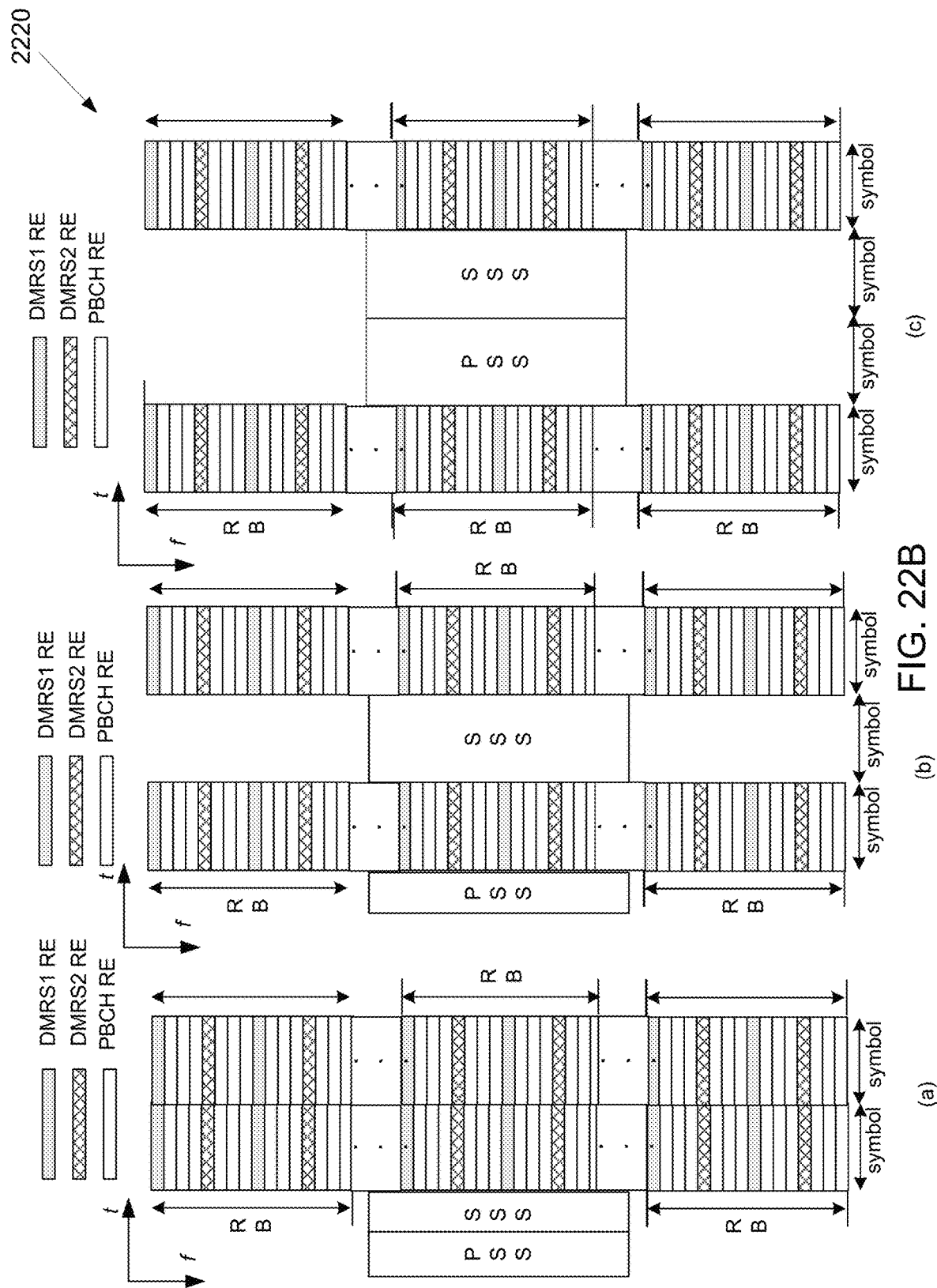
FIG. 22B illustrates another example self-contained DMRS design in NR-PBCH according to embodiments of the present disclosure.

FIG. 22B illustrates another example self-contained DMRS design in NR-PBCH 2220 according to embodiments of the present disclosure. The embodiment of the self-contained DMRS design in NR-PBCH 2220 illustrated in FIG. 22B is for illustration only. FIG. 22B does not limit the scope of this disclosure to any particular implementation.

Figure 23A:
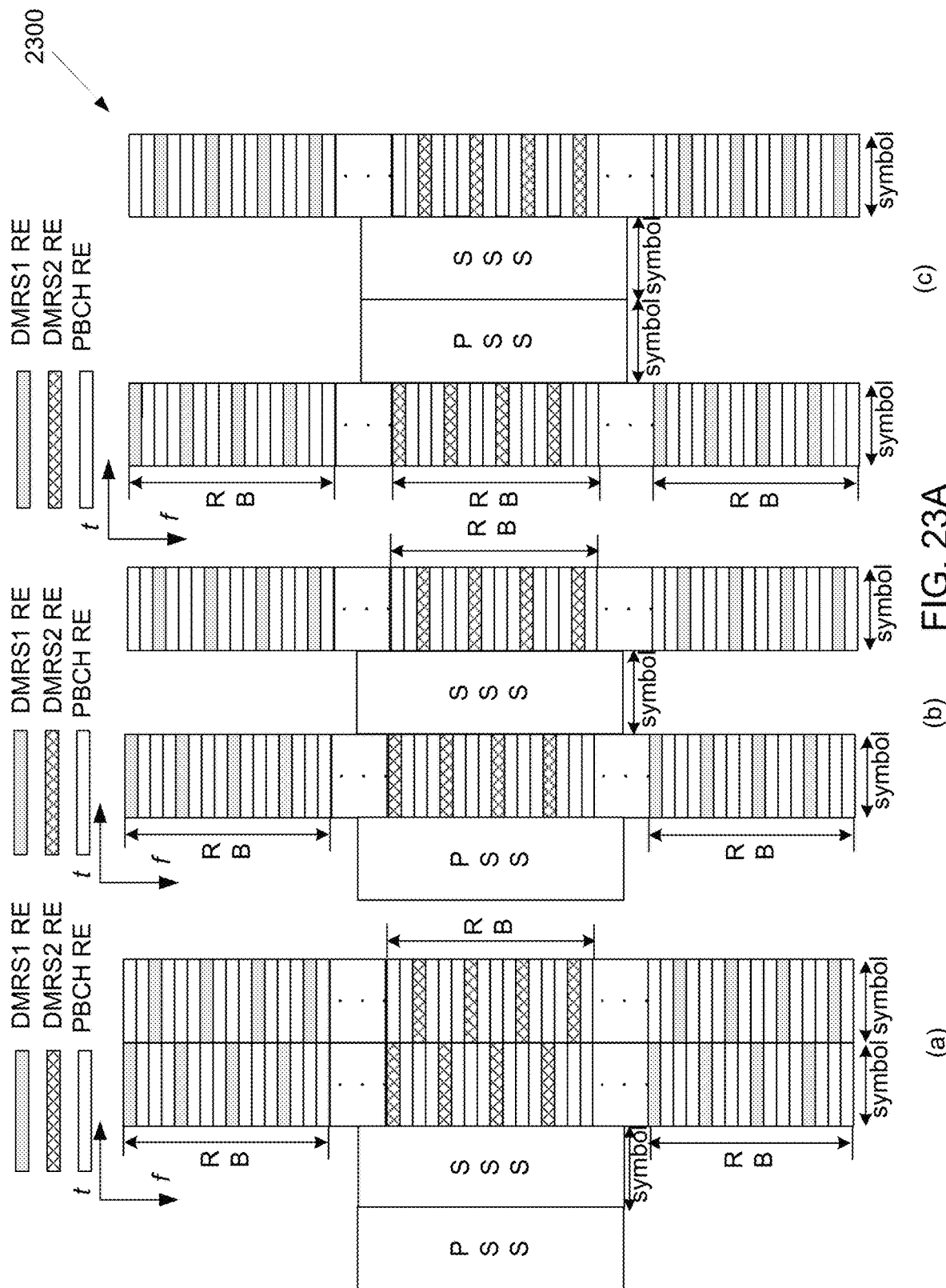
FIG. 23A illustrates yet another example self-contained DMRS design in NR-PBCH according to embodiments of the present disclosure.

FIG. 23A illustrates yet another example self-contained DMRS design 2300 in NR-PBCH according to embodiments of the present disclosure. The embodiment of the self-contained DMRS design 2300 illustrated in FIG. 23A is for illustration only. FIG. 23A does not limit the scope of this disclosure to any particular implementation.

Figure 23B:
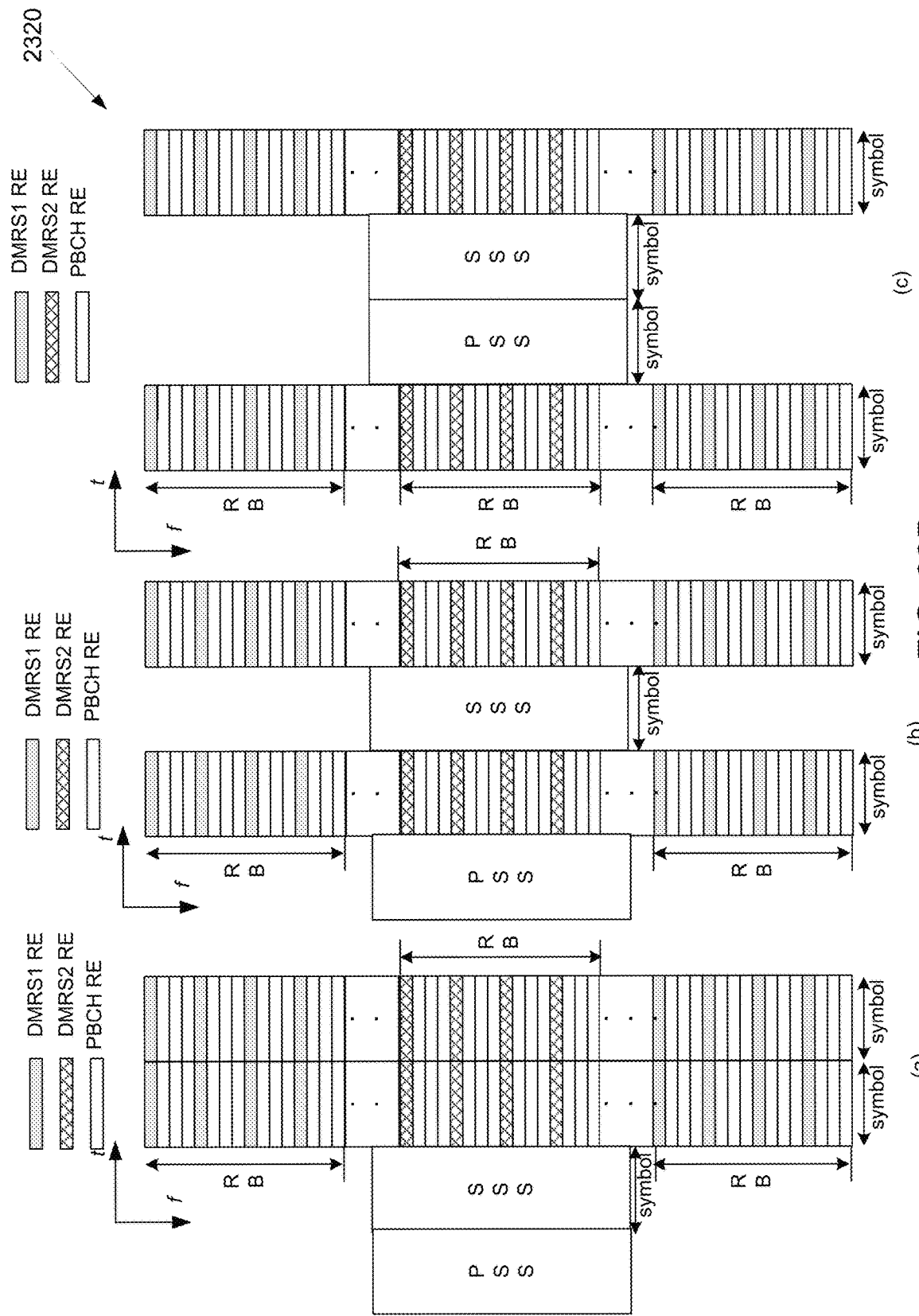
FIG. 23B illustrates yet another example self-contained DMRS design in NR-PBCH according to embodiments of the present disclosure.

FIG. 23B illustrates yet another example self-contained DMRS design 2320 in NR-PBCH according to embodiments of the present disclosure. The embodiment of the self-contained DMRS design 2320 illustrated in FIG. 23B is for illustration only. FIG. 23B does not limit the scope of this disclosure to any particular implementation.

Figure 24A:
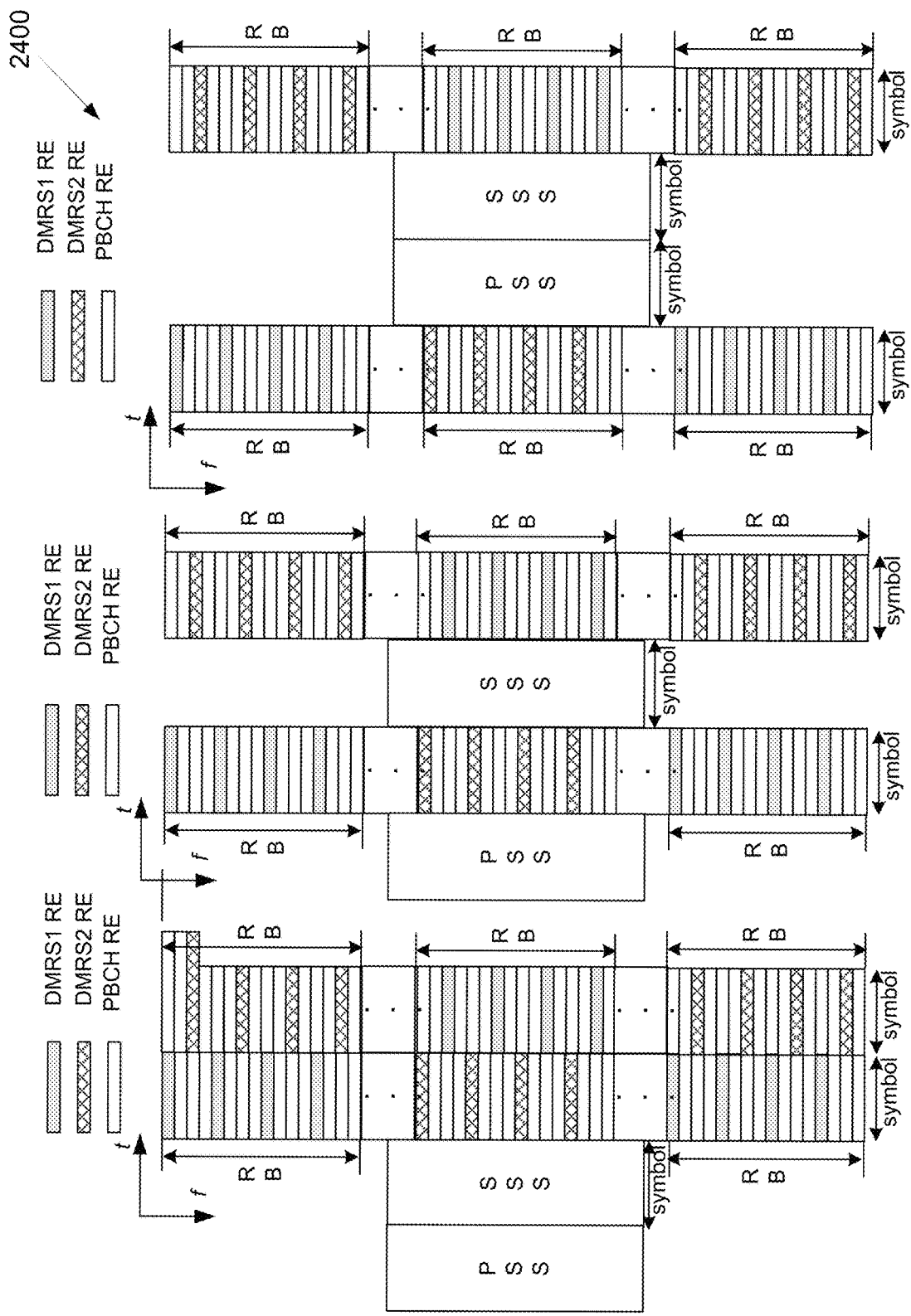
FIG. 24A illustrates yet another example self-contained DMRS design in NR-PBCH according to embodiments of the present disclosure.

FIG. 24A illustrates yet another example self-contained DMRS design 2400 in NR-PBCH according to embodiments of the present disclosure. The embodiment of the self-contained DMRS design 2400 illustrated in FIG. 24A is for illustration only. FIG. 24A does not limit the scope of this disclosure to any particular implementation.

Figure 24B:
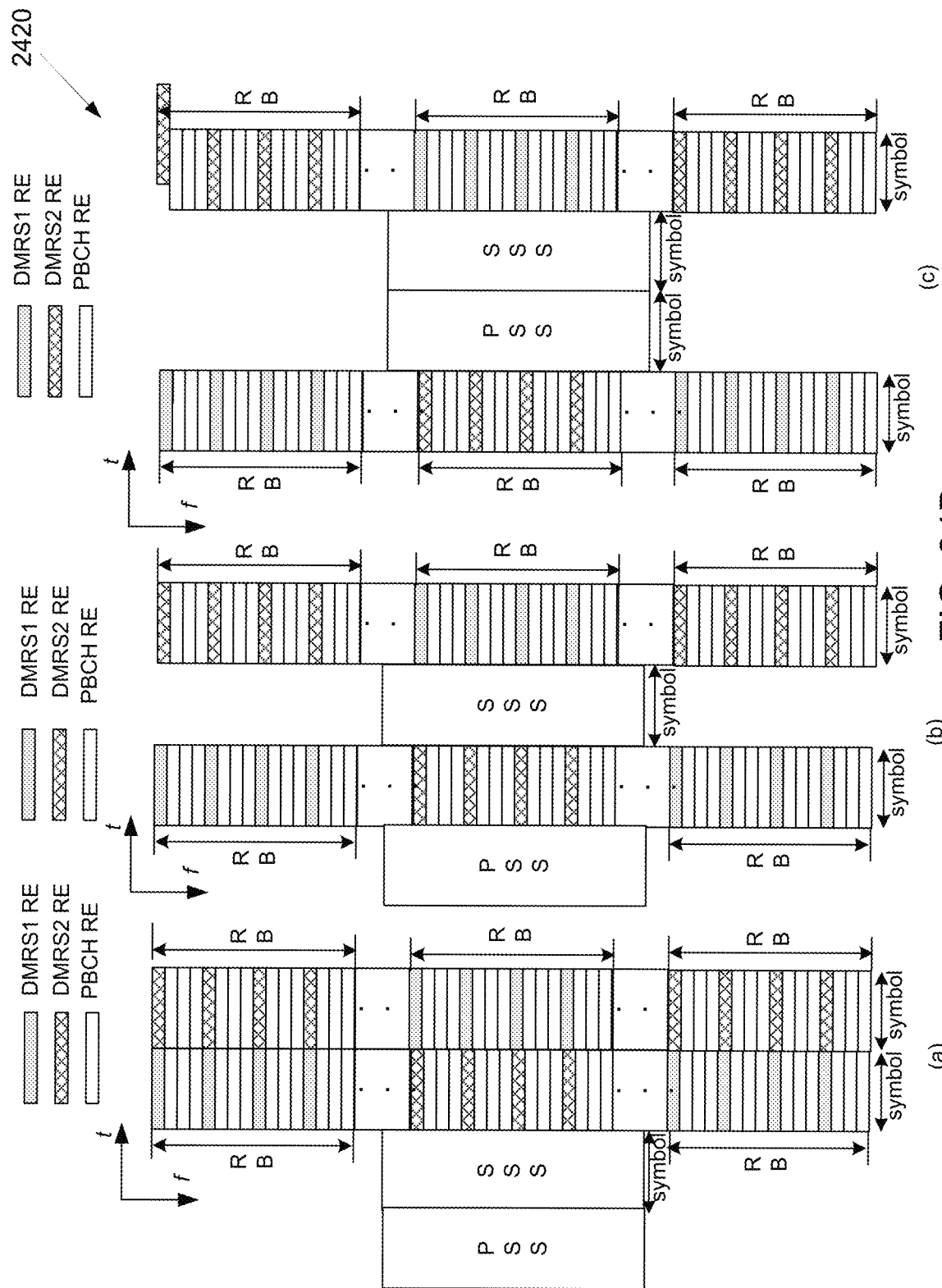
FIG. 24B illustrates yet another example self-contained DMRS design in NR-PBCH according to embodiments of the present disclosure.

FIG. 24B illustrates yet another example self-contained DMRS design 2420 in NR-PBCH according to embodiments of the present disclosure. The embodiment of the self-contained DMRS design 2420 illustrated in FIG. 24B is for illustration only. FIG. 24B does not limit the scope of this disclosure to any particular implementation.

In some embodiments of self-contained DMRS design in NR-PBCH, as illustrated in FIGS. 22A, 22B, 23A, 23B, 24A, and 24B, respectively, where there are two types of DMRS, e.g., DMRS1 and DMRS2. DMRS1 is cell-specific sequence and same for the NR-SS blocks in an NR-SS burst set and therefore DMRS1 does not carry the multiple hypotheses of timing indices, such as NR-SS block indices, or partial NR-SS block indices. DMRS2 is not only cell-specific but also NR-SS block-specific because DMRS2 carries the multiple hypotheses of timing indices, such as NR-SS block indices, or partial NR-SS block indices in an NR-SS burst set.

The partial NR-SS block indices can be the NR-SS block indices within an NR-SS burst or group. Or the partial NR-SS block indices can be the NR-SS burst or group indices. For example, DMRS2 indicate 3-bit or 4-bit partial NR-SS block indices within NR-SS block indices within an NR-SS burst. And the remaining 3-bit or 2-bit NR-SS burst indices are included in explicit PBCH information field and/or implicit scrambling CRC.

In FIGS. 24A and 24B, it is illustrated that DMRS1 and DMRS2 are located in the same RBs. For example, there are 2 REs for DMRS1 and 2 REs for DMRS2 within an RB. After the cell ID detection based on PSS/SSS, the DMRS1 is the known sequence. DMRS1 REs and DMRS2 REs are interleaved so that the DMRS2 can be detected based on channel estimation/interpolation using the known sequence DMRS1. The detected DMRS2 sequence can further improve the channel estimation in the whole NR-PBCH band for NR-PBCH demodulation.

The DMRS1 and DMRS2 location can be exchanged in two NR-PBCH symbols or shifted by a pre-defined subcarrier offset in two NR-PBCH symbols, such as adjacent NR-PBCH symbols in FIG. 24A (a), 1-symbol separated NR-PBCH symbols in FIG. 24A (b) and 2-symbol separated NR-PBCH symbols in FIG. 24A (c). Alternatively, the DMRS1 and DMRS2 location can be same in two NR-PBCH symbols, such as adjacent NR-PBCH symbols in FIG. 24B (a), 1-symbol separated NR-PBCH symbols in FIG. 24B (b) and 2-symbol separated NR-PBCH symbols in FIG. 24B (c).

In FIGS. 23A and 24B, it is illustrated that DMRS1 and DMRS2 are located in different RBs. For example, there are 4 REs for DMRS1 in the RBs outside the NR-SSS band and 4 REs for DMRS2 in the RBs inside the NR-SSS band. After the cell ID detection based on PSS/SSS, the DMRS1 is the known sequence and the UE use the DMRS1 to get the channel estimation/interpolation outside the SSS band. Inside the NR-SSS band, DMRS2 can be detected based on channel estimation/interpolation using the NR-SSS. The detected DMRS2 sequence can further improve the channel estimation inside the NR-SSS band for NR-PBCH demodulation.

The DMRS1 and DMRS2 location in the respective RBs can be shifted in two NR-PBCH symbols, such as adjacent NR-PBCH symbols in FIG. 23A (a), 1-symbol separated NR-PBCH symbols in FIG. 23A (b) and 2-symbol separated NR-PBCH symbols in FIG. 23A (c). Alternatively, the DMRS1 and DMRS2 location in the respective RBs can be same in two NR-PBCH symbols, such as adjacent NR-PBCH symbols in FIG. 23B (a), 1-symbol separated NR-PBCH symbols in FIG. 23B (b) and 2-symbol separated NR-PBCH symbols in FIG. 23B (c).

In FIGS. 24A and 24B, it is illustrated that DMRS1 and DMRS2 are located in different RBs. But the RB for DMRS1 and RBs for DMRS2 are RB-block-interleaved within an NR-PBCH symbol. The RBs for DMRS1 in the first NR-PBCH symbol are the same RBs for DMRS2 in the second NR-PBCH symbol; and the RBs for DMRS2 in the first NR-PBCH symbol are the same RBs for DMRS1 in the second NR-PBCH symbol.

For example, there are 4 REs for DMRS1 in the odd RBs and 4 REs for DMRS2 in the even RBs within the first NR-PBCH symbol; and there are 4 REs for DMRS2 in the odd RBs and 4 RBs for DMRS1 in the even RBs within the second NR-PBCH symbol. After the cell ID detection based on PSS/SSS, the DMRS1 is the known sequence. DMRS1 REs and DMRS2 REs are RB-block-interleaved so that the DMRS2 can be detected based on channel estimation/interpolation using the known sequence DMRS1. The detected DMRS2 sequence can further improve the channel estimation in the whole NR-PBCH band for NR-PBCH demodulation.

The DMRS1 and DMRS2 location can be shifted in two NR-PBCH symbols, such as adjacent NR-PBCH symbols in FIG. 24A (a), 1-symbol separated NR-PBCH symbols in FIG. 24A (b) and 2-symbol separated NR-PBCH symbols in FIG. 24A (c). Alternatively, the DMRS1 and DMRS2 location can be same in two NR-PBCH symbols, such as adjacent NR-PBCH symbols in FIG. 24B (a), 1-symbol separated NR-PBCH symbols in FIG. 24B (b) and 2-symbol separated NR-PBCH symbols in FIG. 24B (c).

Note that the other sub-embodiments include other DMRS overhead, such as ¼ REs for DMRS. For example, similar with FIGS. 24A and 24B, there are 3 REs for DMRS1 and 3 REs for DMRS2 interleaved in every 2 RBs within an NR-PBCH symbol. The bandwidth of PSS and/or SSS can be extended larger, similar to that of NR-PBCH symbols. The DMRS2 can also be used to indicate other timing indices, such as partial SFN, such as 10 ms, 20 ms, and/or 40 ms, within an NR-PBCH TTI and/or the 2-state 5 ms within a radio frame.

As in LTE, the NR time/frequency synchronization is to be obtained in multiple steps, starting with rough time/frequency synchronization duration the initial access procedure using PSS/SSS. For NR, the DMRS/TSS in PBCH in the NR SS block can also be used to further improve synchronization in this first step. However, the rough time/frequency synchronization only based on the NR SS blocks is not enough. The NR SS block sent in the pre-defined limited bandwidth has insufficient time resolution. Also, the limited time span with 4 or 5 symbols per SS block longer than LTE has poor Doppler resolution.

The pre-defined or configured periodicity of an NR SS burst set result in very sparse in time cannot achieve satisfied frequency offset estimation as well. The time/frequency synchronization is required at least for PDCCH demodulation based on PDCCH DMRS, tuning of UE transmit frequency, UE measurements based on CSI-RS, PDSCH demodulation using PDSCH DMRS and the IDLE UEs after long-time sleep to sync up quickly. Since the always-on CRS in LTE is not available in NR, the tracking RS (TRS) is needed to help UEs achieve fine time/frequency synchronization, including the estimation of time offset, frequency offset, delay spread as well as the Doppler spread.

The TRS could be pre-defined or configured by network, including parameters of on/off, antenna port, burst time span, time density, frequency density, bandwidth for each frequency band, as well as the association (relationship) between the time/frequency/spatial resources) between the TRS and the NR SS block(s) for one or multiple beams in case of beam sweeping. One example is that the TRS and the NR-SS block could be one-by-one mapping with same transmission beam/precoding. Another example is that the TRS and the NR-SS block could be one-by-many mapping, i.e., same TRS with same or wider beam could be configured for the NR-SS block(s) with same or similar beams in an NR SS burst. Another example is that the TRS and the NR-SS block could be one-by-many mapping, i.e., multiple TRS with same or narrower beams could be configured for one NR-SS block.

Figure 25A:
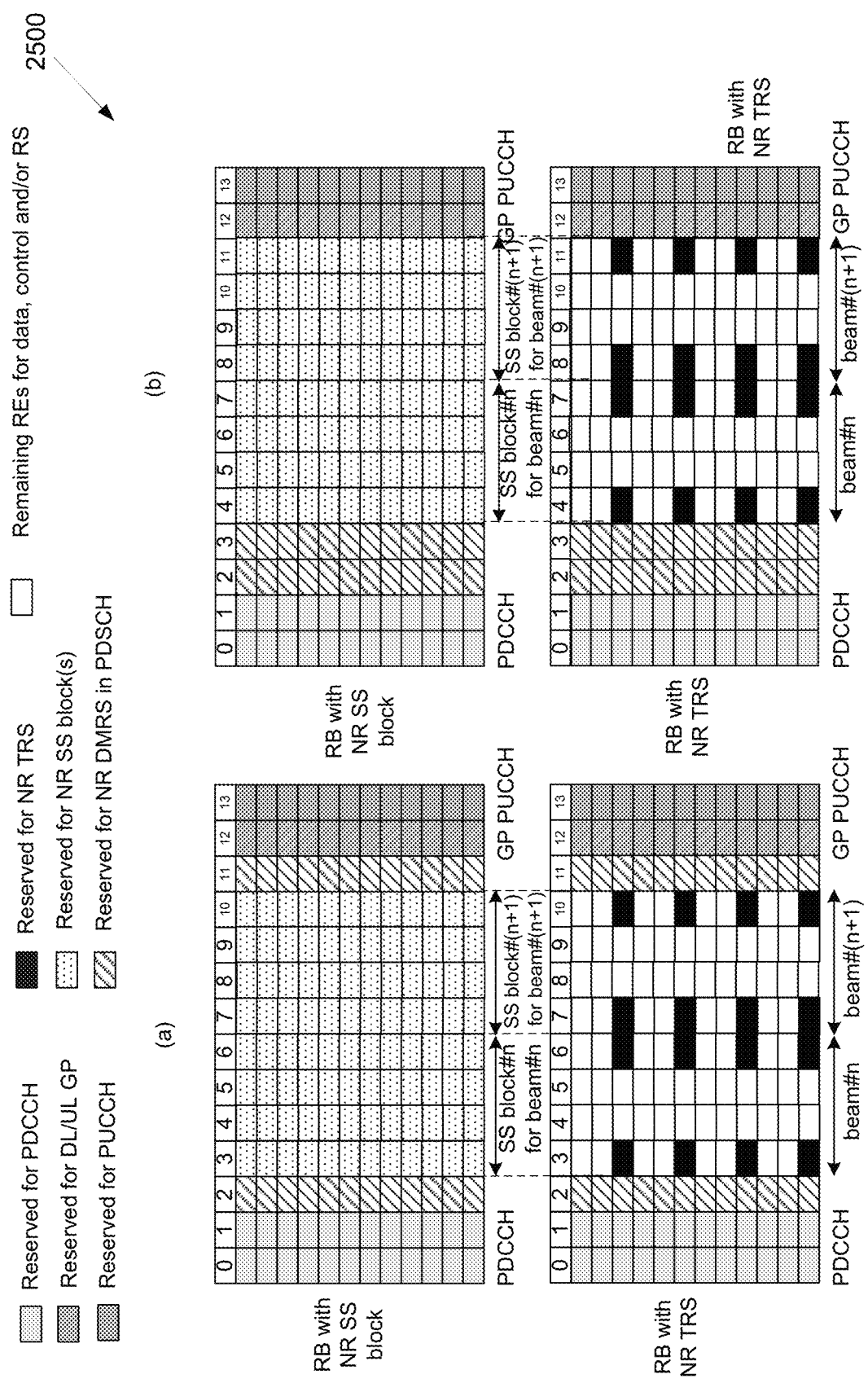
FIG. 25A illustrates an example location of NR-SS block according to embodiments of the present disclosure.

FIG. 25A illustrates an example location of NR-SS block 2500 according to embodiments of the present disclosure. The embodiment of the location of NR-SS block 2500 illustrated in FIG. 25A is for illustration only. FIG. 25A does not limit the scope of this disclosure to any particular implementation.

Figure 25B:
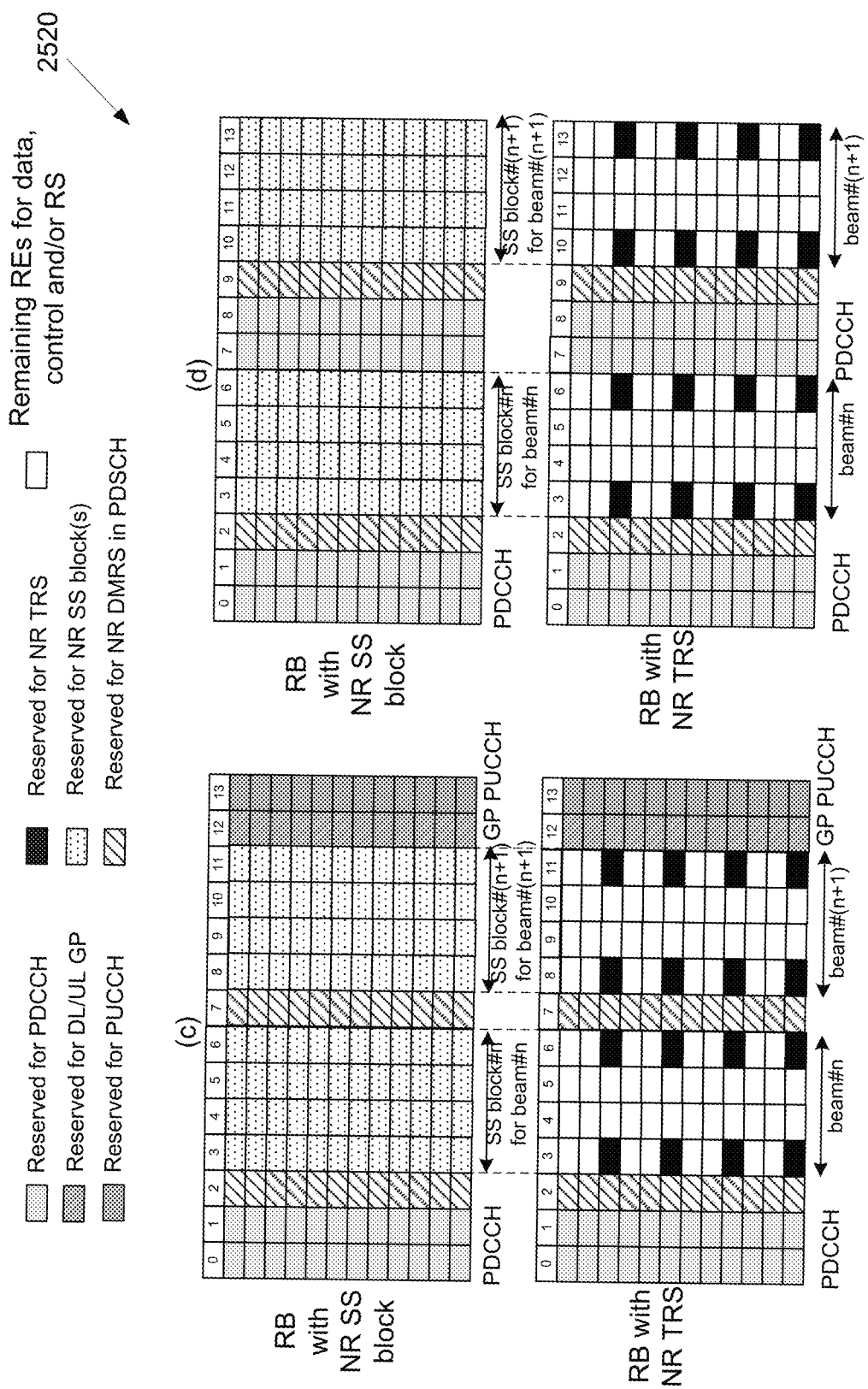
FIG. 25B illustrates another example location of NR-SS block according to embodiments of the present disclosure.

FIG. 25B illustrates another example location of NR-SS block 2520 according to embodiments of the present disclosure. The embodiment of the location of NR-SS block 2520 illustrated in FIG. 25B is for illustration only. FIG. 25B does not limit the scope of this disclosure to any particular implementation.

The embodiment of the one-by-one mapping between TRS and NR SS block is illustrated in FIGS. 25A, 25B, 25C, and 25D. In FIGS. 25A, 25B, 25C, and 25D, there are two NR-SS blocks in a 14-symbol slot with the subcarrier spacing (SCS) of NR-SS blocks, which is pre-defined for each frequency band. For example, SCS=15 kHz for 2 GHz band, SCS=30 kHz for 4 GHz band and SCS=120 kHz for 30 GHz band. Correspondingly, each NR-SS block is associated with one TRS with same Tx beam. The location of the NR-SS block(s) and TRS(s) is also fixed/pre-defined to reduce the UE detection complexity.

The different locations are illustrated in FIGS. 25A, 25B, 25C, and 25D, considering the various tradeoff between the flexibility to use the remaining resources and collision/interference reduction with the potential control and/or reference signal(s), including but not limited to, PDCCH at the beginning of the slot, DMRS in PDSCH, the CSI-RS for CSI acquisition, PUCCH at the end of the slot as well as the guard period for DL/UL transmission.

In FIG. 25A, one NR-SS block has 4 consecutive symbols and two NR-SS blocks are consecutive to each other. In FIG. 25A, the n-th NR-SS block is sent in symbol #3~#6 and the following (n+1) NR-SS block is in symbol #7~#10, where n=0, 1 . . . (L−1) and L is the maximum number of NR SS blocks. The corresponding TRS is put in the time span of symbol #3~#6 and #7~#10, respectively, which is not overlapped with 2-symbol PDCCH and 1-symbol font-loaded DMRS supporting up to 4 ports. In FIG. 25A, the n-th NR-SS block is sent in symbol #4~#7 and the following (n+1) NR-SS block is in symbol #8~#11. The corresponding TRS is put in the time span of symbol #4~#7 and #8~#11, respectively, which is not overlapped with 2-symbol PDCCH and 2-symbol font-loaded DMRS supporting more than 4 ports.

In FIG. 25B, one NR-SS block also has 4 consecutive symbols and two NR-SS blocks are not consecutive to each other. In FIG. 2B, the n-th NR-SS block is sent in symbol #3~#6 and the following (n+1) NR-SS block is in symbol #8~#11, where n=0, 1 . . . (L−1) and L is the maximum number of NR SS blocks. The corresponding TRS is put in the time span of symbol #3~#6 and #8~#11, respectively, which is not overlapped with 2-symbol PDCCH and 1-symbol font-loaded DMRS supporting up to 4 ports. In FIG. 25B, the n-th NR-SS block is sent in symbol #3~#6 and the following (n+1) NR-SS block is in symbol #9~#13. The corresponding TRS is put in the time span of symbol #3~#6 and #9~#13, respectively, which is not overlapped with 2-symbol PDCCH and 1-symbol font-loaded DMRS supporting up to 4 ports in each 7-symbol mini slot.

Figure 25C:
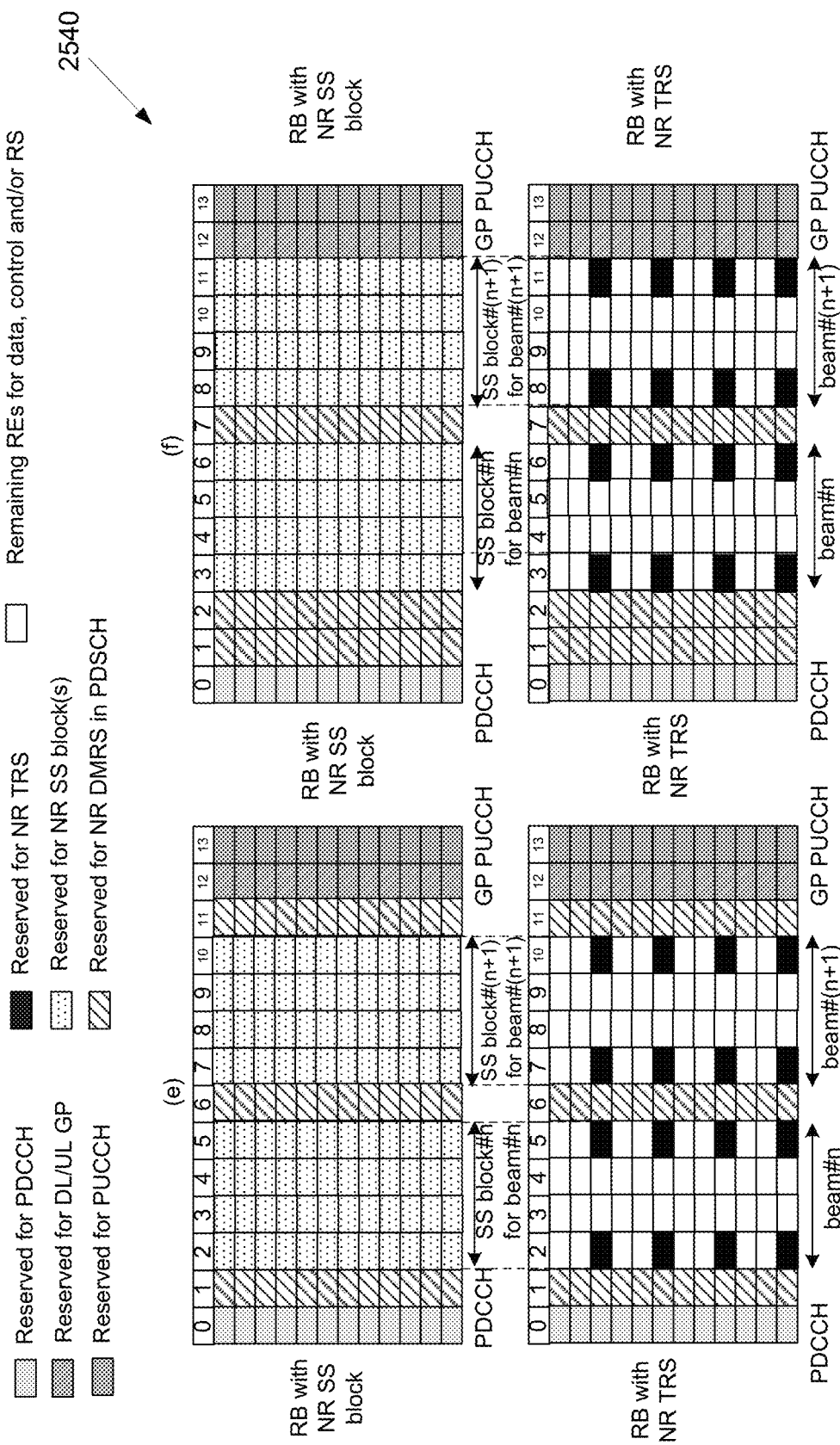
FIG. 25C illustrates yet another example location of NR-SS block according to embodiments of the present disclosure.

FIG. 25C illustrates yet another example location of NR-SS block 2540 according to embodiments of the present disclosure. The embodiment of the location of NR-SS block 2540 illustrated in FIG. 25C is for illustration only. FIG. 25C does not limit the scope of the disclosure to any particular implementation.

Figure 25D:
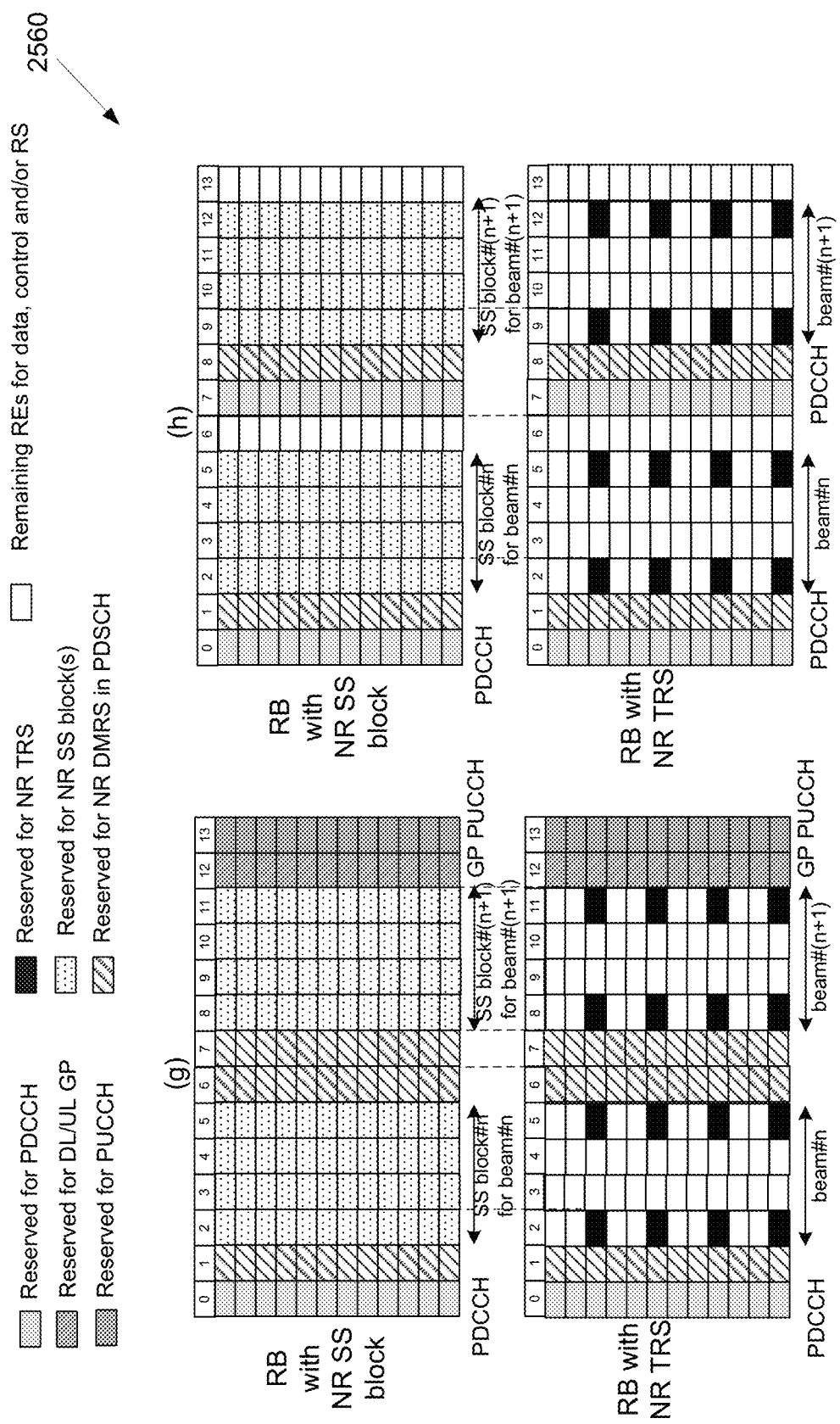
FIG. 25D illustrates yet another example location of NR-SS block according to embodiments of the present disclosure.

FIG. 25D illustrates yet another example location of NR-SS block 2560 according to embodiments of the present disclosure. The embodiment of the location of NR-SS block 2560 illustrated in FIG. 25D is for illustration only. FIG. 25D does not limit the scope of this disclosure to any particular implementation.

FIGS. 25C and 25D illustrate other examples of the NR-SS blocks as well as the TRS(s).

Figure 26A:
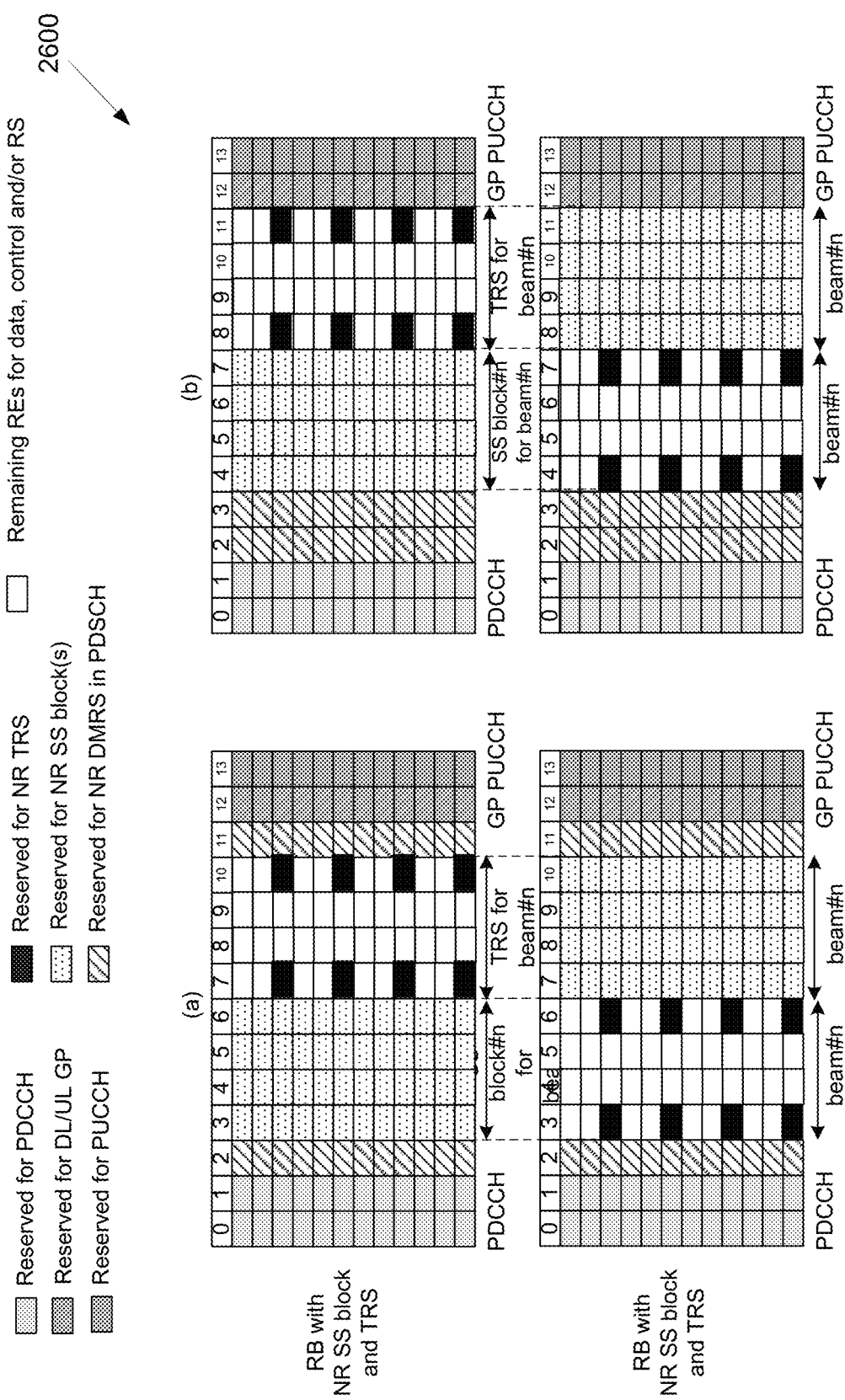
FIG. 26A illustrates an example location of NR-SS block according to embodiments of the present disclosure.

FIG. 26A illustrates an example location of NR-SS block 2600 according to embodiments of the present disclosure. The embodiment of the location of NR-SS block 2600 illustrated in FIG. 26A is for illustration only. FIG. 26A does not limit the scope of this disclosure to any particular implementation.

Figure 26B:
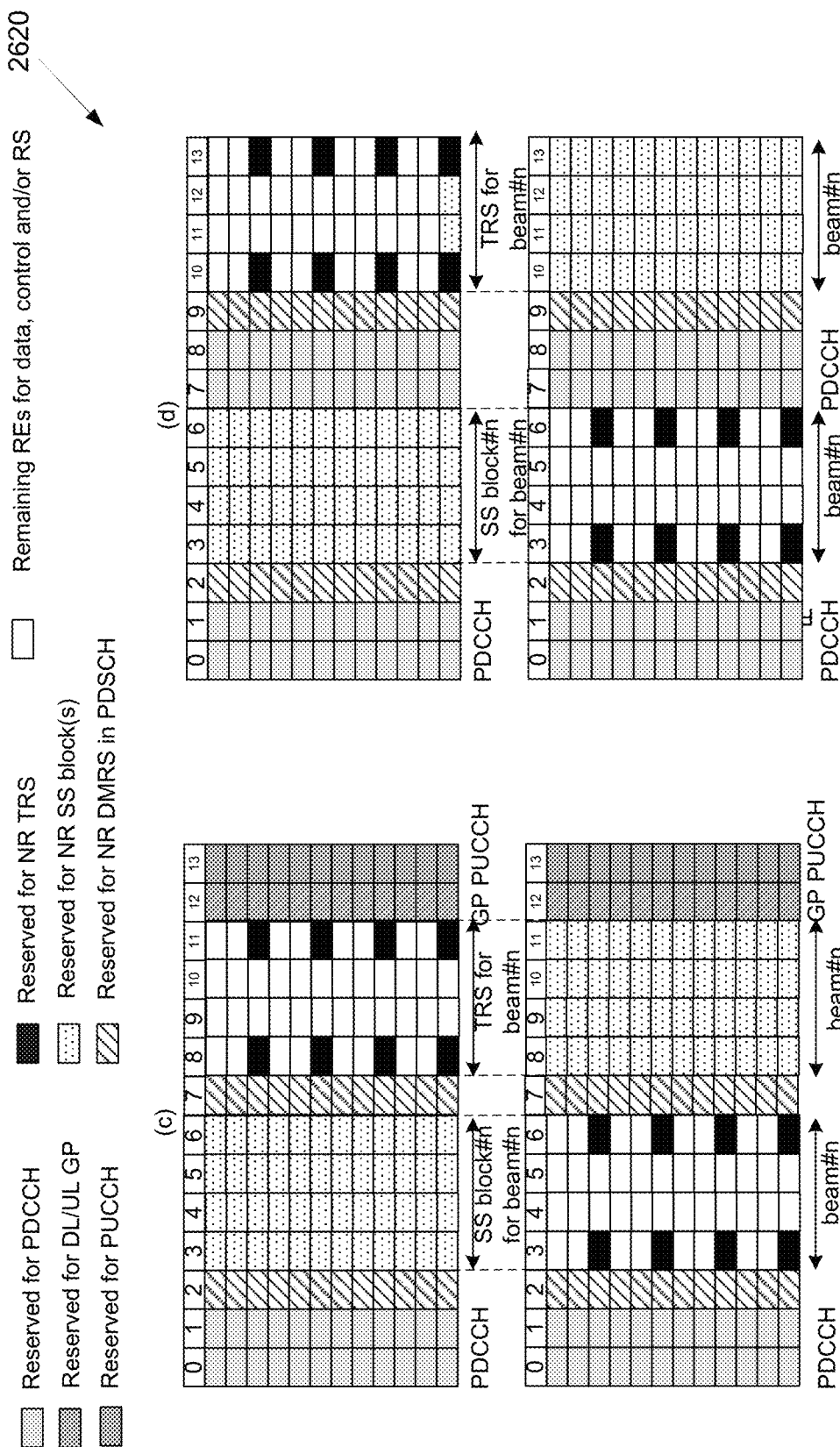
FIG. 26B illustrates another example location of NR-SS block according to embodiments of the present disclosure.

FIG. 26B illustrates another example location of NR-SS block 2620 according to embodiments of the present disclosure. The embodiment of the location of NR-SS block 2620 illustrated in FIG. 26B is for illustration only. FIG. 26B does not limit the scope of this disclosure to any particular implementation.

Figure 26C:
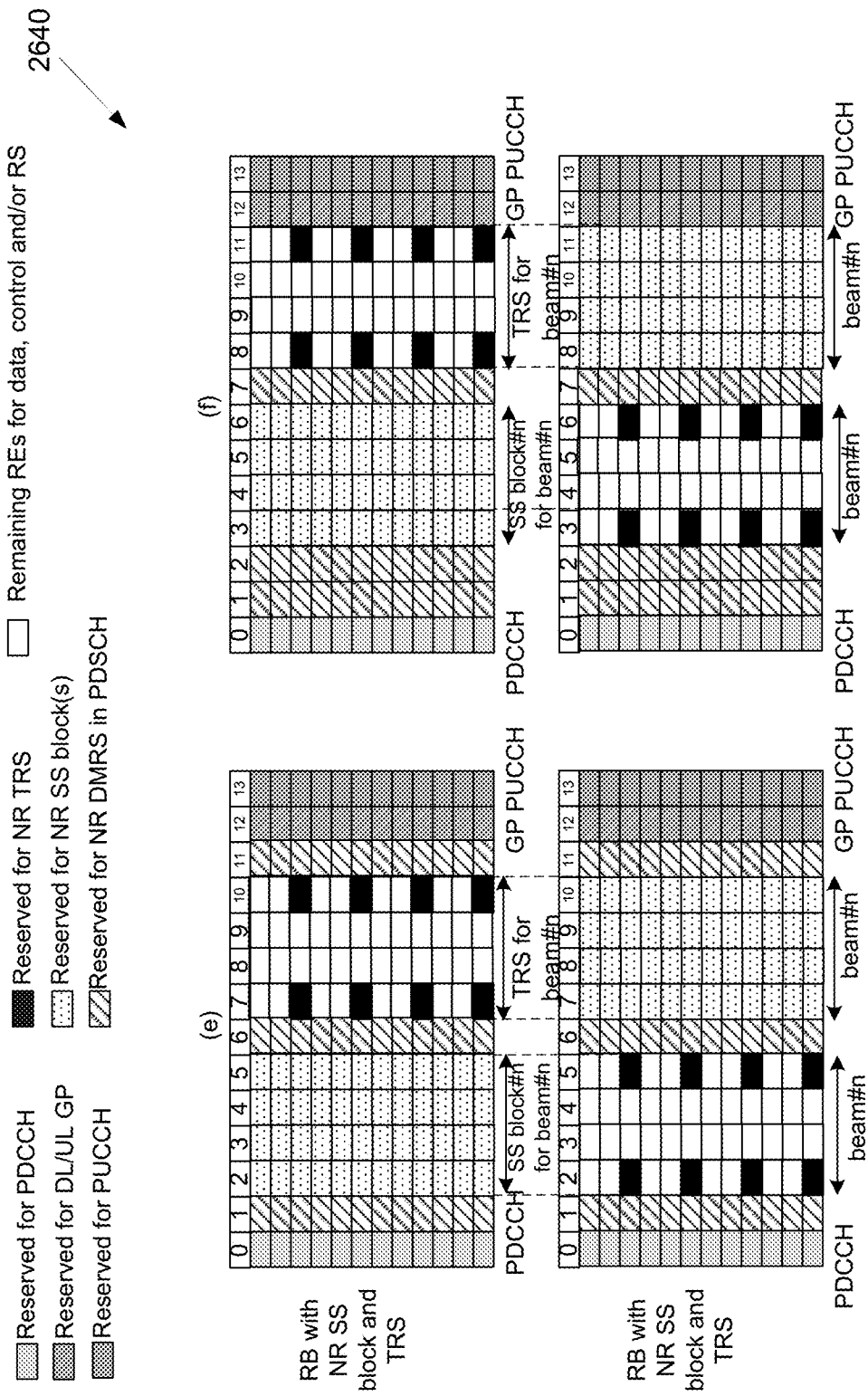
FIG. 26C illustrates yet another example location of NR-SS block according to embodiments of the present disclosure.

FIG. 26C illustrates yet another example location of NR-SS block 2640 according to embodiments of the present disclosure. The embodiment of the location of NR-SS block 2640 illustrated in FIG. 26C is for illustration only. FIG. 26C does not limit the scope of this disclosure to any particular implementation.

Figure 26D:
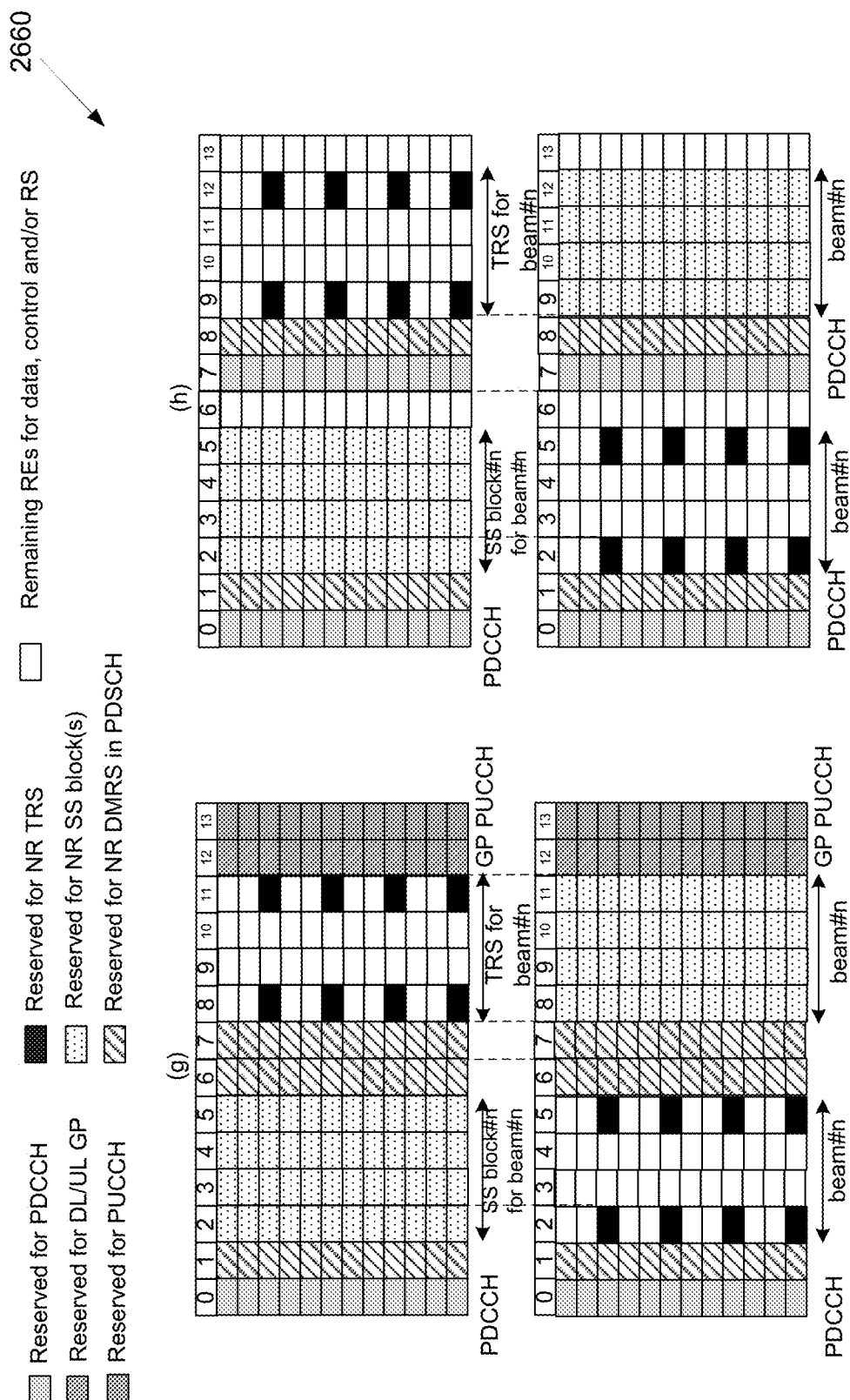
FIG. 26D illustrates yet another example location of NR-SS block according to embodiments of the present disclosure.

FIG. 26D illustrates yet another example location of NR-SS block 2660 according to embodiments of the present disclosure. The embodiment of the location of NR-SS block 2660 illustrated in FIG. 26D is for illustration only. FIG. 26D does not limit the scope of this disclosure to any particular implementation.

In one embodiment, the beam transmission time span is extended when beam sweeping with more distributed NR-SS blocks. As illustrated in FIGS. 26A, 26B, 26C, and 26D, there is only one NR-SS block every 14-symbol slot instead of 2 NR-SS blocks. The remaining resources can be in the same slot can be used to send the corresponding data or RS with same or similar transmission beam. For example, the NR-SS block and the corresponding TRS can be transmitted in the same slot and even same RB in the overlapped bandwidth.

As shown in FIG. 26A, the NR-SS block in symbol #3~#6 is transmitted only an the corresponding TRS could be sent in the following symbol #7~#10; while, it is also possible that the NR-SS block in symbol #7~#10 is transmitted only an the corresponding TRS could be sent in the following symbol #3~#6.

For sake of simplicity, the TRS has fixed antenna port(s). One-port TRS save the RE overhead. Same antenna port can be used for PSS, SSS and/or PBCH.

The TRS REs per RB could be distributed in each time span with pre-defined/configured frequency density (e.g., one TRS RE every 3, 4, 5, 6 or 12 subcarriers) using interleaved or repeated pattern in the selected symbols. The symbols for TRS REs are selected with fixed/pre-defined manner (e.g., separated by 2, 3, 4 or 8 symbols) within each defined time span for TRS. The larger distance of the selected symbol results in better frequency offset resolution but smaller range of the frequency offset error.

As shown in FIGS. 25A, 25B, 25C, 25D, 26A, 26B, 26C, and 26D, the first symbol and the last symbol of the 4-symbol time-span are selected for TRS. If the TRS distributed in symbol #4, #7, #8, and/or #11, the TRS in NR is co-existed with the LTE CRS pattern in carrier frequency of 2 GHz. The TRS REs frequency subcarrier locations can be shifted based on the cell ID, similar to the way of LTE CRS.

The RBs for NR-SS block(s) are only in the NR-SS block bandwidth. But the RBs for TRS(s) are in wider bandwidth. The TRS periodicity may be same or different from that of NR-SS blocks. The RBs for NR-SS block(s) and RBs for TRS(s) with same beam can be sent at the same time or with fixed/pre-defined/configured time offset. If the RBs for NR-SS block(s) and RBs for TRS(s) are transmitted at the same time, the RBs for TRS(s) are located at the upper and lower band of those of NR-SS block(s) in the potentially entire carrier BW.

Note that the NR-SS block(s) in FIGS. 25A, 25B, 25C, 25D, 26A, 26B, 26C, and 26D can be activated/de-activated by network. If an NR-SS block or beam is deactivated, the corresponding TRS(s) can also be deactivated. The remaining resources could be used for data transmission, control and/or other RSs for demodulation/measurement. The SS block activation could be fixed or semi-statically configured. If configurable, it could be transparent to the UEs, such as initial access and/or IDLE UEs. Or it could be indicated to UEs, such as using RRC signaling/DCI in PDCCH to the RRC_CONNECTED UEs and/or using MIB/SIB to the initial access and/or IDLE UEs.

To save signaling overhead, the limited bits of bitmap signaling can be used. For example, if the maximum number of the NR SS blocks is 4 for lower carrier frequency, such as 2 GHz, 4-bit bitmap indication is used to indicate the active/de-active 4 NR SS blocks independently. If the maximum number of the NR SS blocks is 8 for 4 GHz, the 8 NR-SS blocks are separated into 4 groups with 2 NR-SS blocks per group and the 4-bit bitmap indication is used to indicate active/de-active 4 groups of NR SS blocks independently. If the maximum number of the NR SS blocks is 64 for over 6 GHz, the 64 NR-SS blocks are separated into 4 groups with 16 NR-SS blocks per group and the 4-bit bitmap indication is used to indicate active/de-active 4 groups of NR SS blocks independently. Each group could be a burst of NR-SS blocks with pre-defined burst duration or could be distributed NR-SS blocks in each burst. If multiple grouping methods are supported, additional bit(s) may be needed to support scheduling flexibility at the network side.

In some embodiments, one group of multiple NR SS blocks with same or partially overlapped beams is included and can be configured to be associated with one TRS, defined as many-by-one mapping. The TRS beam could be similar or even wider than that of one NR-SS block. The number of the NR-SS blocks per group is pre-defined or configurable for each frequency band. Also, the time offset between the TRS and the 1$^{st}$ NR-SS block per group could pre-defined or configurable. If configurable, the indication can be in MIB or SIB.

One NR SS block can be configured to be associated with multiple TRS, defined as one-by-many mapping. The TRS beam could be similar or even narrower than that of one NR-SS block. The number of the TRSs is pre-defined or configurable for each frequency band. Also, the time offset between the 1$^{st}$ TRS and the NR-SS block could pre-defined or configurable. If configurable, the indication can be in MIB or SIB.

The location of NR-SS block(s), illustrated in FIGS. 25A, 25B, 25C, 25D, 26A, 26B, 26C, and 26D, can be extended to consider compatibility with other type of data, control and/or RS for different systems.

Figure 27A:
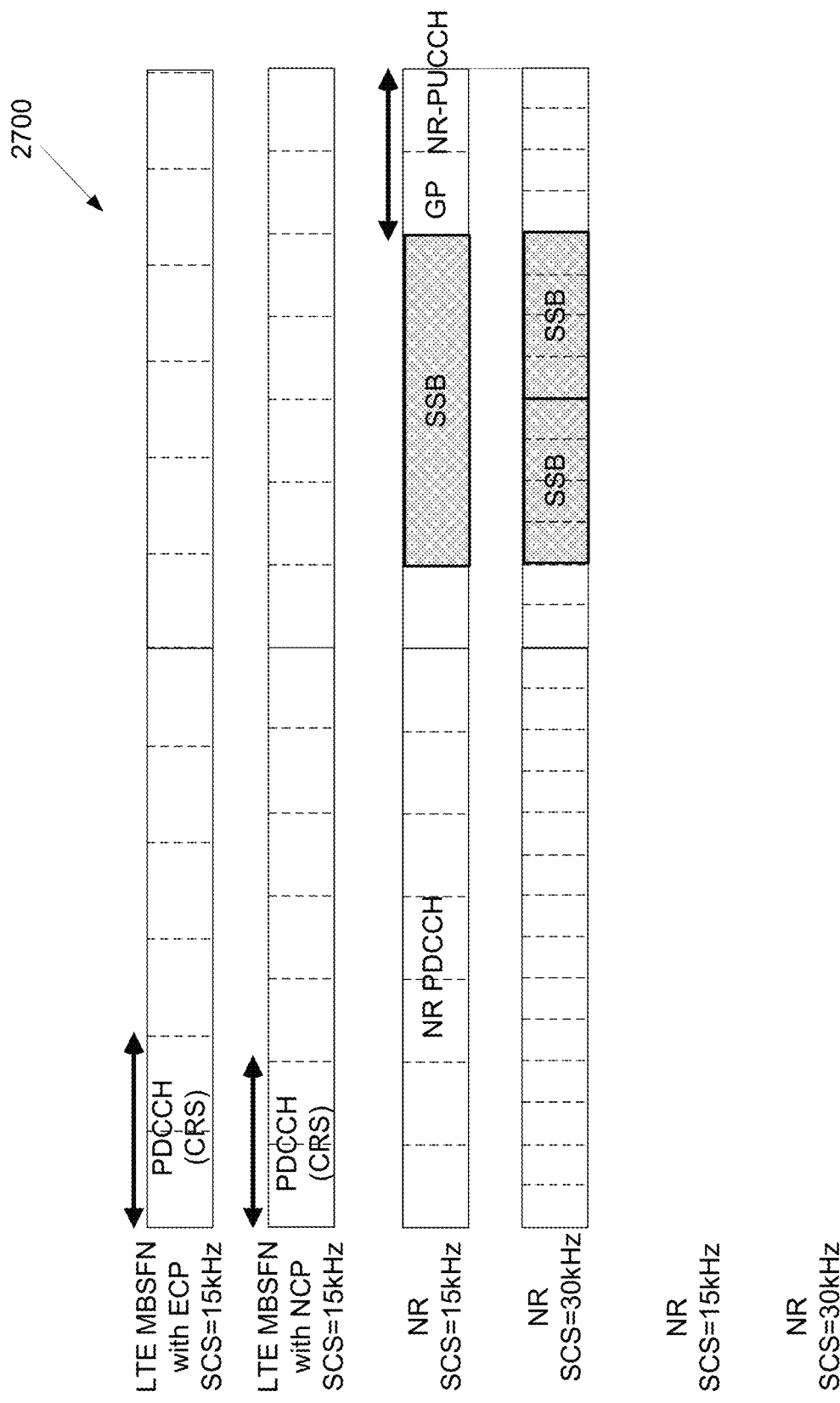
FIG. 27A illustrates an example 4-symbol SS block according to embodiments of the present disclosure.

FIG. 27A illustrates an example 4-symbol SS block 2700 according to embodiments of the present disclosure. The embodiment of the 4-symbol SS block 2700 illustrated in FIG. 27A is for illustration only. FIG. 27A does not limit the scope of this disclosure to any particular implementation.

Figure 27B:
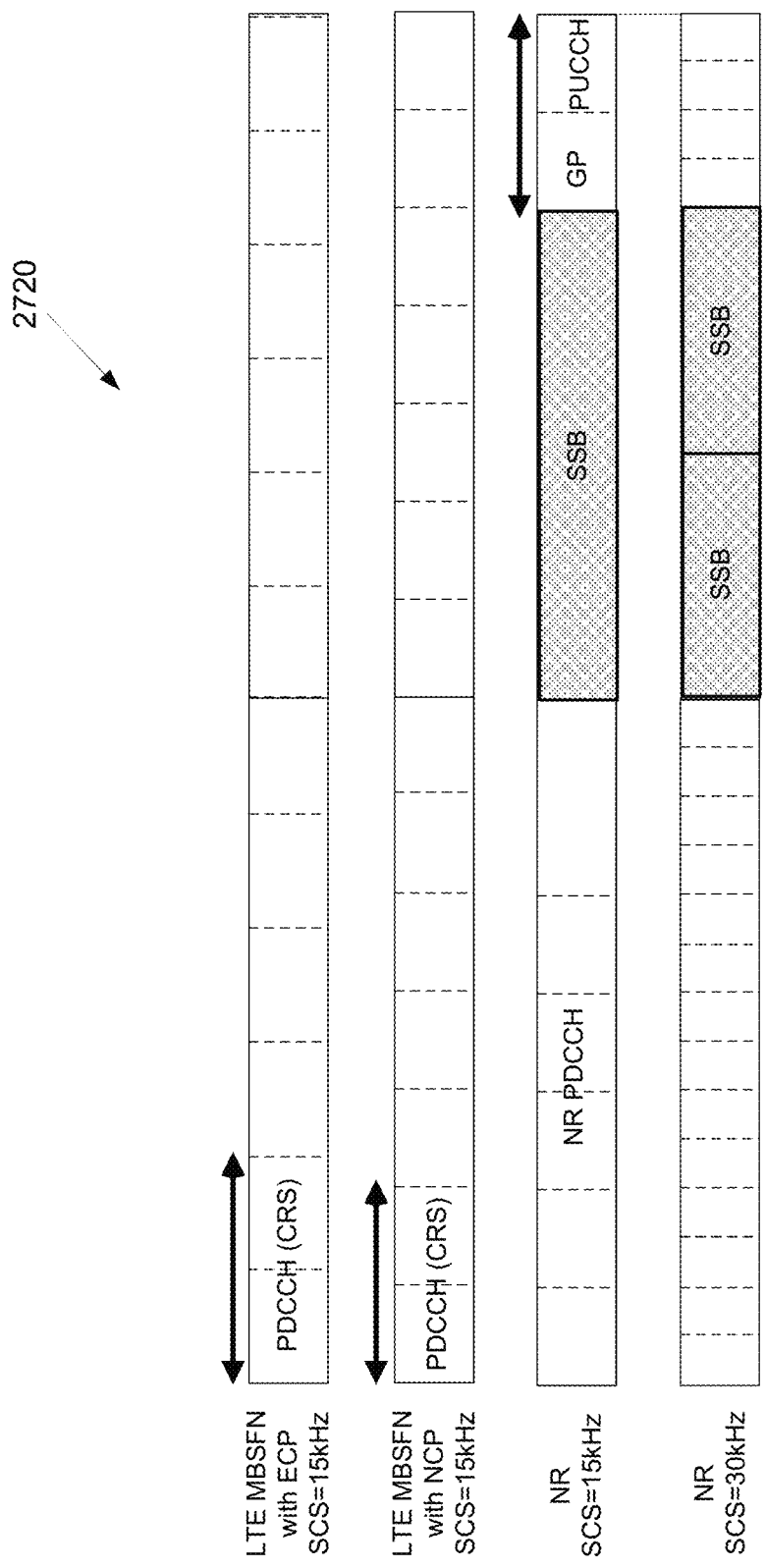
FIG. 27B illustrates an example 5-symbol SS block according to embodiments of the present disclosure.

FIG. 27B illustrates an example 5-symbol SS block 2720 according to embodiments of the present disclosure. The embodiment of the 5-symbol SS block 2720 illustrated in FIG. 27B is for illustration only. FIG. 27B does not limit the scope of this disclosure to any particular implementation.

In one embodiment, the cases of SCS=15 kHz and 30 kHz, respectively, are illustrated in FIGS. 27A and 27B. In case of SCS=15 kHz for NR-SS blocks, there is one SS block (SSB) located in the second half of the 14-slot with SCS=15 kHz. In FIG. 27A), the 4-symbol NR SS block starts from symbol #8 and end at symbol #11. In FIG. 27B, the 5-symbol NR SS block starts from symbol #7 and end at symbol #11. In case of SCS=30 kHz for NR-SS blocks, there are two 14-slots with SCS=30 kHz within 1 ms and the two consecutive SS blocks (SSBs) are located in the second 14-symbol slot with SCS=30 kHz.

In FIG. 27A, one 4-symbol NR SS block starts from symbol #2 and end at symbol #5 and another 4-symbol NR-SS block starts from symbol #6 and end at symbol #9 of the second 14-symbol slot with SCS=30 kHz. In FIG. 27B, one 5-symbol NR SS block starts from symbol #0 and end at symbol #4 and another 5-symbol NR-SS block starts from symbol #5 and end at symbol #9 of the second 14-symbol slot with SCS=30 kHz. Note that each slot has 14 symbols with symbol index from #0~#13. Such location of NR-SS block(s) can avoid overlapping with LTE 2-symbol PDCCH in LTE MBSFN using SCS=15 kHz and CP type of normal CP (NCP) or extended CP (ECP) at the beginning of 1 ms subframe. The NR-PDCCH can be sent in any symbol non-overlapped with LTE PDCCH and NR-SS block(s). The NR-PUCCH together with guard period (GP) is possible to be transmitted at the end of a 14-symbol slot or a 7-symbol slot.

If maximum number of NR-SS blocks is 4 for a frequency band, the maximum number of NR-SS blocks require 4 ms if SCS=15 kHz is used for NR-SS blocks. If maximum number of NR-SS blocks is 4 for a frequency band, the maximum number of NR-SS blocks require 2 ms if SCS=30 kHz is used for NR-SS blocks.

If maximum number of NR-SS blocks is 8 for a frequency band, the maximum number of NR-SS blocks require 8 ms if SCS=15 kHz is used for NR-SS blocks. If maximum number of NR-SS blocks is 4 for a frequency band, the maximum number of NR-SS blocks require 4 ms if SCS=30 kHz is used for NR-SS blocks.

Figure 28A:
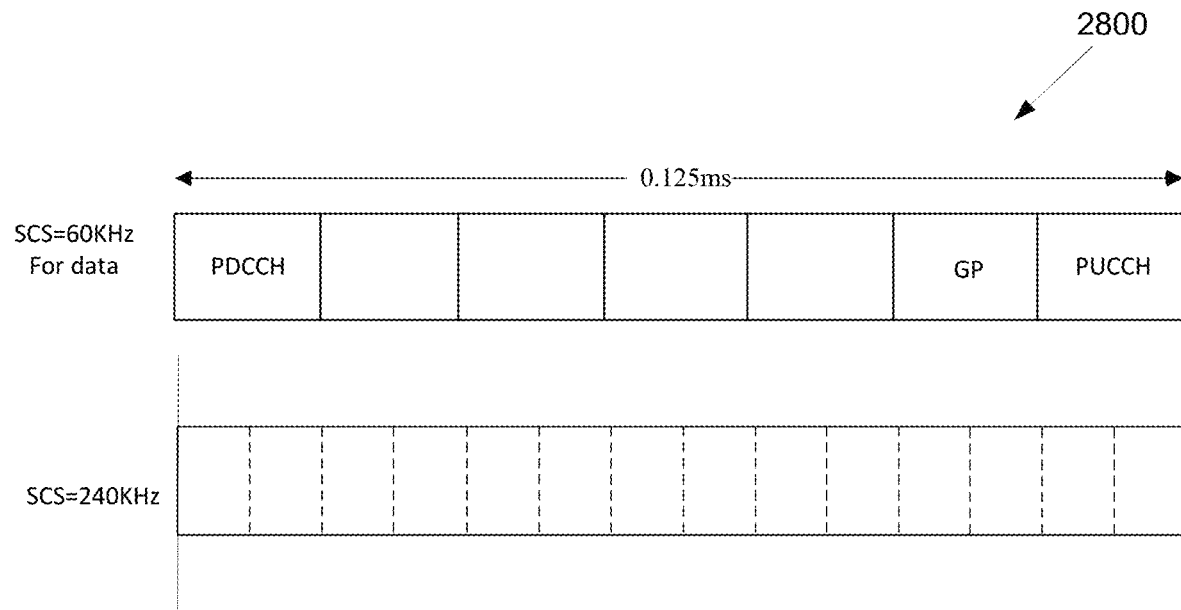
FIG. 28A illustrates another 4-symbol SS block according to embodiments of the present disclosure.

FIG. 28A illustrates another 4-symbol SS block 2800 according to embodiments of the present disclosure. The embodiment of the 4-symbol SS block 2800 illustrated in FIG. 28A is for illustration only. FIG. 28A does not limit the scope of this disclosure to any particular implementation.

Figure 28B:
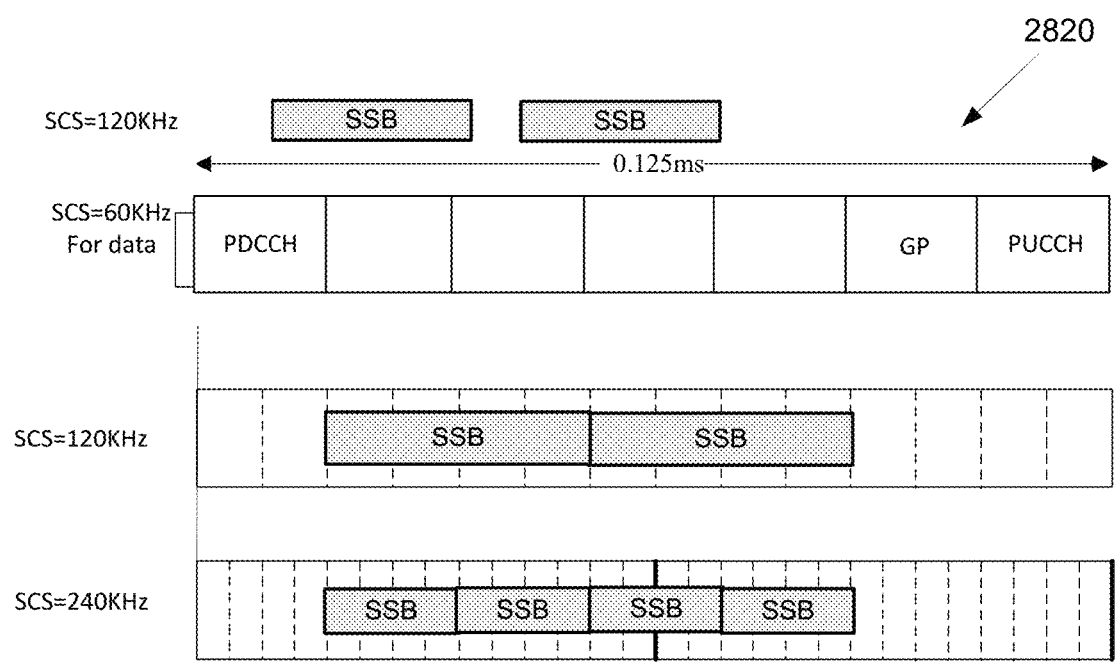
FIG. 28B illustrates yet another 4-symbol SS block according to embodiments of the present disclosure.

FIG. 28B illustrates yet another 4-symbol SS block 2820 according to embodiments of the present disclosure. The embodiment of the 4-symbol SS block 2820 illustrated in FIG. 28B is for illustration only. FIG. 28B does not limit the scope of this disclosure to any particular implementation.

Figure 28C:
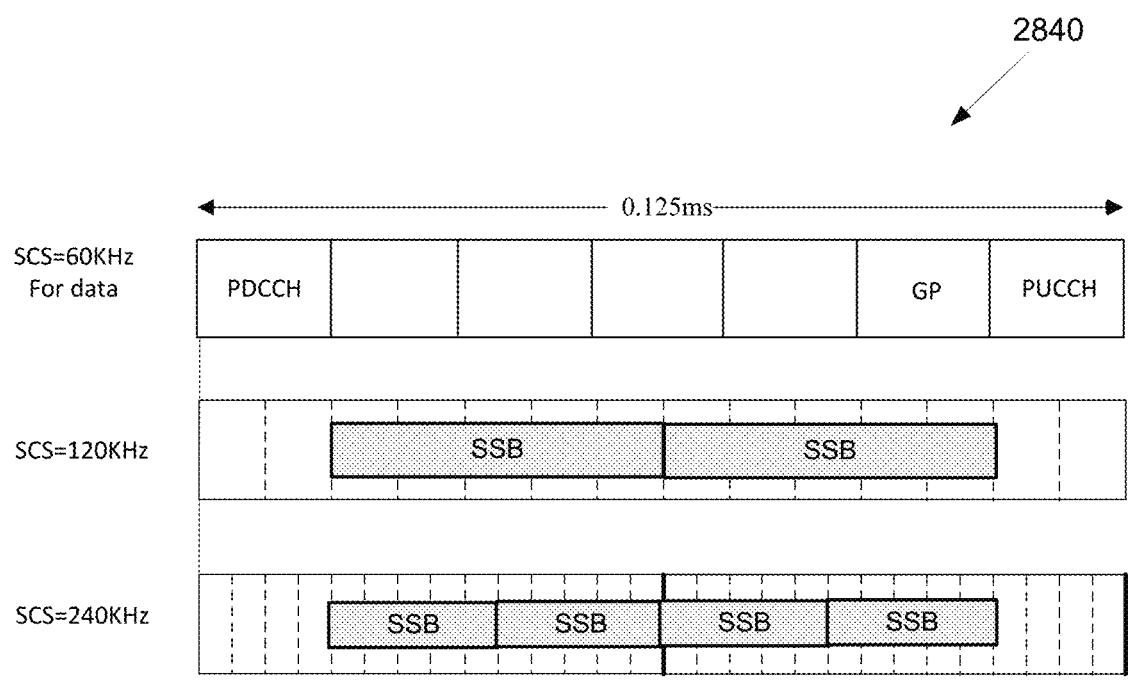
FIG. 28C illustrates another 5-symbol SS block according to embodiments of the present disclosure.

FIG. 28C illustrates another 5-symbol SS block 2840 according to embodiments of the present disclosure. The embodiment of the 5-symbol SS block 2840 illustrated in FIG. 28C is for illustration only. FIG. 28C does not limit the scope of this disclosure to any particular implementation.

In one embodiment, the cases of SCS=120 kHz and 240 kHz, respectively, are illustrated in FIGS. 28A, 28B, and 28C for. In case of SCS=120 kHz for NR-SS blocks, there are two SS blocks (SSBs) located in the 14-slot with SCS=120 kHz. In FIG. 28A, one 4-symbol NR-SS block starts from symbol #2 and end at symbol #5 and another 4-symbol NR-SS block starts from symbol #7 and end at symbol #10.

In FIG. 28B, one 4-symbol NR-SS block starts from symbol #2 and end at symbol #5 and another 4-symbol NR-SS block starts from symbol #6 and end at symbol #9. In FIG. 28C, one 5-symbol NR SS block starts from symbol #2 and end at symbol #6 and another 5-symbol NR-SS block starts from symbol #7 and end at symbol #11. In case of SCS=240 kHz for NR-SS blocks, there are two 14-slots with SCS=240 kHz within 0.125 ms and the two consecutive SS blocks (SSBs) are located each 14-symbol slot with SCS=240 kHz.

In FIG. 28A, in the first 14-symbol slot with SCS=240 kHz of 0.125 ms, one 4-symbol NR SS block starts from symbol #4 and end at symbol #7 and another 4-symbol NR-SS block starts from symbol #8 and end at symbol #11. And in the second 14-symbol slot with SCS=240 kHz of 0.125 ms, one 4-symbol NR SS block starts from symbol #0 and end at symbol #3 and another 4-symbol NR-SS block starts from symbol #4 and end at symbol #7.

In FIG. 28B, in the two consecutive 14-symbol slots with SCS=240 kHz of 0.125 ms, there are consecutive eight 4-symbol NR SS block starts from symbol #4 of the first 14-symbol slot with SCS=240 kHz and end at symbol #5 of the second 14-symbol slot with SCS=240 kHz of 0.125 ms.

In FIG. 28C, in the first 14-symbol slot with SCS=240 kHz of 0.125 ms, one 5-symbol NR SS block starts from symbol #4 and end at symbol #8 and another 5-symbol NR-SS block starts from symbol #9 and end at symbol #13. And in the second 14-symbol slot with SCS=240 kHz of 0.125 ms, one 5-symbol NR SS block starts from symbol #0 and end at symbol #4 and another 5-symbol NR-SS block starts from symbol #5 and end at symbol #9. Note that each slot has 14 symbols with symbol index from #0~#13. Such location of NR-SS block(s) can avoid overlapping with NR-PDCCH at the beginning and NR-PUCCH together with GP at the end of the slot with SCS=120 kHz. Also, it avoids the overlapping with the PDCCH and PUCCH in the 7-symbol slot with data SCS=60 kHz.

If maximum number of NR-SS blocks is 64 for a frequency band, the maximum number of NR-SS blocks require 4 ms if SCS=120 kHz is used for NR-SS blocks and each 1 ms include 16 NR-SS blocks with 2 NR-SS blocks per 0.125 ms. If maximum number of NR-SS blocks is 4 for a frequency band, the maximum number of NR-SS blocks require 2 ms if SCS=240 kHz is used for NR-SS blocks and each 1 ms include 32 NR-SS blocks with 4 NR-SS blocks per 0.125 ms.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A user equipment (UE) in a wireless communication system, the UE comprising:
   a transceiver configured to receive, from a base station (BS) over downlink channels, at least one symbol comprising resource elements (REs) mapped for at least one demodulation reference signal (DMRS) sequence of a physical broadcasting channel (PBCH) and REs mapped for PBCH data; and
   a processor operably connected to the transceiver, the processor configured to
      determine REs for the DMRS of the PBCH and REs for the PBCH data included in the at least one symbol, wherein the REs for the DMRS of the PBCH and the REs for the PBCH data are interleaved frequency division multiplexed (IFDM),
      detect a synchronization signal (SS) block hypothesis carried in the at least one DMRS sequence that is mapped into the REs for DMRS of PBCH, wherein the SS block hypothesis includes an SS/PBCH block index, and
      decode a PBCH payload that is mapped into the REs for PBCH data.

2. The UE of claim 1, wherein the transceiver is further configured to receive the at least one DMRS sequence on same antenna ports to be used for a secondary synchronization signal (SSS), using a same transmission scheme that is used for the SSS.

3. The UE of claim 1, wherein at least one of the REs for DMRS of PBCH is present on every four subcarriers in the at least one symbol.

4. The UE of claim 1, wherein the processor is further configured to determine SS blocks mapped into consecutive slots within a 20 millisecond periodicity of an SS burst set using a pre-defined mapping pattern based on the SS/PBCH block index.

5. The UE of claim 4, wherein:
   each of the consecutive slots includes a pair of SS blocks, and
   a maximum number of SS blocks within one millisecond and a starting symbol of SS block within the pair of SS blocks included in a slot are determined by subcarrier spacing of the SS blocks.

6. The UE of claim 5, wherein, when the subcarrier spacing of SS block is 15 kHz, maximum two SS blocks are mapped within one millisecond, the starting symbol of a first SS block within the pair of SS blocks included in a slot is symbol #2 in the slot and the starting symbol of a second SS block within the pair of SS blocks included in a slot is symbol #8 in the slot.

7. The UE of claim 5, wherein, when the subcarrier spacing of SS block is 30 kHz, maximum four SS blocks are mapped within one millisecond, the starting symbol of a first SS block within the pair of SS blocks included in a slot is symbol #7 in the slot and the starting symbol of a second SS block within the pair of SS blocks included in a slot is symbol #11 in the slot.

8. A base station (BS) in a wireless communication system, the BS comprising:
   a processor configured to:
      determine resource elements (REs) for at least one demodulation reference signal (DMRS) sequence of a physical broadcasting channel (PBCH) and REs for PBCH data, generate a synchronization signal (SS) block hypothesis carried in the at least one DMRS sequence that is mapped into the REs for the DMRS of the PBCH, wherein the first part of the SS block hypothesis includes an SS block index, and encode a PBCH payload that is mapped into the REs for the PBCH data, and generate the at least one symbol using the REs for the DMRS of the PBCH and the REs for the PBCH data, wherein the REs for the DMRS of the PBCH and the REs for the PBCH data are interleaved frequency division multiplexed (IFDM); and a transceiver operably connected to the processor, the transceiver configured to transmit, to a user equipment (UE) over downlink channels, the at least one symbol containing the REs mapped for the at least one DMRS sequence and the REs mapped for the PBCH data.

9. The BS of claim 8, wherein the transceiver is further configured to transmit the at least one DMRS sequence, on same antenna ports to be used for a secondary synchronization signal (SSS), using a same transmission scheme that is used for the SSS.

10. The BS of claim 8, wherein at least one of the REs for the DMRS of the PBCH is present on every four subcarriers in the at least one symbol.

11. The BS of claim 8, wherein the processor is further configured to generate SS blocks mapped into consecutive slots within a 20 millisecond periodicity of an SS burst set using a pre-defined mapping pattern based on the SS/PBCH block index.

12. The BS of claim 11, wherein:
each of the consecutive slots includes a pair of SS blocks, and
a maximum number of SS blocks within one millisecond and a starting symbol of SS block within the pair of SS blocks included in a slot are determined by subcarrier spacing of the SS blocks.

13. The BS of claim 12, wherein, when the subcarrier spacing of SS block is 15 kHz, maximum two SS blocks are mapped within one millisecond, the starting symbol of a first SS block within the pair of SS blocks included in a slot is symbol #2 in the slot and the starting symbol of a second SS block within the pair of SS blocks included in a slot is symbol #8 in the slot.

14. The BS of claim 13, wherein, when the subcarrier spacing of SS block is 30 kHz, maximum four SS blocks are mapped within one millisecond, the starting symbol of a first SS block within the pair of SS blocks included in a slot is symbol #7 in the slot and the starting symbol of a second SS block within the pair of SS blocks included in a slot is symbol #11 in the slot.

15. A method of a user equipment (UE) in a wireless communication system, the method comprising:

receiving, from a base station (BS) over downlink channels, at least one symbol comprising resource elements (REs) mapped for at least one demodulation reference signal (DMRS) sequence of a physical broadcasting channel (PBCH) and REs mapped for PBCH data;

determining REs for the DMRS of the PBCH and REs for the PBCH data included in the at least one symbol, wherein the REs for the DMRS of the PBCH and the REs for the PBCH data are interleaved frequency division multiplexed (IFDM);

detecting a synchronization signal (SS) block hypothesis carried in the at least one DMRS sequence that is mapped into the REs for the DMRS of the PBCH, wherein the SS block hypothesis includes an SS/PBCH block index; and decoding a PBCH payload that is mapped into the REs for the PBCH data.

16. The method of claim 15, further comprising receiving the at least one DMRS sequence, on same antenna ports to be used for a secondary synchronization signal (SSS) using a same transmission scheme that is used for the SSS.

17. The method of claim 15, wherein at least one of the REs for the DMRS of the PBCH is present on every four subcarriers in the at least one symbol.

18. The method of claim 15, further comprising determining SS blocks mapped into consecutive slots within a 20 millisecond periodicity of an SS burst set using a pre-defined mapping pattern based on the SS/PBCH block index.

19. The method of claim 18, wherein:
each of the consecutive slots includes a pair of SS blocks, and
a maximum number of SS blocks within one millisecond and a starting symbol of SS block within the pair of SS blocks included in a slot are determined by subcarrier spacing of the SS blocks.

20. The method of claim 19, wherein:
when the subcarrier spacing of SS block is 15 kHz, maximum two SS blocks are mapped within one millisecond, the starting symbol of a first SS block within the pair of SS blocks included in a slot is symbol #2 in the slot and the starting symbol of a second SS block within the pair of SS blocks included in a slot is symbol #8 in the slot, and
when the subcarrier spacing of SS block is 30 kHz, maximum four SS blocks are mapped within one millisecond, the starting symbol of a first SS block within the pair of SS blocks included in a slot is symbol #7 in the slot and the starting symbol of a second SS block within the pair of SS blocks included in a slot is symbol #11 in the slot.

* * * * *